(12) United States Patent
Lee et al.

(10) Patent No.: US 12,532,341 B2
(45) Date of Patent: Jan. 20, 2026

(54) METHOD AND DEVICE FOR ESTIMATING SELF-INTERFERENCE CHANNEL IN FULL-DUPLEX COMMUNICATION SYSTEM

(71) Applicant: Samsung Electronics Co., Ltd., Gyeonggi-do (KR)

(72) Inventors: Kwonjong Lee, Gyeonggi-do (KR); Sundo Kim, Gyeonggi-do (KR); Juho Lee, Gyeonggi-do (KR); Jungsoo Jung, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 426 days.

(21) Appl. No.: 17/970,834

(22) Filed: Oct. 21, 2022

(65) Prior Publication Data

US 2023/0125714 A1    Apr. 27, 2023

(30) Foreign Application Priority Data

Oct. 21, 2021 (KR) .................. 10-2021-0140952

(51) Int. Cl.
*H04W 72/541* (2023.01)
*H04L 5/14* (2006.01)
*H04W 72/0446* (2023.01)

(52) U.S. Cl.
CPC ............. *H04W 72/541* (2023.01); *H04L 5/14* (2013.01); *H04W 72/0446* (2013.01)

(58) Field of Classification Search
CPC ........... H04W 72/541; H04W 72/0446; H04W 72/0453; H04W 72/23; H04W 72/046;
(Continued)

(56) References Cited

U.S. PATENT DOCUMENTS

| 2014/0146719 A1 | 5/2014 | Gao et al. |
| 2016/0249245 A1 | 8/2016 | Kim et al. |

(Continued)

FOREIGN PATENT DOCUMENTS

| EP | 3 567 889 | 11/2019 |
| WO | WO 2017/196008 | 11/2017 |

(Continued)

OTHER PUBLICATIONS

European Search Report dated Dec. 18, 2024 issued in counterpart application No. 22883932.0-1206, 8 pages.

(Continued)

*Primary Examiner* — Nizam U Ahmed
(74) *Attorney, Agent, or Firm* — The Farrell Law Firm, P.C.

(57) ABSTRACT

The disclosure relates to a method and device for efficiently estimating a self-interference channel in an FD communication system. A method for estimating a self-interference channel by a BS in an FD communication system includes transmitting, to a first UE, information about an uplink resource where uplink reception from the first UE is muted; and estimating a self-interference channel related to downlink transmission in a period corresponding to the uplink resource where uplink reception is muted during downlink transmission to a second UE, based on the transmitted information.

17 Claims, 37 Drawing Sheets

(58) Field of Classification Search
CPC ....... H04L 5/14; H04L 5/1461; H04L 5/0094; H04L 25/0202; H04B 17/345; H04B 17/204; H04J 11/0023
See application file for complete search history.

(56) References Cited

U.S. PATENT DOCUMENTS

| | | |
|---|---|---|
| 2018/0184315 A1 | 6/2018 | Ji et al. |
| 2018/0359751 A1 | 12/2018 | Ko et al. |
| 2019/0158263 A1 | 5/2019 | Leo et al. |
| 2019/0215096 A1* | 7/2019 | Kim ................ H04L 1/0025 |
| 2020/0322184 A1 | 10/2020 | Kim et al. |
| 2022/0110068 A1* | 4/2022 | Bai ................ H04W 52/24 |
| 2023/0124786 A1 | 4/2023 | Qian et al. |
| 2024/0163058 A1* | 5/2024 | Taghizadeh Motlagh ................ H04L 5/0051 |

FOREIGN PATENT DOCUMENTS

| | | |
|---|---|---|
| WO | WO 2020/222458 | 11/2020 |
| WO | WO 2021/177664 | 4/2023 |

OTHER PUBLICATIONS

CATT, "Interference Measurement Over Muted RE", R1-105164, 3GPP TSG RAN WG1 Meeting #62bis, Oct. 11-15, 2010, 4 pages.
International Search Report dated Jan. 20, 2023 issued in counterpart application No. PCT/KR2022/015761, 8 pages.

* cited by examiner

1110 — ☐ SI measurement interval. No UL transmission
1120 — ▦ UL transmission

2310 — SI measurement interval, including muting RE
2320 — UL transmission

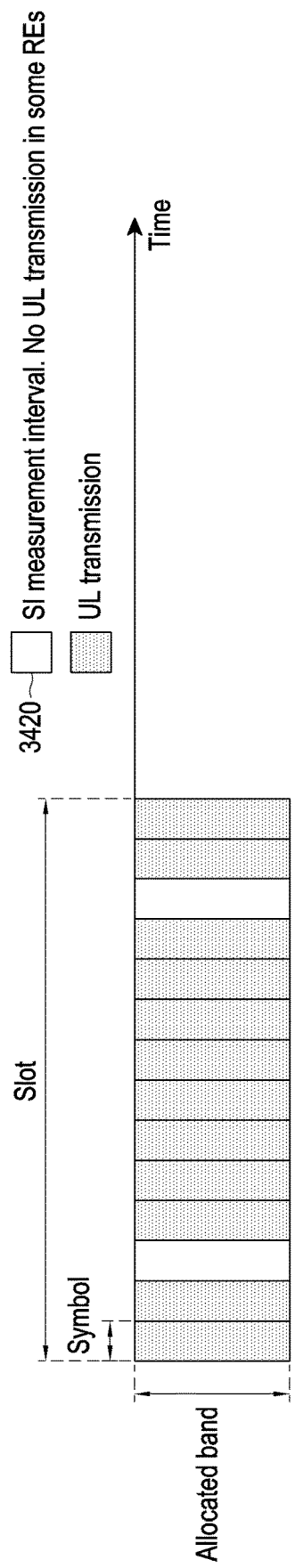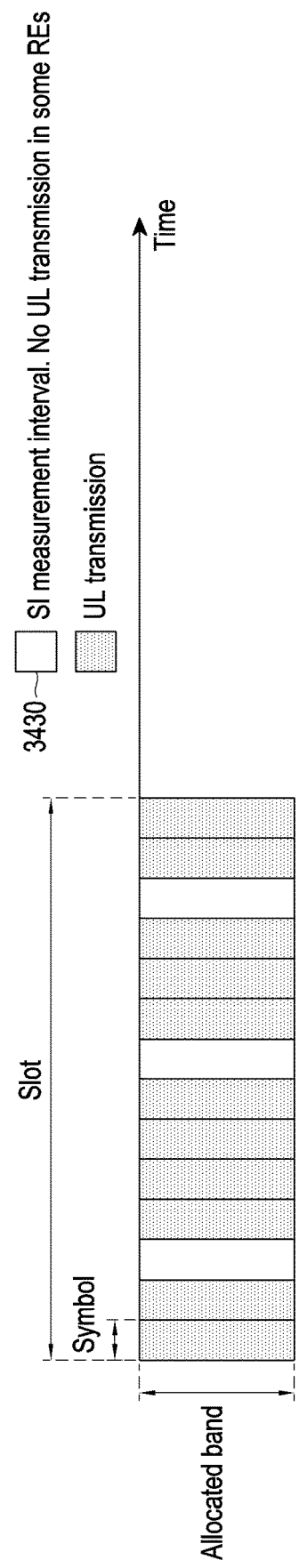

METHOD AND DEVICE FOR ESTIMATING SELF-INTERFERENCE CHANNEL IN FULL-DUPLEX COMMUNICATION SYSTEM

CROSS-REFERENCE TO RELATED APPLICATION(S)

This application is based on and claims priority under 35 U.S.C. § 119 to Korean Patent Application No. 10-2021-0140952, which was filed in the Korean Intellectual Property Office on Oct. 21, 2021, the entire disclosure of which is incorporated herein by reference.

BACKGROUND

1. Field

The disclosure relates generally to a method and device for supporting full-duplex (FD) communication in a wireless communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address the above-mentioned problems and disadvantages, and to provide at least the advantages described below.

An aspect of the disclosure is to provide a method and device for efficiently estimating a self-interference channel in an FD communication system.

Another aspect of the disclosure is to provide a method and device for setting a muting resource for efficiently estimating a self-interference channel in an FD communication system.

Another aspect of the disclosure is to provide a method and device for efficiently providing position information about a muting resource for estimating a self-interference channel in an FD communication system.

In accordance with an aspect of the disclosure, a method for estimating a self-interference channel by a base station (BS) in an FD communication system, includes transmitting, to a first UE, information about an uplink resource in which uplink reception from the first UE is muted; and estimating a self-interference channel related to downlink transmission in a period corresponding to the uplink resource, where uplink reception is muted during downlink transmission to a second UE, based on the transmitted information.

In accordance with another aspect of the disclosure, a BS for estimating a self-interference channel in an FD communication system, includes a transceiver; and a processor configured to transmit, through the transceiver to a first UE, information about an uplink resource in which uplink reception from the first UE is muted, and estimate a self-interference channel related to downlink transmission in a period corresponding to the uplink resource, where uplink reception is muted during downlink transmission to a second UE, based on the transmitted information.

In accordance with another aspect of the disclosure, a method for estimating a self-interference channel by a UE in an FD communication system, includes receiving, from a BS, information about an uplink resource in which uplink reception is muted; and performing uplink transmission in a remaining uplink resource, except for the uplink resource, while not performing uplink transmission in a period corresponding to the uplink resource, based on the received information.

In accordance with another aspect of the disclosure, a UE for estimating a self-interference channel in an FD communication system, includes a transceiver; and a processor configured to receive, through the transceiver from a BS, information about an uplink resource in which uplink reception is muted and perform uplink transmission in a remaining uplink resource, except for the uplink resource, while not performing uplink transmission in a period corresponding to the uplink resource, based on the received information.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 34A, 34B, 34C, and 34D illustrates a method for fixing and setting a position of a muting RE according to an embodiment;

DETAILED DESCRIPTION

Figure 1:
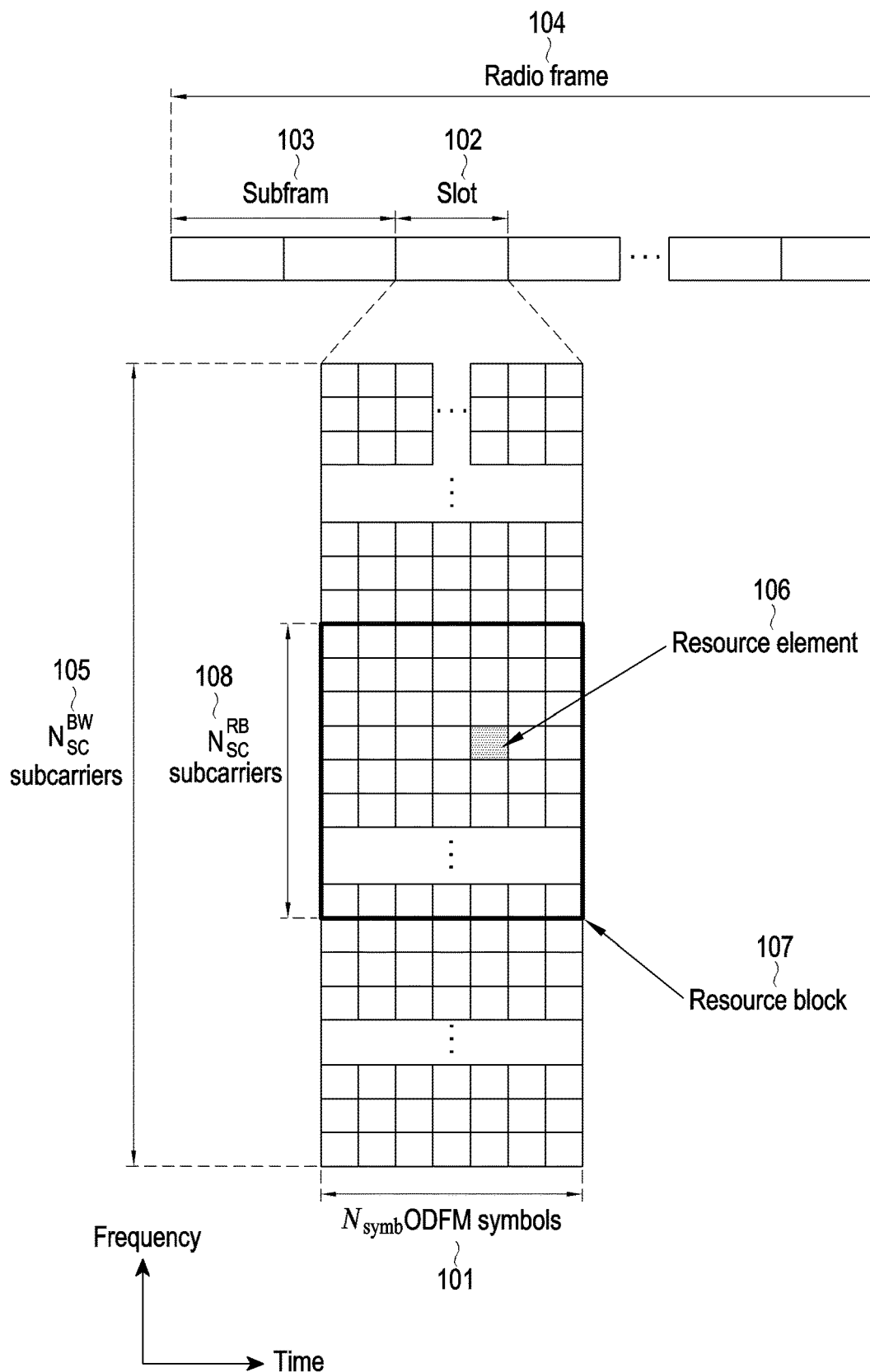
FIG. 1 illustrates a time-frequency domain in an LTE system.

Hereinafter, various embodiments of the disclosure are described in detail with reference to the accompanying drawings.

In describing embodiments, descriptions of technologies that are known in the art and are not directly related to the disclosure are omitted to avoid obscuring the disclosure in unnecessary details.

In the drawings, some elements may be exaggerated or schematically shown. The size of each element does not necessarily reflect the real size of the element. Additionally, the same reference numerals may be used to refer to the same or similar elements throughout the specification and drawings.

Advantages and features of the disclosure, and methods for achieving the same may be understood through the embodiments described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims.

The blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, the functions mentioned in the blocks may occur in different orders. For example, two blocks that are consecutively shown may be performed substantially simultaneously or in a reverse order depending on corresponding functions.

As used herein, the term "unit" may refer to a software element or a hardware element such as a field-programmable gate array (FPGA) or an application specific integrated circuit (ASIC). However, the term "unit" is not limited to a software or hardware element. A "unit" may be configured in a storage medium that may be addressed or may be configured to reproduce one or more processors. For example, a "unit" may include elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a "unit" may be combined with additional elements or may be split into sub elements or sub units. Further, an element or a "unit" may be implemented to reproduce one or more central processing units (CPUs) in a device or a security multimedia card. Additionally, a "unit" may include one or more processors.

The terms as used herein are defined considering the functions in the disclosure and may be replaced with other terms according to the intention or practice of the user or operator. Therefore, the terms should be defined based on the overall disclosure.

Hereinafter, a BS may be an entity allocating resource to a terminal, such as a gNode B, an eNode B, a Node B, a wireless access unit, a BS controller, or a node over network. The BS may be a network entity including at least one of an integrated access and backhaul-donor (IAB-donor), which is a gNB providing network access to UE(s) through a network of backhaul and access links in the 5G system, and an IAB-node, which is a RAN node supporting new radio (NR) backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

A terminal may include a UE, a mobile station (MS), a cellular phone, a smartphone, a computer, or a multimedia system capable of performing communication functions. Of course, a terminal is not limited to the above examples.

Described below are technologies related to receiving broadcast information from a BS by a UE in a wireless communication system. The disclosure relates to communication techniques for merging 5G communication systems with IoT technology to support a high data transmission rate in post-4G system and systems therefor. The disclosure can be applied for intelligent services based on 5G communication technology and IoT related technology (e.g., smart homes, smart buildings, smart cities, smart cars or connected cars, healthcare, digital education, retail businesses, security and safety related services, etc.).

Hereinafter, terms denoting broadcast information, terms denoting control information, communication coverage-related terms, terms denoting state variations (e.g., events), terms denoting network entities, terms denoting messages, or terms denoting device components are provided solely for illustration purposes. The disclosure is not limited to the terms, and other terms equivalent in technical concept may also be used.

For ease of description, hereinafter, some of the terms and names defined in the 3rd generation partnership project (3GPP) LTE or 3GPP NR standards may be used. However, the disclosure is not limited by such terms and names and may be likewise applicable to systems conforming to other standards.

Wireless communication systems have evolved beyond voice-centered services to broadband wireless communication systems to provide high data rate and high-quality packet data services, such as 3GPP high speed packet access (HSPA), LTE or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of such a broadband wireless communication system, an LTE system adopts orthogonal frequency division multiplexing (OFDM) for downlink and single carrier frequency division multiple access (SC-FDMA) for uplink. An uplink refers to a wireless link in which a UE transmits data or control signals to a BS, and a download refers to a wireless link in which a BS transmits data or control signals to a UE. Such a multiple access scheme allocates and operates time-frequency resources carrying data or control information per user not to overlap, i.e., to maintain orthogonality, to thereby differentiate each user's data or control information.

Post-LTE communication systems, e.g., NR systems, should reflect various needs of users and service providers in order to support services that meet various requirements. Services considered for 5G systems include, e.g., eMBB, mMTC, and URLLC.

eMBB aims to provide a further enhanced data transmission rate as compared with LTE, LTE-A, or LTE-pro. For example, eMBB for 5G communication systems should provide a peak data rate of 20 Gbps on download and a peak data rate of 10 Gbps on uplink in terms of one BS. The 5G communication system should also provide increased user perceived data rate of the UE. To meet such requirements, transmit (TX)/receive (RX) techniques, as well as MIMO, should be enhanced.

The data transmission rate required for 5G communication systems may be met by using a broader frequency bandwidth than 20 Mhz in a frequency band ranging 3 Ghz to 6 Ghz or a frequency band of 6 Ghz or more instead of the 2 Ghz band currently adopted in LTE.

mMTC is also considered to support application services, such as IoT, in the 5G system. To efficiently provide IoT, mMTC should support massive UEs in the cell, enhance the coverage of the UE and the battery time, and reduce UE costs. IoT terminals are attached to various sensors or devices to provide communication functionality, and thus, mMTC should support a number of UEs in each cell (e.g., 1,000,000 UEs/km$^2$). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life.

URLLC, as a cellular-based wireless communication service used for a specific purpose (i.e., mission-critical), may be a service used for remote control for robots or machinery, industrial automation, unmanned aerial vehicles, remote health care, and emergency alerts and may be required to provide communication that provides ultra-low latency and ultra-high reliability. For example, URLLC-supportive services should meet an air interface latency of less than 0.5 milliseconds simultaneously with a packet error rate of 10-5 or less. Thus, for URLLC-supportive services, the 5G communication system may be required to provide a shorter transmit time interval (TTI) than those for other services and allocate a broad resource in the frequency band. However, the aforementioned mMTC, URLLC, and eMBB are merely examples of different service types, and the service types to which the disclosure is applied are not limited to the above-described examples.

Services considered in the 5G system described above should be merged together based on one framework. In other words, for efficient resource management and control, the services may be integrated into a single system and controlled and transmitted, rather than being independently operated.

Although LTE, LTE-A, LTE Pro, or NR systems are described as examples in connection with embodiments of the disclosure, the disclosure may also be applied to other communication systems with a similar technical background or channel form. Further, embodiments of the disclosure may be modified in such a range as not to significantly depart from the scope of the disclosure under the determination by one of ordinary skill in the art and such modifications may be applicable to other communication systems.

FIG. 1 illustrates a time-frequency domain in an LTE system.

Referring to FIG. 1, the horizontal axis denotes the time domain, and the vertical axis denotes the frequency domain. In the time domain, the minimum transmission unit is an OFDM symbol 101, and $N_{symb}$ OFDM symbols 101 are included in one slot 102, and two slots are included in one subframe 103. The length of the slot 102 is 0.5 ms, and the length of the subframe 103 is 1.0 ms. The radio frame 104 is a time domain unit including ten subframes 103. In the frequency domain, the minimum transmission unit is sub-carrier 105, and the bandwidth of the overall system transmission band consists of a total of $N_{SC}^{BW}$ C. subcarriers 105.

The basic resource unit in the time-frequency domain is a RE 106, which may be represented with an OFDM symbol index and a subcarrier index. A resource block (RB) or physical RB (PRB) 107 is defined with $N_{symb}$ contiguous OFDM symbols 101 in the time domain and $N_{SC}^{RB}$ contiguous subcarriers 108 in the frequency domain. Accordingly, one RB 107 includes $N_{symb}$ x. $N_{SC}^{RB}$ REs 106. Generally, the minimum transmission unit of data is the RB 107. Generally, in the LTE system, $N_{symb}$=7 and $N_{SC}^{RB}$=12, and $N_{SC}^{BW}$ and $N_{SC}^{RB}$ are proportional to the bandwidth of system transmission band.

In the LTE system, the scheduling information on downlink data or uplink data is transferred through downlink control information (DCI) from the BS to the terminal. DCI may include information about whether the scheduling information is for uplink data or download data, whether the DCI is compact DCI of which the size of control information is small, whether spatial multiplexing using multiple antennas applies, or whether the DCI is for power control.

Further, a DCI format defined according to the above-described information may be applied and operated. For example, DCI format 1, which is the scheduling control information about download data, is configured to include the following pieces of control information.

Resource allocation type 0/1 flag: notifies whether resource allocation type is type 0 or type 1. Type 0 allocates resources in an RB group (RBG) units by applying bitmap scheme. In the LTE system, the basic unit of scheduling is an RB represented in time and frequency domain resources, and an RBG consists of a plurality of RBs and becomes the basic unit of scheduling in the type 0 scheme. Type 1 allows for allocation of a particular RB in the RBG.

RB assignment: indicates RB allocated for data transmission. Resource represented according to system bandwidth and resource allocation scheme is determined.

Modulation and coding scheme (MCS): indicates the size of transport block that is data to be transmitted and modulation scheme used for data transmission.

Hybrid automatic repeat request (HARQ) process number: indicates process number of HARQ.

New data indicator (NDI): indicates a HARQ initial transmission or re-transmission.

Redundancy version: indicates redundancy version of HARQ.

Transmit power control (TPC) command for physical uplink control channel (PUCCH): indicates TPC command for an uplink control channel, i.e., PUCCH.

The DCI undergoes channel coding and modulation and is transmitted through a downlink physical control channel, i.e., a physical downlink control channel (PDCCH).

A cyclic redundancy check (CRC) is added to the DCI message payload, and the CRC is scrambled with the radio network temporary identifier (RNTI), which is the identity of the UE. Different RNTIs are used for the purposes of the DCI message, e.g., UE-specific data transmission, power control command, or random access response (RAR). The RNTI is not explicitly transmitted, but the RNTI is included in the CRC calculation process and transmitted. Upon receiving the DCI message transmitted on the PDCCH, the UE identifies the CRC using the allocated RNTI, and when the CRC is identified to be correct, the UE may be aware that the message has been transmitted thereto.

Figure 2:
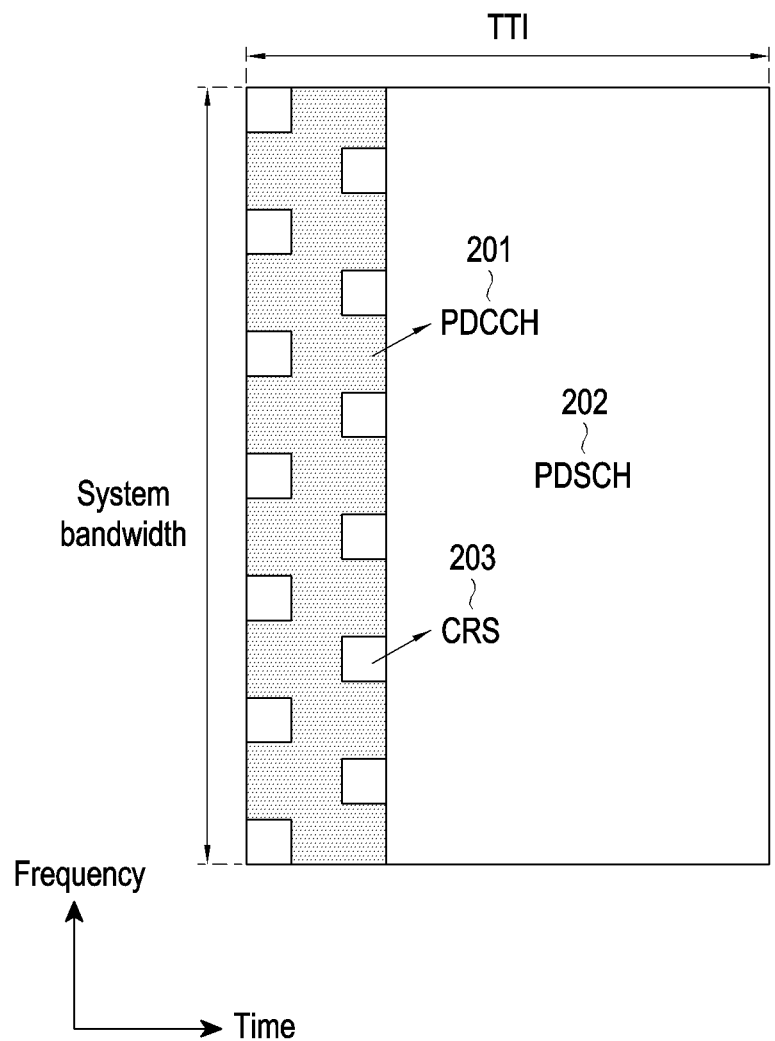
FIG. 2 illustrates a downlink control channel in an LTE system.

FIG. 2 illustrates a downlink control channel in an LTE system.

Referring to FIG. 2, a PDCCH 201 is time-multiplexed with the physical downlink shared channel (PDSCH) 202, which is a data transmission channel, and is transmitted over the overall system bandwidth. The region for the PDCCH 201 is represented with the number of OFDM symbols, and this is indicated to the UE via the control format indicator (CFI) that is transmitted via the physical CFI channel (PCFICH).

The PDCCH 201 may be allocated to the OFDM symbols that are positioned in the head of the subframe, allowing the UE to decode the download scheduling allocation as quick as possible. This provides an advantage of being able to reduce decoding latency for the PDSCH 202, i.e., the overall download transmission latency.

Since one PDCCH carries one DCI message, and multiple UEs may simultaneously be scheduled for the download and uplink, multiple PDCCHs may be simultaneously transmitted in each cell. As a reference signal for decoding the PDCCH 201, the cell-specific reference signal (CRS) 203 is used. The CRS 203 is transmitted in each subframe over the entire band, and the scrambling and resource mapping are varied depending on the cell identity (ID). Since the CRS 203 is a reference signal commonly used for all the UEs, UE-specific beamforming cannot be used. Accordingly, the multi-antenna TX scheme for LTE PDCCH is limited to open loop transmit diversity. The number of CRS ports is implicitly known to the UE from the decoding of the physical broadcast channel (PBCH).

The resource allocation of the PDCCH 201 is based on a control channel element (CCE), and one CCE is constituted of nine resource element groups (REGs), i.e., a total of 36 REs. The number of CCEs necessary for a particular PDCCH 201 may be 1, 2, 4, or 8, and this differs depending on the channel coding rate of the DCI message payload. As such, different numbers of CCEs are used to implement the link adaptation of the PDCCH 201.

The UE should detect a signal while it is unaware of the information about the PDCCH 201. LTE defines the search space that denotes a set of CCEs for blind decoding. The search space includes a plurality of sets in the aggregation level (AL) of each CCE, and this is not explicitly signaled but is implicitly defined via the function and subframe number by the identity of the UE. In each subframe, the UE decodes the PDCCH 201 for all possible resource candidates that may be created from the CCEs in the set search space and processes the information declared by the CRC to be valid for the UE.

The search space is divided into a UE-specific search space and a common search space. A predetermined group of UEs or all the UEs may investigate the common search space of the PDCCH 201 to receive cell-common control information, e.g., a paging message, or dynamic scheduling for system information (SI). For example, scheduling allocation information about the PDSCH 202 for transmitting system information block (SIB)-1 containing, e.g., cell service provider information may be received by investigating the common search space of the PDCCH 201.

In the LTE system, the overall PDCCH region is constituted of a CCE set in the logical region, and there is a search space constituted of a set of CCEs. The search space may be divided into a common search space and a UE-specific search space, and the search space for the LTE PDCCH is defined as shown in Table 1 according to the 3GPP standard.

TABLE 1

The set of PDCCH candidates to monitor are defined in terms of search spaces, where a search space $S_k^{(L)}$ at aggregation level $L \in \{1, 2, 4, 8\}$ is defined by a set of PDCCH candidates.

For each serving cell on which PDCCH is monitored, the CCEs corresponding to PDCCH candidate m of the search space $S_k^{(L)}$ are given by $$L\{(Y_k + m') \bmod \lfloor N_{CCE,k}/L \rfloor\} + i$$

where $Y_k$ is defined below, i = 0, ..., L − 1. For the common search space m' = m. For the PDCCH UE specific search space, for the serving cell on which PDCCH is monitored, if the monitoring UE is configured with carrier indicator field then m' = m + $M^{(L)}$ · $n_{CI}$ where $n_{CI}$ is the carrier indicator field value, else if the monitoring UE is not configured with carrier indicator field then m' = m, where m = 0, ..., $M^{(L)}$ − 1. $M^{(L)}$ is the number of PDCCH candidates to monitor in the given search space.

Note that the carrier indicator field value is the same as ServCellIndex

For the common search spaces, $Y_k$ is set to 0 for the two aggregation levels L = 4 and L = 8.

TABLE 1-continued

For the UE-specific search space $S_k^{(L)}$ at aggregation level$L$, the variable $Y_k$ is defined by $$Y_k = (A \cdot Y_{k-1}) \bmod D$$

where $Y_{-1} = n_{RNTI} \neq 0$, $A = 39827$, $D = 65537$ and $k = \left\lfloor \frac{n_s}{2} \right\rfloor$, $n_s$ is the slot number within a radio frame. The RNTI value used for $n_{RNTI}$ is defined in subclause 7.1 in downlink and subclause 8 in uplink.

According to the definition of the search space for the PDCCH set forth in Table 1 above, the UE-specific search space is not explicitly signaled but is implicitly defined via the subframe number and function by the UE identity (e.g., RNTI). In other words, the UE-specific search space may vary depending on the subframe number, meaning that it may vary depending on time. This addresses the problem that a particular UE among UEs cannot use the search space due to the other UEs (blocking issue).

According to an embodiment, if a certain UE cannot be scheduled in a subframe because all the CCEs that it investigates are already in use by other UEs scheduled in the same subframe, such issue may not occur in the next subframe because the search space varies over time. For example, although the UE-specific search spaces of UE #1 and UE #2 partially overlap each other in a particular subframe, the overlap may be predicted to differ in the next subframe because the UE-specific search space varies per subframe.

According to the definition of the search space for the PDCCH described above, the common search space is defined as a set of CCEs previously agreed on because a predetermined group or UEs or all the UEs should receive the PDCCH. That is, the common search space does not vary depending on the identity of the UE or subframe number. Although the common search space exists for transmission of various system messages, it may also be used to transmit the control information for individual UEs. Thus, the common search space may be used to address the UE's failure to be scheduled due to insufficient available resources in the UE-specific search space.

The search space is a set of candidate control channels constituted of CCEs that the UE needs to attempt to decode on the AL, and since there are several ALs to bundle up one, two, four, or eight CCEs, the UE has a plurality of search spaces. The number of PDCCH candidates that the UE should monitor in the search space defined as per the AL in the PDCCH of the LTE system is defined as shown in Table 2 below.

TABLE 2

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, the UE-specific search space supports AL {1, 2, 4, 8}, where it has {6, 6, 2, 2} PDCCH candidates, respectively. The common-specific search space supports AL {4, 8}, where it has {4, 2} PDCCH candidates, respectively. The common search space only supports {4, 8} ALs for making better the coverage property because the system message is generally required to reach the cell border.

The DCI transmitted in the common search space is defined only for particular DCI formats, e.g., 0/1A/3/3A/1C defined in the 3GPP standard, which are ones for the power control purpose for the UE group or system message. In the common search space, the DCI formats having spatial multiplexing are not supported. The download DCI format that should be decoded in the UE-specific search space is varied depending on the transmission mode set for the UE. Since the transmission mode is set via radio resource control (RRC) signaling, the exact subframe number as to whether the setting is effective for the UE is not designated. Accordingly, the UE may be operated not to lose communication by always performing decoding on DCI format 1A regardless of the transmission mode.

Figure 3:
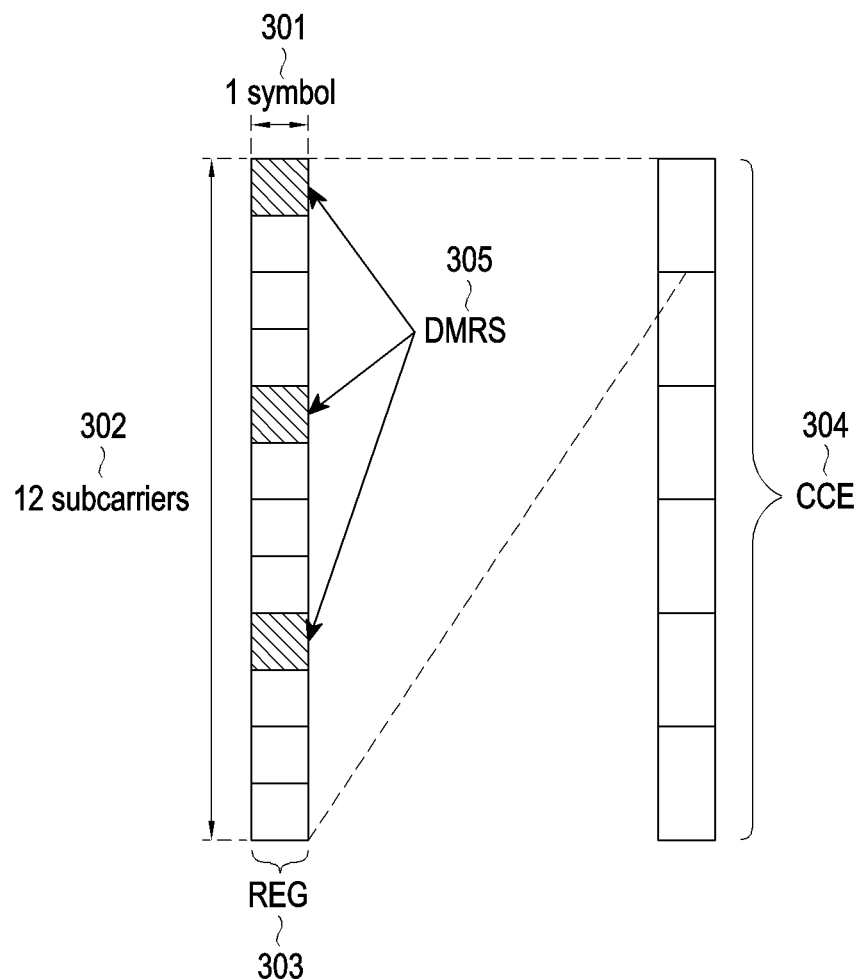
FIG. 3 illustrates a transmission resource of a downlink control channel in a 5G system.

FIG. 3 illustrates is a view illustrating a transmission resource of a downlink control channel in a 5G system. More specifically, FIG. 3 illustrates a basic unit of time and frequency resource constituting a download control channel in 5G system.

Referring to FIG. 3, the basic unit (i.e., the REG) of the time and frequency resource constituting the control channel (i.e., PDCCH) includes one OFDM symbol 301 along the time axis and 12 subcarriers 302 along the frequency axis— i.e., one RB. By assuming one OFDM symbol 301 as the basic unit in the time domain in constituting the basic unit of the control channel, the data channel and the control channel may be time-multiplexed in one subframe. By leaving the control channel ahead of the data channel (i.e., PDSCH), the user's processing time may be reduced, making it easier to meet the latency time requirements. By setting the basic unit in the frequency domain for the control channel to one RB 302, frequency multiplexing between the control channel and the data channel may be carried out more efficiently.

Referring to FIG. 3, a control channel area (control resource set (CORESET) may be set in various sizes by concatenating the REGs 303. For example, if the basic unit for allocation of a downlink control channel in 5G is a CCE 304, one CCE 304 may be composed of multiple REGs 303. When the REG 303 of FIG. 3 includes 12 REs, and one CCE 304 includes six REGs 303, the CCE 304 includes 72 REs. When the download control region (e.g., CORESET) is set, the region may be constituted of multiple CCEs 304, and a particular download control channel may be mapped to one or more CCEs 304 according to the AL in the control region and be transmitted. The CCEs 304 in the control region may be distinguished with numbers in which case the numbers may be assigned according to a logical mapping scheme.

The basic unit of the downlink control channel, i.e., REG 303, shown in FIG. 3 may include all of the REs where the DCI is mapped and the REs where the demodulation reference signal (DMRS) 305, which is a reference signal for decoding the same, is mapped.

As shown in FIG. 3, the DMRS 305 may be transmitted in three REs in one REG 303. Since the DMRS 305 is transmitted using the same precoding as the control signal mapped in the REG 303, the UE may decode the control information even without information about what precoding has been applied by the BS.

Figure 4:
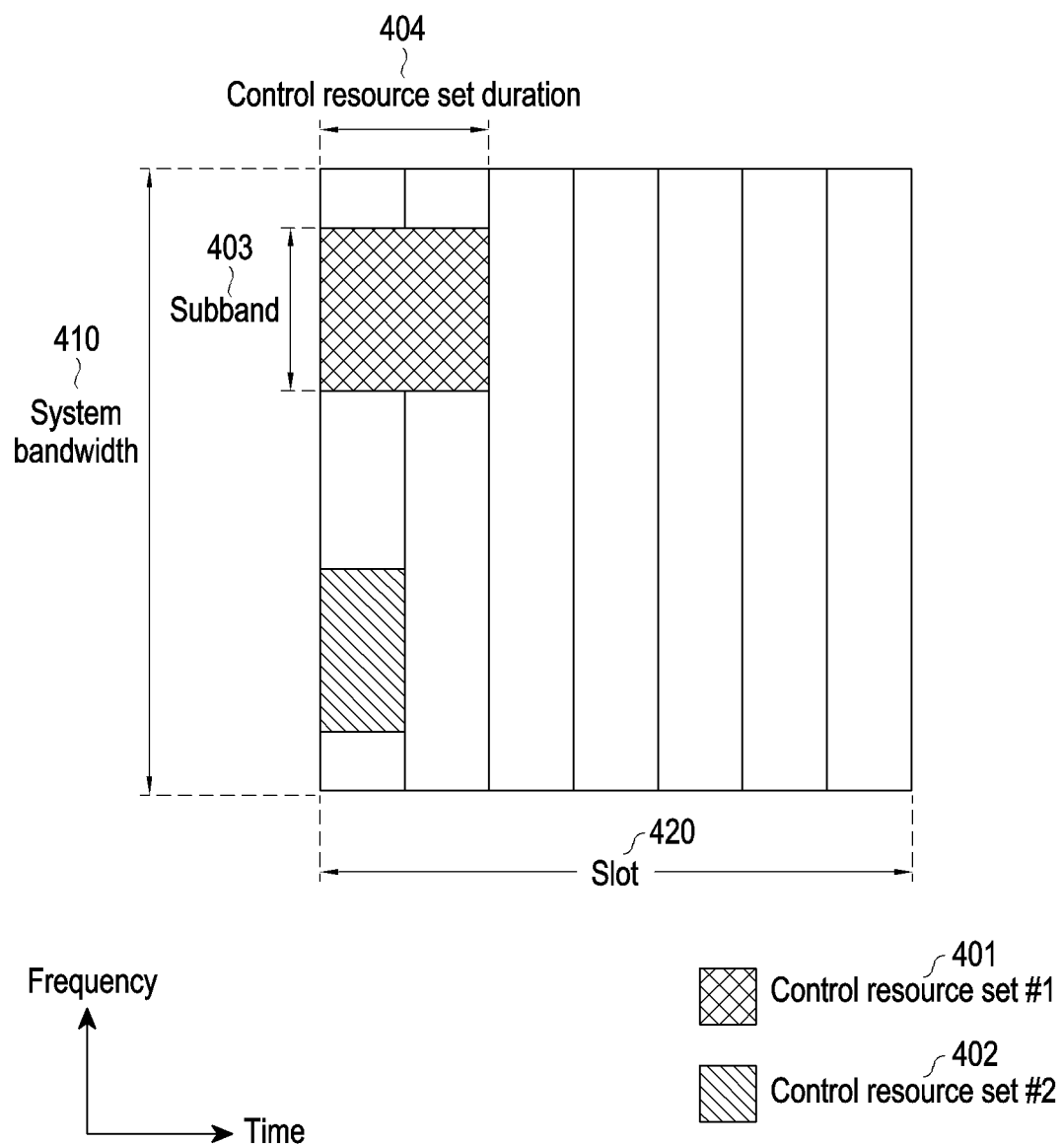
FIG. 4 illustrates a configuration for a control region in a 5G system.

FIG. 4 illustrates a configuration for a control region in a 5G system. Specifically, FIG. 4 illustrates a CORESET in which a downlink control channel is transmitted in a 5G system.

Referring to FIG. 4, one slot includes 7 OFDM symbols. Two control regions (control region #1 401 and control region #2 402) are set in one slot 420 in the time domain and the system bandwidth 410 in the frequency domain. The frequency of the control regions 401 and 402 may be set as specific sub band 403 in the entire system bandwidth 410. The time length of the control regions 401 and 402 may be set to one or more OFDM symbols, and the time length of the control regions 401 and 402 may also be defined as CORESET duration 404. In FIG. 4, control region #1 401 is set with a control region length of two symbols, and control region #4 402 is set with a control region length of one symbol.

The control region in the 5G communication system described above may be set in the UE by the BS through higher layer signaling (e.g., SI, master information block (MIB), or RRC signaling). Setting a control region in a UE includes providing the UE with information such as the location of the control region, sub band, resource allocation of the control region, and CORESET duration. Configuration information for the control region may include, e.g., information shown in Table 3 below.

TABLE 3

- configuration information 1. frequency domain RB allocation information
- configuration information 2. control region start symbol
- configuration information 3. control region symbol length
- configuration information 4. REG bundling size (2, 3 or 6)
- configuration information 5. transmission mode (interleaved transmission sheme of non-
- interleaved transmission scheme)
- configuration information 6. DMRA configuration information (precoder granularity)
- configuration information 7. search space type (common search spade, group-common search space, UE-specific search space)
- configuration information 8. DCI format to be monitored in corresponding control region
- others The configuration information set forth in Table 3 is an example, and other various pieces of information for transmitting the downlink control channel may be set in the UE.

In a 5G system, scheduling information about a physical uplink shared channel (PUSCH) or a PDSCH is transferred from the BS to the UE through DCI.

The UE may monitor the DCI format for fallback and the DCI format for non-fallback for PUSCH or PDSCH. The fallback DCI format may be composed of fixed fields between the BS and the UE, and the non-fallback DCI format may include configurable fields.

The fallback DCI for PUSCH scheduling may include the information set forth in Table 4 below.

TABLE 4

Identifier for DCI formats - [1] bit

Frequency domain resource assignment - $\left[\lceil \log_2(N_{RB}^{UL,BWP}(N_{RB}^{UL,BWP}+1)/2) \rceil\right]$ bits Time domain resource assignment - X bits Frequency hopping flag - 1 bit.

Modulation and coding scheme - [5] bits

New data indicator - 1 bit

Redundancy version - [2] bits

HARQ process number - [4] bits

TPC command for scheduled PUSCH - [2] bits

UL/SUL indicator - 0 or 1 bit

The non-fallback DCI for PUSCH scheduling may include the information set forth in Table 5 below.

TABLE 5

Carrier indicator - 0 or 3 bits
Identifier for DC formats - [1] bits
Bandwidth part indicator - 0, 1 or 2 bits
Frequency domain resource assignment For resource allocation type 0, $\lceil N_{RB}^{UL,BWP}/P \rceil$ bits For resource allocation type 1, $\lceil \log_2(N_{RB}^{UL,BWP}(N_{RB}^{UL,BWP}+1)/2) \rceil$ bits Time domain resource assignment - 1, 2, 3, or 4 bits
VRB-to-PRB mapping - 0 or 1 bit only for resource allocation type 1.
    0 bit if only resource allocation type 0 is configured;
    1 bit otherwise.
Frequency hopping flag - 0 or 1 bit only for resource allocation type 1.
    0 bit if only resource allocation type 0 is configured;
    1 bit otherwise.
Modulation and coding scheme - 5 bits
New data indicator - 1 bit
Redundancy version - 2 bits as defined in section xx of [6, TS38.214]
HARQ process number - 4 bits
1st downlink assignment index - 1 or 2 bits
    1 bit for semi-static HARQ ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks.
    0 bit otherwise.
TPC command for scheduled PUSCH - 2 bits SRS resource indicator - $\left\lceil \log_2\left(\sum_{k=1}^{L_{max}\Sigma} \binom{N_{SRS}}{k}\right) \right\rceil$ or $\lceil \log_2(N_{SRS}) \rceil$ bits $\left\lceil \log_2\left(\sum_{k=1}^{L_{max}\Sigma} \binom{N_{SRS}}{k}\right) \right\rceil$ bits for non-codebook based PUSCH transmission;

$\lceil \log(N_{SRS}) \rceil$ bits for codebook based PUSCH transmission..
Precoding information and number of layers-up to 6 bits
Antenna ports - up to 5 bits
SRS drequest - 2 bits
CSI request - 0, 1,2 3,4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit The fallback DCI for PDSCH scheduling may include the information set forth in Table 6 below.

TABLE 6

- Identifier for DCI formats - [1] bit
- Frequency domain resource assignment -[⌈lo(N (N + 1)/2)⌉ ] bits
- Time domain resource assignment - X bits
- VRB-to-PRB mapping - 1 bit.
- Modulation and coding scheme - [5] bits
- New data indicator - 1 bit
- Redundancy version - [2] bits
- HARQ process number - [4] bits
- Downlink assignment index - 2 bits
- TPC command for scheduled PUCCH - [2] bits
- PUCCH resource indicator - [2] bits
- PDSCH-to-HARQ feedback timing indicator - [3] bits The non-fallback DCI for PDSCH scheduling may include the information set forth in Table 7 below.

TABLE 7

Carrier indicator - 0 or 3 bits
Identifier for DCI formats - [1] bits
Bandwidth part indicator - 0, 1 or 2 bits
Frequency domain resource assignment For resource allocation type 0, $\lceil N_{RB}^{DL,BWP}/P \rceil$ bits For resource allocation type 1, $\lceil \log_2(N_{RB}^{DL,BWP}(N_{RB}^{DL,BWP}+1)/2) \rceil$ bits Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 1 bit
Rate matching indicator - 0, 1, 2 bits
ZP CSI-RS trigger - X bits
For transport block 1:
Modulation and coding scheme - 5 bits
New data indicator - 1 bit
Redundancy version - 2 bits TABLE 7-continued For transport block 2:
   Modulation and coding scheme - 5 bits
   New data indicator - 1 bit
   Redundancy version - 2 bits
   HARQ process number - 4 bits
   Downlink assignment index - 0 or 4 bits
   TPC command for scheduled PUCCH - 2 bits
   PUCCH resource indicator
   PDSCH-to-HARQ_feedback timing indicator - 3 bits
   Antenna ports - up to 5 bits
   Transmission configuration indication - 3 bits
   SRS request - 2 bits
   CBG transmission information - 0, 2, 4, 6, or 8 bits
   CBG flushing out information - 0 or 1 bit
   DMRS sequence initialization - 0 or 1 bit The DCI undergoes channel coding and modulation and may be transmitted through a PDCCH. A CRC is added to the DCI message payload, and the CRC is scrambled with the RNTI that is the identity of the UE.

Different RNTIs are used for the purposes of the DCI message, e.g., UE-specific data transmission, power control command, or RAR. The RNTI is not explicitly transmitted, but the RNTI is included in the CRC calculation process and transmitted. If the UE receives the DCI message transmitted on the PDCCH, the UE may identify the CRC using the allocated RNTI. If the result of identifying the CRC is correct, the UE may know that the message is transmitted to the UE.

For example, DCI scheduling a PDSCH for SI may be scrambled to SI-RNTI. The DCI scheduling a PDSCH for an RAR message may be scrambled to RA-RNTI. The DCI scheduling a PDSCH for a paging message may be scrambled with P-RNTI. The DCI providing a slot format indicator (SFI) may be scrambled to SFI-RNTI. The DCI providing TPC may be scrambled to TPC-RNTI. The DCI for scheduling a UE-specific PDSCH or PUSCH may be scrambled with cell RNTI (C-RNTI).

If a specific UE receives a data channel, i.e., a PUSCH or a PDSCH, scheduled through the PDCCH, data is transmitted/received along with DMRS in the scheduled resource region.

Figure 5:
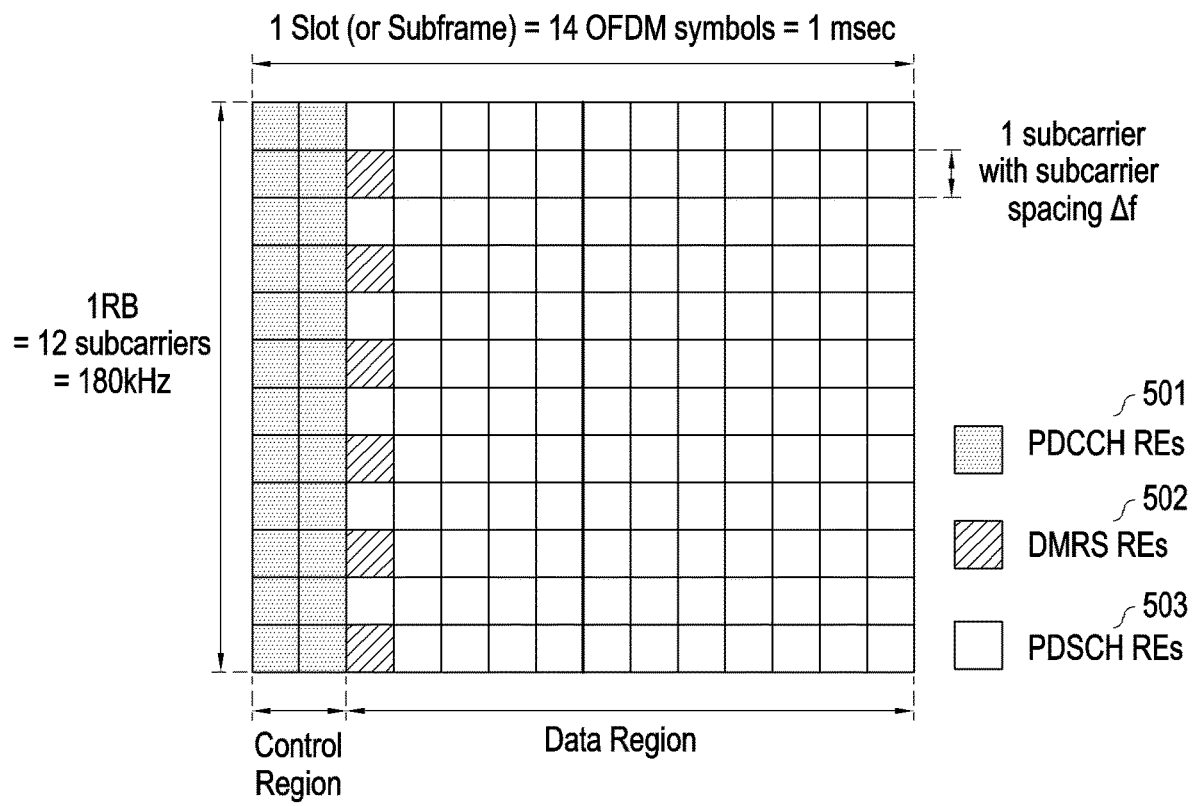
FIG. 5 illustrates a downlink RB structure for use in a 5G system.

FIG. 5 illustrates a downlink RB structure for use in a 5G system.

Referring to FIG. 5, a specific UE uses 14 OFDM symbols as one slot (or subframe) in a downlink, the PDCCH is transmitted in the first two OFDM symbols, and the DMRS is transmitted in the third symbol. In a specific RB where the PDSCH is scheduled through the PDCCH, the PDSCH is transmitted, with data mapped to the REs, in which no DMRS is transmitted in the third symbol, and the REs of the fourth to last symbols. Subcarrier spacing $\Delta f$ represented in FIG. 5 is 15 kHz in the LTE/LTE-A system and one of {15, 30, 60, 120, 240, 480} kHz in the 5G system.

In a cellular system, the BS should transmit a reference signal to measure the downlink channel status. In a 3GPP LTE-A system, the UE may measure the channel status between the UE and the BS using the CRS or channel state information reference signal (CSI-RS) that the BS transmits.

The channel state should be measured considering various factors, and the measured channel state may include an amount of interference in downlink. The amount of interference in the downlink may include interference signals and thermal noise generated by (an antenna belonging to) an adjacent BS. The amount of interference in the downlink is important for the UE to determine the downlink channel condition. For example, when a BS with one transmit antenna transmits a signal to a UE with one receive antenna, the UE should determine Es/Io by determining the per-symbol energy (Es), which may be received via downlink in the reference signal received from the BS, and the amount of interference (Io), which is to be simultaneously received in the interval of receiving the symbol. The determined Es/Io may be converted into a data transmission speed or a value corresponding to the data transmission speed and is transmitted, in the form of a channel quality indicator (CQI), to the BS and may be used to determine at what data transmission speed the BS is to transmit data to the UE.

More specifically, in the LTE-A system, the UE feedbacks information on the channel status of downlink to the BS so that it may be utilized for downlink scheduling by the BS. That is, the UE measures the reference signal transmitted from the BS on a downlink and feedbacks the information extracted therefrom to the BS in a form as defined in the LTE-LTE-A standards. As described above, the information fed back by the UE in LTE/LTE-A may be referred to as channel state information (CSI), and the CSI may include the following information:

Rank indicator (RI): the number of spatial layers that may be received by the UE in the current channel status;

Precoder matrix indicator (PMI): an indicator for a precoding matrix favored by the UE in the current channel status; and CQI: the maximum data rate at which the UE may perform reception in the current channel status.

The CQI may be replaced with the signal-to-interference plus noise ratio (SINR), the maximum error correction code rate and modulation scheme, or data efficiency per frequency which may be utilized similar to the maximum data rate.

The RI, PMI, and CQI are associated with one another. For example, a different precoding matrix, as supported in LTE/LTE-A, is defined per rank. Accordingly, the PMI value X when the RI is 1 and the PMI value X when the RI is 2 may be interpreted differently.

Further, it is assumed that when the UE determines the CQI, the PMI value X, which the UE has reported to the BS, has also applied. That is, reporting RI_X, PMI_Y, and CQI_Z to the BS by the UE is equivalent to reporting that the UE is able to receive the data rate corresponding to CQI_Z when the rank is RI_X, and PMI is PMI_Y. As such, the UE assumes the transmission scheme that is to be performed for the BS when computing the CQI, thereby allowing the securing of the optimized performance upon attending actual transmission in the corresponding transmission scheme.

In LTE/LTE-A, RI, PMI, and CQI, which are CSI fed back by the UE, may be fed back periodically or aperiodically. When the BS is to aperiodically obtain CSI about a specific UE, the BS may be configured to perform aperiodic feedback using the aperiodic feedback indicator (or CSI request field or CSI request information) contained in the DCI about the UE. Further, if receiving the indicator set to perform aperiodic feedback in the nth subframe, the UE may include aperiodic feedback information (or CSI) in data transmission in the n+kth subframe and perform uplink transmission. Here, k is a parameter defined in the 3GPP LTE release 11 standards, and this is 4 for frequency division duplexing (FDD) and may be defined as shown in Table 8 below for time division duplexing (TDD).

TABLE 8 k for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7— | — |

When aperiodic feedback is set, feedback information (or CSI) may include RI, PMI, and CQI, and RI and PMI may not be fed back depending on feedback configuration (or channel state report configuration).

In the disclosure, a same-band (in-band) FD (hereinafter, simply referred to as "FD") system refers to a system in which an uplink signal and a downlink signal may be simultaneously transmitted in the same band, same time resource, unlike the TDD or the FDD system. In other words, in the FD system, uplink and downlink signals may be mixed in the same cell, causing interference. In this case, the operation of the in-band FD system may include uplink or downlink alone as necessary or may include both the uplink and the downlink.

Further, transmission interference in the same band FD system may include leakage due to signals, as well as signals transmitted in the band. Further, FD operation (communication) may be performed only in some of the used bands and may be carried out over the entire band. It is described herein that in the FD system, simultaneous transmission occurs in the transmission unit and reception unit belonging to one node (e.g., a BS, UE, or IAB node) but, although the transmission unit and the reception unit belong to different nodes, such simultaneous transmission includes FD operation between the different nodes if information for FD operation may be shared through mutual information sharing.

Additional types of interference that appear as FD system is used are classified into two types, self-interference and crosslink interference.

The self-interference refers to interference caused at one node A when the node A receives a signal from another node B. In this case, the node may be a BS, UE, IAB node, or one of other various communication entities. Although entities recognized as one node are physically separated, they may be recognized as a single node if wired or wirelessly connected to share information with each other. If a BS is composed of a distributed unit (DU) and a remote unit (RU), SIC and measurement operation may be applied to interference caused by other RUs. Even when the uplink BS and the downlink BS are different from each other in the distributed MIMO operation, the SIC and measurement operation may be applied.

Therefore, self-interference may be understood as interference between two different nodes that may share information with each other. Further, self-interference may include signals received in a different band as well as signals received in the same band. Self-interference may also include out-of-band radiations caused by signal transmission in other bands. Since self-interference causes transmission and reception in a short distance as compared with a desired signal, it significantly reduces SINR of the desired signal.

Therefore, the transmission performance of the FD system is greatly affected by the performance of SIC technology.

Crosslink interference includes interference caused from downlink transmission of another BS received in the same band when a BS receives an uplink signal from the UE and interference caused from another UE's uplink transmission, when the UE receives a downlink signal from the stations. In the case of crosslink interference caused by the uplink receiving stations from adaptation layer transmission of another stations, the distance from the interference transmission end to the interference reception end is typically larger than the distance from the UE, transmitting a signal to the stations, the reception end of the stations, but the interference transmission power of the interference transmission end is generally larger by 10-20 dB or more than the transmission power of the UE. Thus, it may significantly affect the reception SINR performance of the UE's uplink desired signal received by the stations.

Further, the downlink signal receiving UE may receive crosslink interference from another UE using uplink in the same band. In this case, if the distance between the interfering UE and the downlink signal receiving UE is meaningfully shorter than the distance between the BS and the downlink signal receiving UE, it is possible to reduce the UE's downlink signal reception SINR performance. In this case, "meaningfully short" indicates that the reception power of interference with the downlink signal receiving UE by the uplink signal transmitting UE is larger than or similar to the reception power from the BS by the downlink signal receiving UE so that it is short enough to be able to reduce the UE's downlink reception SINR performance.

Types of FD systems in cellular-based mobile communication systems may include one type in which only the BS supports SIC for supporting FD operation (communication), and another type in which both the BS and the UE support SIC. SIC is not considered for the UE because the BS may implement the SIC function, such as separation SIC, radio frequency (RF)-circuit SIC, and digital SIC, more easily than the UE, in light of the form factor size and circuit structure.

The FD system considered herein is of a type that only the BS comes with the SIC function as default, but the disclosure may apply likewise where the UE and the BS both have SIC functions. Accordingly, the term "UE" or "BS" below not only denotes one BS or one UE, but may also be appreciated as various types of communication devices equipped with a transmission/reception function, and they may mean different transmission/reception devices performing transmission/reception.

Figure 6:
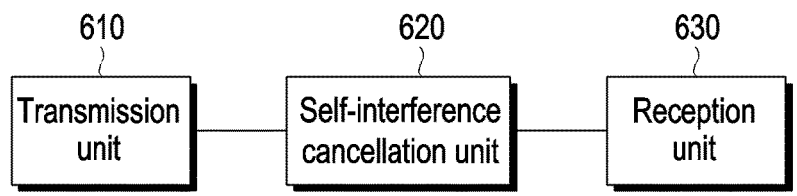
FIG. 6 illustrates a communication device having a self-interference cancellation (SIC) function in an FD system according to an embodiment.

FIG. 6 illustrates a communication device having a SIC function in an FD system according to an embodiment.

Referring to FIG. 6, the structure of the communication device is applicable to the BS and the UE in the same manner and does not specify any one structure of the BS and the UE. As it is assumed as default that the BS configures the FD system and is equipped with SIC, the communication device is assumed to be a BS in describing embodiments of the disclosure for convenience of description.

The communication device includes a transmission unit 610 for transmitting downlink signals to the UE, a SIC unit 620 for SIC, and a reception unit 630 for receiving uplink signals from the UE. The detailed configuration method for each component of the BS may vary depending on methods for implementing the BS. As described above, the communication device may correspond to a UE. The UE may include a transmission unit 610 for transmitting uplink signals to the BS, a SIC unit 620 for SIC, and a reception unit 630 for receiving downlink signals from the BS. The transmission unit 610 and the reception unit 630 may be referred to as transmitter and receiver, respectively, and the transmitter and the receiver may be implemented as a transceiver for performing transmission and reception functions. The transceiver may perform both transmission and reception depending on the FD operation. The SIC unit 620 may be implemented in a processor that controls the operations of the BS or UE, related to SIC, according to various embodiments of the disclosure described below. The BS or UE that does not perform SIC may be implemented to include a transceiver for transmission/reception and a processor to control the operation of the transceiver as does a typical communication device.

Figure 7A:
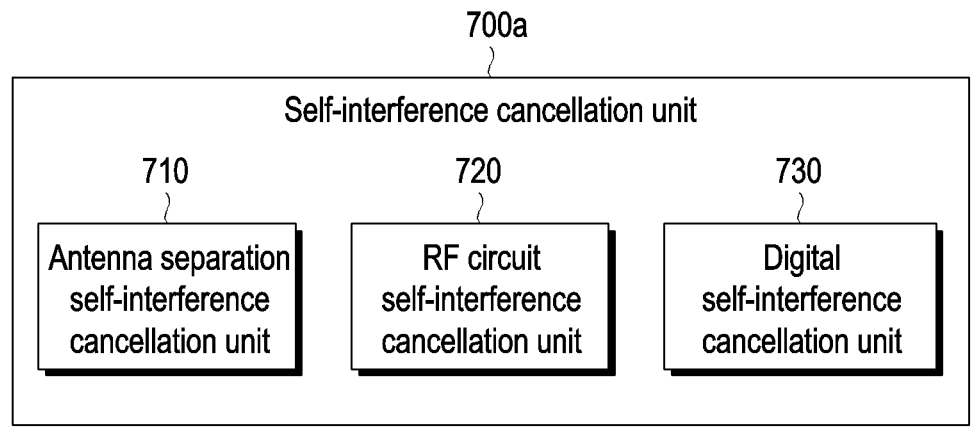
FIGS. 7A and 7B illustrate a SIC unit of a communication device in an FD system according to an embodiment.
Figure 7B:
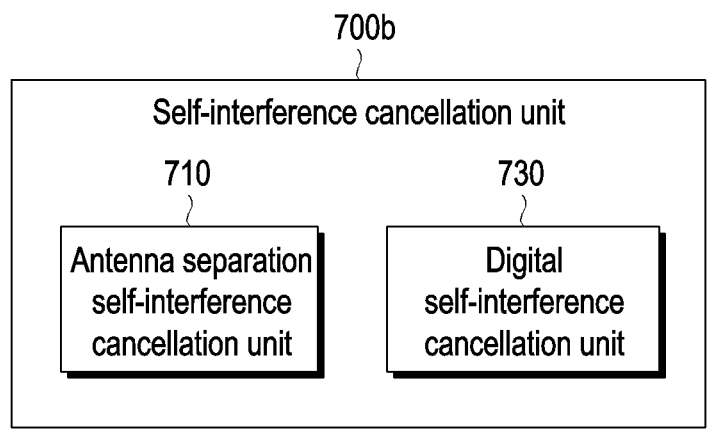

FIGS. 7A and 7B illustrate a SIC unit according to an embodiment.

Referring to FIG. 7A, a SIC unit 700a is an example of a configuration of the SIC unit 620 of FIG. 6. The SIC unit 700a may perform the above-described SIC in the BS or the UE. The SIC unit 700a includes an antenna separation SIC unit 710, an RF-circuit SIC unit 720, and a digital SIC unit 730. However, the configuration of the SIC unit 700a is not limited to those described above.

Referring to FIG. 7B, a SIC unit 700b is an example of another configuration of the SIC unit 620 of FIG. 6. The SIC unit 700b may include an antenna separation SIC unit 710 and a digital SIC unit 730, excluding the RF-circuit SIC unit 720 from the configuration of the SIC unit 700a of FIG. 7A. The antenna separation SIC unit 710 may also be excluded from the SIC units 700a and 700b as necessary. Further, if necessary, the communication device 600 may perform transmission/reception without operating the SIC units 700a and 700b.

Further, in FIGS. 7A and 7B, at least one of the antenna separation SIC unit 710, the RF circuit SIC unit 720, and the digital SIC unit 730 may demodulate the self-interference signal and then support the function of SIC of removing the self-interference signal.

Described below in detail are operations of the antenna separation SIC unit 710, RF-circuit SIC unit 720, and digital SIC unit 730.

The antenna separation SIC unit 710 may physically separate the antennas of the transmitter and receiver of the BS so that signals with sufficiently attenuated self-interference are received by the receiver of the BS. Physically separating the antenna of the transmitter and the antenna of the receiver in the BS may include separating the antenna of the transmitter and the antenna of the receiver using a separation method using destructive interference of antennas, a method using a cycler in the same antenna, a method using a cross-pole antenna, or a method using an isolator to allow the downlink signal from the transmitter of the BS to be received by the receiver of the BS, which receives uplink signals, with reduced interference influence. However, the physical separation is not limited to the enumerated examples but may rather adopt other various separation methods capable of reducing interference influence on the uplink signal by the downlink signal from the BS.

The RF-circuit SIC unit 720 may attenuate the strength of the self-interference signal before the self-interference signal is quantified in an analog-to-digital converter (ADC) connected with the RF circuit of the communication device. The RF circuit of the RF-circuit SIC unit 720 may simulate the channel that was experienced by the self-interference signal which is the self-interference signal transmitted from the transmitter of the BS, passing through the radio channel and the antenna separation SIC unit 710, and arriving at the RF-circuit SIC unit 720.

For example, the reception signal y (t), which passes through the antenna separation SIC unit 710 and the radio channel, for the analog domain transmission signal x(t) of the BS may be expressed as shown in Equation (1) below.

$$y(t)=x(t)*h(t)+n(t) \quad (1)$$

In Equation (1), h(t) denotes the time domain impulse response of the radio channel and the antenna separation SIC unit 710, and n (t) denotes white noise. In this case, the RF circuit of the RF-circuit SIC unit 720 may generate a similar channel h'(t) (i.e., self-interference channel) that simulates h(t), using a time delay module, a phase shift module, or an amp module. Thereafter, the transmission signal x(t) obtainable from the transmitter of the BS may be rendered to pass through the RF circuit, simulating the self-interference signal. The simulated self-interference signal is added with the minus sign and is added to the received self-interference signal and, resultantly, attenuates the self-interference signal as shown in Equation (2) below.

$$y''(t)=x(t)*h(t)-x(t)*h'(t)+n(t) \quad (2)$$

The bandwidth in which the performance of the RF-circuit SIC unit 720 is maintained may vary depending on the bandwidth of the above-described components of the RF circuit, e.g., the time delay module, phase shift module, or amp module. For example, if the bandwidth where the performance of the RF-circuit SIC unit 720 is maintained is smaller than the system bandwidth, such a limit to the bandwidth of the RF-circuit SIC unit 720 comes from limitations in the RF circuit.

The digital SIC unit 720 may cancel the self-interference signal X[n] from signal Y[n], which is the frequency-domain signal into which signal y'(t) having passed through the RF circuit SIC unit 720 (or the antenna separation SIC unit 710) is converted by the ADC. For example, as in Equation (3) below, the digital domain channel H[n] experienced by transmission signal X[n] is estimated and subtracted from reception signal Y[n]. In this case, the performance of the digital SIC unit is determined by the similarity between the estimated channel H'[n] and the actual channel H[n]. That is, as the similarity between H'[n] and H[n] increases, the performance of the digital SIC unit increases.

$$Y'[n]=X[n]H[n]-X[n]H'[n]+n(t) \quad (3)$$

Embodiment 1

Embodiment 1 relates to a method for performing FD operation when a BS configures a beam using multiple antenna elements and provides a UE with a service using the beam.

Figure 8:
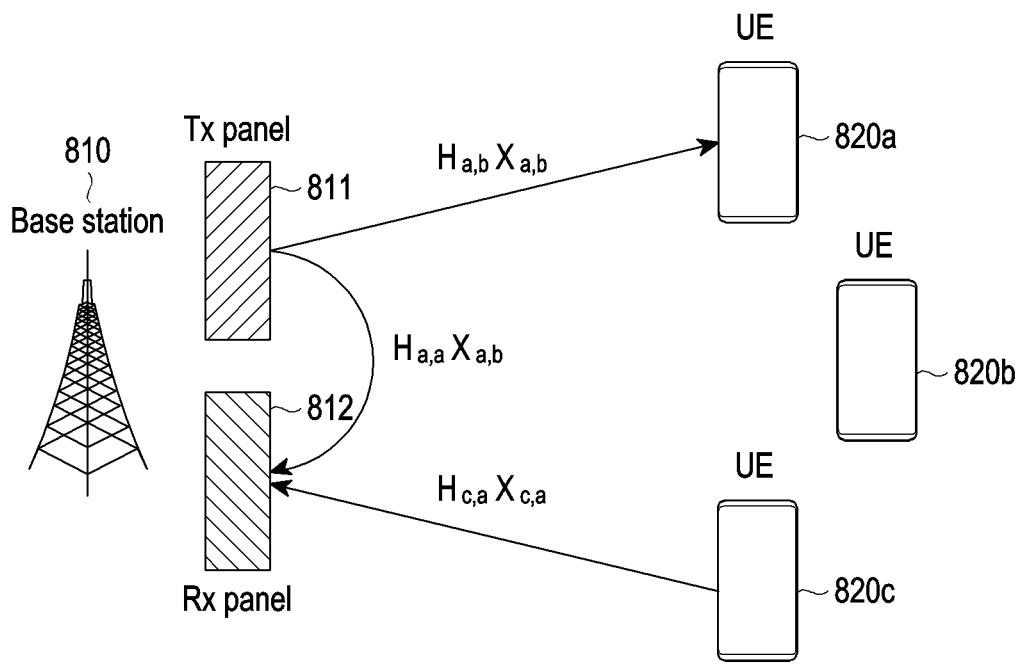
FIG. 8 illustrates a BS performing FD communication to a plurality of UEs using an antenna panel according to an embodiment.

FIG. 8 illustrates a BS performing FD communication to a plurality of UEs using an antenna panel according to an embodiment. For example, the BS 810 and at least one of the UEs, 820a, 820b, and 820c of FIG. 8 may have the same configuration as the communication device of FIG. 6.

Referring to FIG. 8, the BS 810 may configure a beam by the antenna elements constituting the Tx panel 811 to provide services to the UEs 820a, 820b, and 820c. The UEs 820a, 820b, and 820c may perform transmission/reception with the BS 810 through different beams depending on influence by radio channels or relative positions from the BS 810. Accordingly, when the UEs 820a, 820b, and 820c and the BS 810 communicate with each other, they perform transmission/reception using beams appropriate for variations in the channel.

More specifically, FIG. 8 illustrates an example in which the BS 810 receives an uplink signal from the UE 820c while transmitting a downlink signal to the UE 820a.

The signal transmitted from the BS 810 to the UE 820a is denoted by X_(a,b), and the channel H_(a,b) denotes the channel between the UE 820a and the BS 810. The channel H_(a,b) includes the effect of the beam formed using the Tx panel 811 by the BS 810 and the effect of the beam formed using the Rx panel of the UE 820a. Accordingly, when the UE 820a changes the beam or the BS 810 changes the beam, the corresponding channel has a different value. Further, the channel H_(a) may have a different value depending on at least one of a change in the channel environment between the BS 810 and the UE 820a, e.g., a change in air temperature, a change in humidity, a change in a reflector, a change in the position of the UE/BS, and a change in the angle of the Rx panel of the UE.

In the example of FIG. 8, the uplink signal transmitted from the UE 820c to the BS 810 is denoted by X_(c,a), and the channel H_(c,a) is the channel between the UE 820c and the BS 810. In this case, the channel H_(c,a) is a channel including the effect of the beam formed using the Rx panel 812 by the BS 810 and the effect of the beam formed using the Tx panel of the UE 820c. Accordingly, when the UE 820c changes the beam or the BS 810 changes the beam, the corresponding channel has a different value. Further, the channel H_(c,a) may have a different value depending on at least one of a change in the channel environment between the BS 810 and the UE 820c, e.g., a change in air temperature, a change in humidity, a change in a reflector, a change in the position of the UE/BS, and a change in the angle of the Rx panel of the UE.

In the example of FIG. 8, the self-interference channel experienced when the Rx panel 812 of the BS 810 receives the uplink signal due to the downlink signal from the Tx panel 811 of the BS 810 is denoted as H_(a,a). In this case, the self-interference channel H_(a,a) may be a channel including the effect of the receive beam formed using the Rx panel 812 by the BS 810 and the effect of the transmit beam formed using the Tx panel 811 by the BS 810. Accordingly, when the BS 810 changes the transmit beam or the BS 810 changes the receive beam, the self-interference channel H_(a,a) has a different value. Further, the self-interference channel H_(a, a) may have a different value depending on at least one of changes in channel environment between the Tx panel 811 and Rx panel 812 of the BS 810, e.g., changes in air temperature, humidity, reflector, or position of the BS 910.

In the example of FIG. 8, the self-interference signal received by the BS 810 is denoted by X_(a,b). The self-interference signal refers to the transmission signal transmitted by the BS 810 to the UE 820a, and when a signal is transmitted to another UE (e.g., the UE 820b), the self-interference signal may be changed to another signal.

In the example of FIG. 8, each of the Tx panel 811 and the Rx panel 812 of the BS is shown as only one but, even when the BS operates multiple Tx panels or multiple Rx panels, embodiments of the disclosure are also applicable. The Tx panel 811 and the Rx panel 812 may be referred to as a transmit antenna and a receive antenna, respectively.

As described in connection with the example of FIG. 8, Embodiment 1 considers the case where the BS transmits a downlink signal to one UE while receiving an uplink signal from another UE. However, the BS may consider the operation equally even when the UE is identical to the other UE.

As shown in the example of FIG. 8, the Tx panel 811 of the BS 810 performs beamforming according to the physical channel between the UE 820a and the BS 810. Likewise, the Rx panel of the UE 820a performs beamforming according to the physical channel between the BSs 810 and the UE 820a.

In order for the UE 820a to receive a downlink signal from the BS 810, the UE 820a should estimate the channel H_(a,b) between the BS 810 and the UE 820a and decode X_(a,b). To that end, the BS 810 may transmit X_(a, b) including a DMRS, which is a reference signal for decoding. The UE 820a estimates the channel H_(a,b) by the DMRS.

The Rx panel 812 of the BS 810 performs beamforming according to the physical channel between the UE 820c and the BS 810. Similarly, the Tx panel of the UE 820c performs beamforming according to the physical channel between the BSs 810 and the UE 820c.

In order for the BS 810 to receive an uplink signal from the UE 820c, it is required to decode X_(c,a) by estimating the channel H_(c,a) between the BS 810 and the UE 820c. To that end, the UE 820c may transmit X_(c,a) including the DMRS. The BS 810 estimates the channel H_(c,a) by the DMRS.

Figure 9:
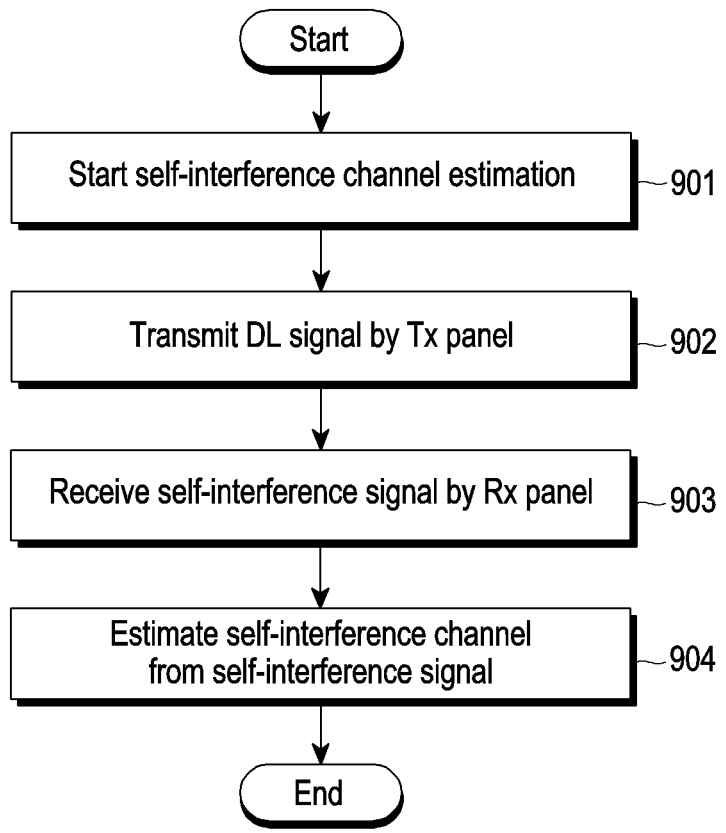
FIG. 9 is a flowchart illustrating a method for estimating a self-interference channel by a BS performing FD communication according to an embodiment.

FIG. 9 is a flowchart illustrating a method for estimating a self-interference channel by a BS performing FD communication according to an embodiment. For example, the operations of FIG. 9 are described below with reference to the configuration of FIG. 8.

Referring to FIG. 9, the BS 810 may perform the above-described SIC for supporting FD communication to receive an uplink signal from the UE 820c while transmitting a downlink signal to the UE 820a. The BS 810 may estimate the self-interference channel H_(a,a) as well as the uplink channel H_(c,a) of the UE 820c.

In step 901, the BS 810 starts the self-interference channel estimation according to the disclosure.

In step 902, the BS 810 transmits a downlink signal to the UE 820a through the Tx panel 811, and, in step 903, the BS 810 receives the self-interference signal by the downlink signal through the Rx panel 812.

In step 904, the BS 810 performs self-interference channel estimation based on the received self-interference signal. The estimated self-interference channel may be used for SIC as in the manner described above in connection with Equation (2) and Equation (3).

Referring to Equation (3), the SIC performance of the BS is proportional to the estimation performance of the self-interference channel. Channel estimation is proportional to the SINR upon channel estimation as widely known. Accordingly, if there is another signal for the position of self-interference channel estimation when the BS receives the self-interference signal, the SINR may reduce, causing performance deterioration. In other words, in the example of FIG. 8, if the uplink signal of the UE 820c is present when the BS 810 estimates the self-interference channel, the self-interference channel estimation performance may be degraded. Therefore, if the uplink transmission from the UE 820c is muted when the BS 810a estimates the self-interference channel by transmission of the downlink signal as in the example of FIG. 8, the self-interference channel estimation performance in the BS 810a is further enhanced.

Embodiment 2

Embodiment 2 relates to a method for restricting uplink transmission of symbols for self-interference channel estimation in order for the BS to perform self-interference channel estimation better.

Figure 10:
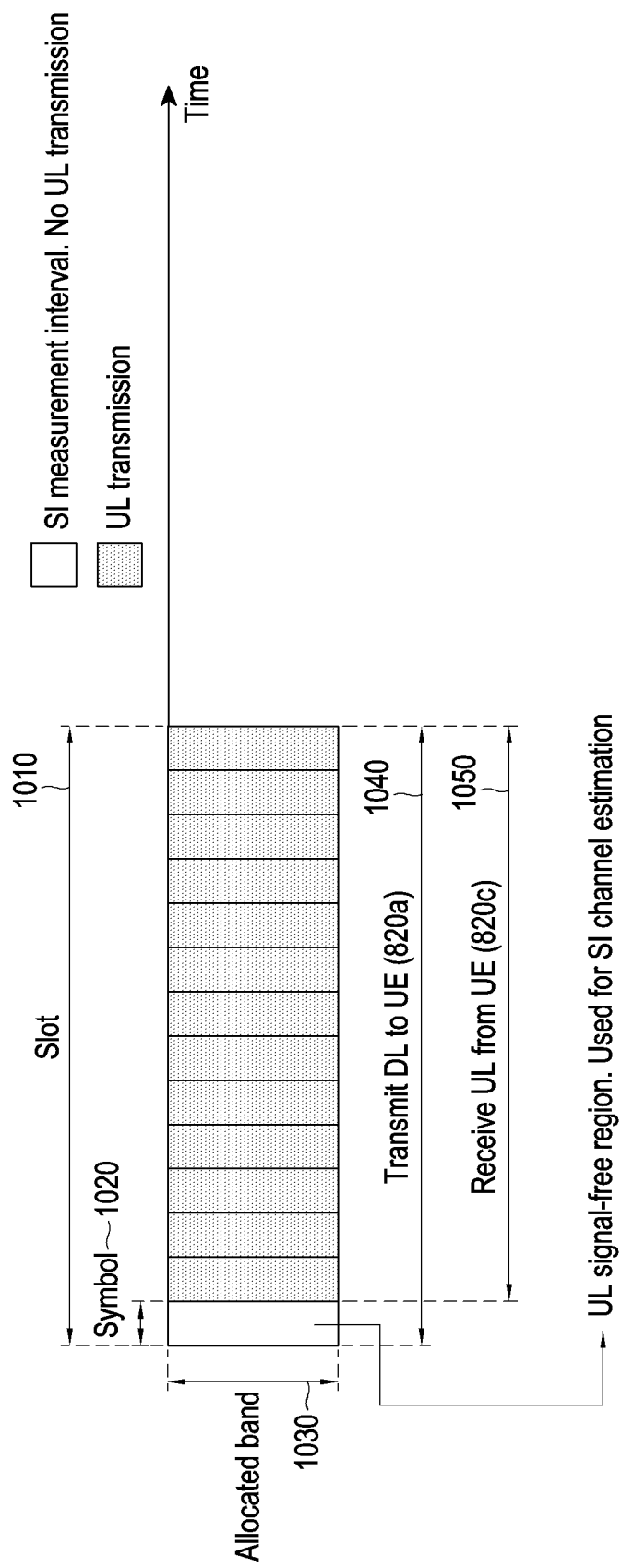
FIG. 10 illustrates a frame/slot structure in which a BS operates a muting symbol to estimate a self-interference channel according to an embodiment.

FIG. 10 illustrates a frame/slot structure in which a BS operates a muting symbol to estimate a self-interference channel according to an embodiment. For example, FIG. 10 is described below with reference to FIG. 8.

In the disclosure, the symbol in which uplink transmission of the UE is restricted for estimation of a self-interference channel is referred to as a muting symbol. However, a "muting symbol" is so termed for convenience of description, and other various terms may be used which may represent resources where uplink transmission of the UE may be restricted.

FIG. 10 illustrates an example slot structure allocated for uplink transmission of the UE 820c by the BS 810. It is assumed that the BS 810 receives an uplink signal from the UE 820c while transmitting a downlink signal to the UE 820a through FD communication. As shown in FIG. 10, the BS 810 may allocate some symbols 1020 in the slot 1010 as muting symbols and disable the UE 820c from transmitting an uplink signal in the symbol 1020, thereby securing a self-interference channel estimation period related to downlink transmission to the UE 820a.

The allocated band 1030 shown on the vertical axis means the frequency band available to the UE, e.g., the RB allocated to the UE by the BS, the UE's BWP, or the entire bandwidth used by the BS.

In FIG. 10, one slot 1010 composed of 14 symbols is shown along the horizontal axis. In the disclosure, for convenience of description, various embodiments of the disclosure are described using a slot structure having 14 same symbols as are shown in the 3GPP NR standard. Further, the disclosure may be applied, in the same manner, to various slot structures defined in the 3GPP NR standard. It should be noted that, in the disclosure, slot refers to one example resource unit in the time domain, and embodiments of the disclosure are not limited to the slot structure of FIG. 10.

Reference number 1040 may correspond to a time interval in which the BS 810 transmits a downlink signal to the UE 820a, and reference number 1050 may correspond to a time interval in which the BS 810 receives an uplink signal from the UE 820c. For example, the BS 810 may perform downlink transmission to the UE 820a from the first symbol (symbol #0) to the last symbol (symbol #13) in the slot allocated to the UE 820a in the time interval 1040. Further, the BS 810 may receive an uplink signal from the UE 820c from the second symbol (symbol #1) to the last symbol (symbol #13) except for the first symbol (symbol #0) in the slot 1010 allocated to the UE 820c in the time interval 1050.

As described in connection with Embodiment 1, the BS may perform self-interference channel estimation for FD communication. To that end, the BS 810 may disable the UE 820c from perform uplink transmission in some symbols 1020 of the slot 1010, thereby enhancing the reception SINR upon self-interference channel estimation.

In other words, FIG. 10 illustrates a method in which the BS 810 performs self-interference channel estimation using the first symbol (symbol #0) 1020 in the slot 1010. Setting a symbol in which the UE 820c is disabled from transmitting an uplink signal to enhance the reception SINR upon self-interference channel estimation may set other symbols in the slot 1020, e.g., one or more symbols among symbol #0 to symbol #13 in the slot 1010, as well as symbol #0 1020.

In FIG. 10, the shaded symbols (e.g., symbol #1 to symbol #13) in the slot 1010 represent a resource region used for uplink transmission by the UE 820c, and symbol #0 1020 represents a resource region not used for uplink transmission by the UE 820c. Symbol #0 1020 is not used for actual transmission and thus corresponds to a muting symbol. The BS 810 may use the muting symbol for the purpose of estimating the self-interference channel generated during FD communication.

Figure 11:
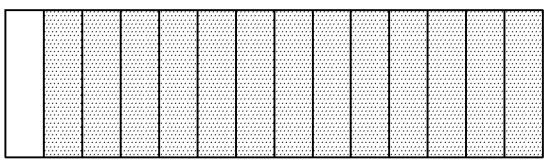
FIG. 11 illustrates a frame/slot structure in which a BS operates one muting symbol in a slot to estimate a self-interference channel according to an embodiment.
Figure 11:
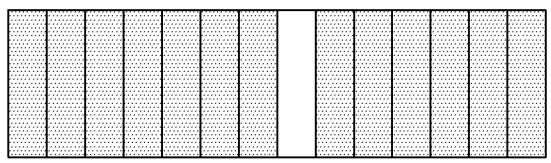
Figure 11:
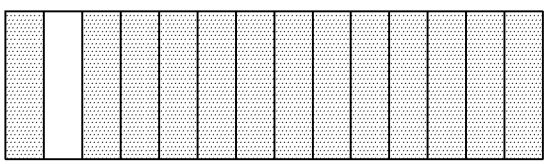
Figure 11:
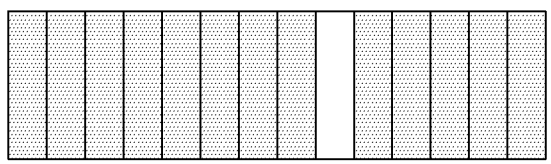
Figure 11:
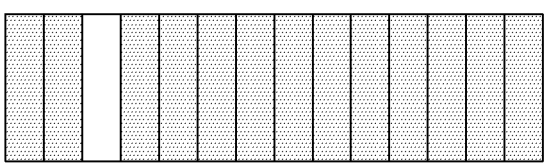
Figure 11:
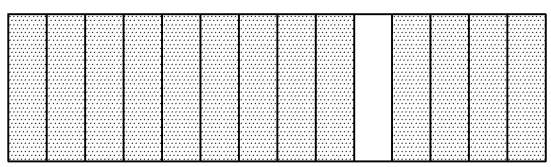
Figure 11:
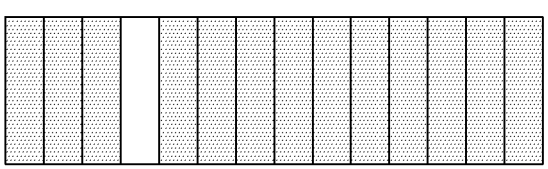
Figure 11:
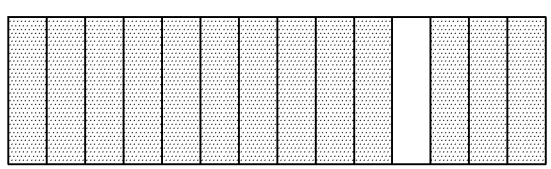
Figure 11:
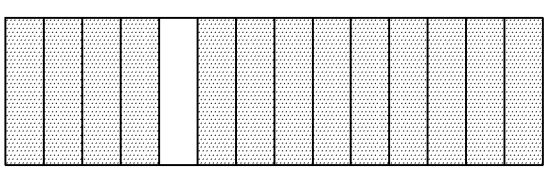
Figure 11:
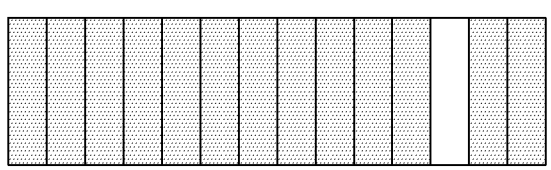
Figure 11:
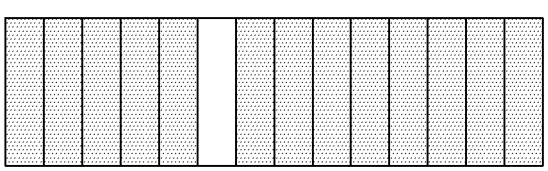
Figure 11:
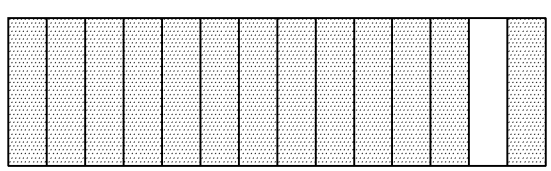
Figure 11:
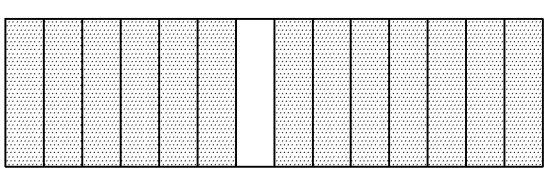
Figure 11:
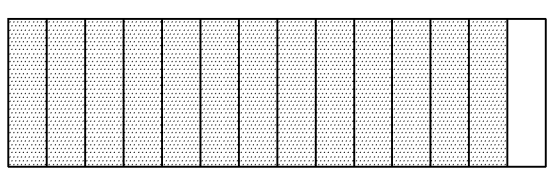

FIG. 11 illustrates a frame/slot structure in which a BS operates one muting symbol in a slot to estimate a self-interference channel according to an embodiment.

Referring to FIG. 11, various slot structures (14 slot structures in total) are illustrated including 14 symbols including one muting symbol 1110 used for SI channel estimation. Each slot of FIG. 11 may be allocated to the UE performing uplink transmission, and the remaining 13 symbols 1120 except for the muting symbol 1120 may be used for uplink transmission of the UE. In other words, FIG. 11 exemplifies various symbol types in an allocated band when the BS estimates self-interference using one symbol 1110 among the 14 symbols (symbol #0 to symbol #13). The shaded symbols 1120 indicate a symbol area used by the UE for uplink transmission, and the muting symbol 1110 is not used by the UE for uplink transmission. The muting symbol 1110 may be understood as a resource included in the resources allocated to the UE but not actually used for uplink transmission.

FIG. 11 also exemplifies that one symbol in the slot is allocated as the muting symbol 1110, and the muting symbol 1110 may be allocated to a plurality of symbols in the slot. The plurality of symbols may be contiguous or discrete symbols in the slot. As described above, the BS may change at least one of the number or position of muting symbols to restrict uplink transmission according to a specific purpose. For example, when the channel estimation performance for SIC is insufficient with one muting symbol, the BS may increase the number of corresponding muting symbols.

Figure 23:
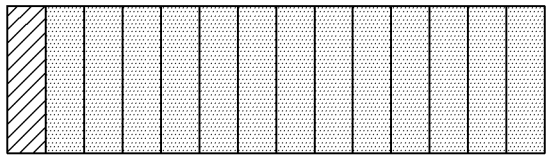
FIG. 23 illustrates a frame/slot structure in which a BS operates one symbol, including a muting RE, in a slot to estimate a self-interference channel according to an embodiment.
Figure 23:
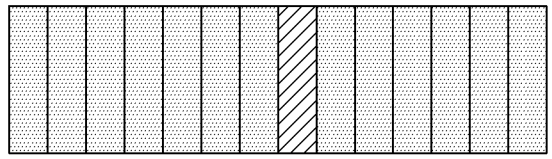
Figure 23:
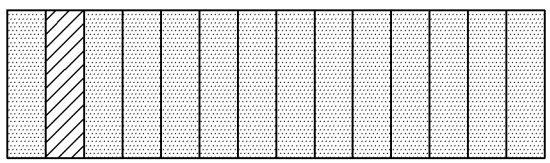
Figure 23:
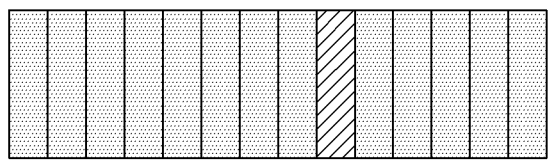
Figure 23:
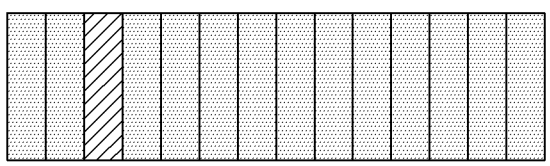
Figure 23:
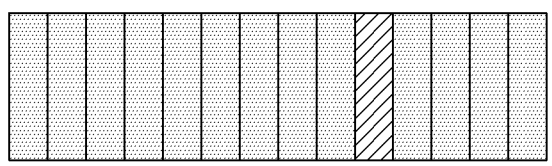
Figure 23:
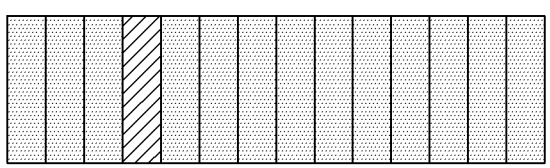
Figure 23:
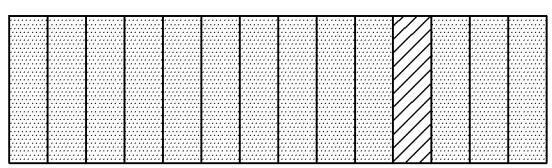
Figure 23:
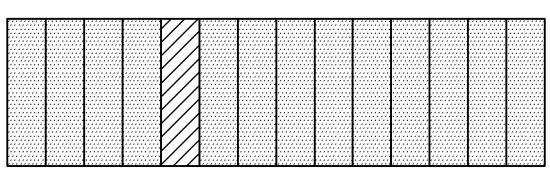
Figure 23:
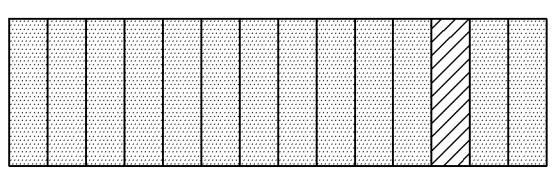
Figure 23:
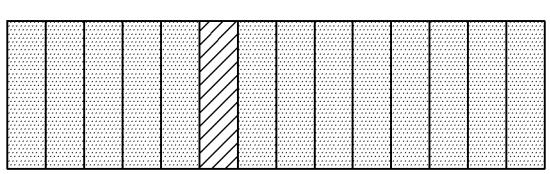
Figure 23:
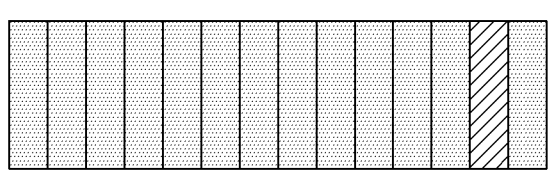
Figure 23:
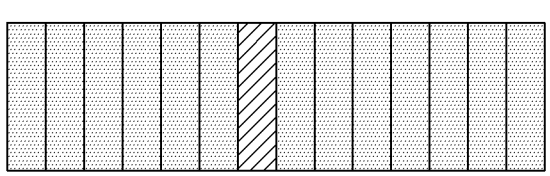
Figure 23:
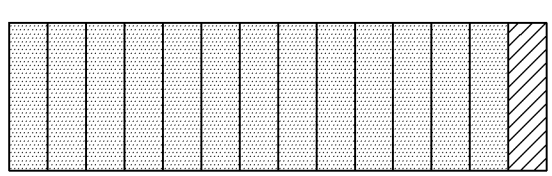

FIG. 23 illustrates an example in which a muting RE is allocated to one symbol period in the slot even when the transmit beam or receive beam of the BS is changed in the slot as is described below in connection with Embodiment 4. The muting RE may be allocated to a plurality of symbols in the slot. The plurality of symbols may be contiguous or discrete symbols in the slot.

For example, in a case where the BS uses multiple downlink and uplink channels, if the uplink receive beam used in each channel differs from the downlink transmit beam, the BS may allocate one or more muting symbols (or muting REs) to the corresponding beam and use them for estimating the self-interference channel.

In another embodiment, when the self-interference channel does not change during a plurality of slots, the BS may not set a muting symbol in which uplink transmission of the UE is restricted within the slots.

If it is not the case where downlink transmission and uplink reception are not simultaneously caused by FD communication as in the example of FIG. 8, e.g., when the BS does not perform downlink transmission for the corresponding slot, the BS may not set a muting symbol where uplink transmission of the UE is restricted.

Embodiment 3

Embodiment 3 relates to a method in which in a communication environment as in the example of FIG. 8, the BS indicates, to the UE, the position of the muting symbol not used on uplink.

The BS may indicate the position of the corresponding muting symbol to the UE using schemes 1) to 5) as follows.

1) Explicitly indicate the position of the muting symbol to the UE every time (dynamic method);

2) Indicate, to the UE, a specific symbol pattern and repetition period of the muting symbol (periodic method);
3) Operate during a specific time without indicating to the UE a specific symbol pattern and repetition period of the muting symbol (semi-static method);
4) The UE conjectures the position of the muting symbol by combining other information; and
5) The BS does not schedule, to the UE, the corresponding position of the muting symbol.

The information for the BS to indicate/set, to the UE, at least one of the position, pattern, repetition period, and operation time of the muting symbol may be provided to the UE through higher layer signaling or layer 1 (L1) signaling.

Higher layer signaling may include signaling corresponding to at least one or a combination of one or more of the following signaling.

MIB
SIB or SIB X (X=1, 2, . . . )
RRC
Medium access control (MAC) control element (CE)
UE Capability Reporting
UE assistance information message Further, L1 signaling may be signaling corresponding to at least one or a combination of one or more of the following physical layer channels or signaling methods.

PDCCH
DCI
UE-specific DCI
Group common DCI
Common DCI
Scheduling DCI (e.g., DCI used for scheduling downlink or uplink data)
Non-scheduling DCI (e.g., DCI not for the purpose of scheduling downlink or uplink data)
PUCCH
Uplink control information (UCI)

If the BS informs the UE of the position of the muting symbol according to schemes 1) to 4) above, it may be assumed that the UE transmits no uplink signal in the position of the muting symbol.

For example, when the BS informs the UE of specific symbol #a or multiple symbols corresponding to the muting symbol by schemes 1) to 4) above, although the BS schedules symbols #b and #c including the position of the muting symbol, the UE may not perform uplink transmission on the specific symbol #a or multiple symbols which the UE has been informed of through schemes 1) to 4).

If the BS explicitly informs the UE of the position of the specific symbol corresponding to the muting symbol every time by scheme 1), the UE may receive information about the muting symbol from the BS ('receive' here may refer to doing so after decoding is complete) and may not perform uplink transmission in the position of the muting symbol.

For example, if the BS designates a specific symbol corresponding to the muting symbol and informs the UE of it at a time before a time t_decoding previously agreed on with the UE (i.e., a time required until decoding of the muting symbol), the UE may not perform uplink transmission on the corresponding muting symbol despite being scheduled for an uplink resource for the position of the muting symbol by the BS. The BS may use the corresponding muting symbol position for self-interference channel estimation.

Upon operation, the UE may limit the operation of not transmitting an uplink signal in the muting symbol designated by the BS to one slot.

If the BS explicitly informs the UE of the position of the specific symbol corresponding to the muting symbol, along with the period or without period, by scheme 2) above, the UE may receive information about the muting symbol from the BS and may not perform uplink transmission in the position of the corresponding muting symbol.

For example, if the BS informs the UE of the specific position of the muting symbol along with the specific period (e.g., 0.5 slots, 1 slot, or 2 slots), the UE may not perform uplink transmission even when uplink-scheduled in the position of the muting symbol according to the position and period of the muting symbol.

For example, if the BS indicates the period of 0.5 slots and symbol #1 as the period and position of the muting symbol, the UE may not perform uplink transmission in the positions of symbol #1 and symbol #8 in the nth slot, symbol #1 and symbol #8 in the n+1th slot, . . . , and symbol #1 and symbol #8 in the n+kth slot.

If the BS indicates the period of two slots and symbol #1, the UE may not perform uplink transmission in symbol #1 of the nth slot, symbol #1 of the n+2th slot, . . . , and symbol #1 of the n+2kth slot (at or after the time when the UE receives and decodes information about the muting symbol).

If the BS explicitly informs the UE of the position of the specific symbol of the muting symbol, along with the period or without the period, or informs the UE of a specific number of repetitions by scheme 3) above, the UE may receive information about the muting symbol from the BS and, after decoding, the UE may register the position of the muting symbol as a candidate where uplink transmission may not be performed. If the BS explicitly or implicitly activates on the position of the muting symbol, the UE may designate the position of the muting symbol as a position where uplink transmission is not performed during a specific time and operate.

For example, if the BS informs the UE of the specific position of the muting symbol along with the specific period (e.g., 0.5 slots, 1 slot, or 2 slots) and activates, the UE may not perform uplink transmission even when scheduled for uplink transmission in the position of the muting symbol according to the position and period of the muting symbol.

If the BS indicates the period of 0.5 symbols and symbol #1 as the period and position of the muting symbol and provides an activation signal, the UE may not perform uplink transmission for symbol #1 and symbol #8 in the nth slot, symbol #1 and symbol #8 in the n+1th slot, . . . , and symbol #1 and symbol #8 in the n+kth slot.

If the BS indicates the period of two slots and symbol #1 as the period and position of the muting symbol and then transmits an activation signal, the UE may not perform uplink transmission on symbol #1 of the nth slot, symbol #1 of the n+2th slot, . . . , and symbol #1 of the n+2kth slot (at or after the time when the UE receives and decodes information about the muting symbol).

When the BS informs the UE of the position of the muting symbol by scheme 4), the UE may be set for the position of the corresponding muting symbol using an equation and information set to the UE by the BS or using an equation and information predetermined between the BS and the UE.

For example, the UE and the BS may measure/estimate the position of the muting symbol using at least one of the cell ID, UE ID, system frame number (SFN), or slot number and perform operations according to the disclosure.

If the cell ID is 1, the UE ID is 1, the SFN is 1, and the slot number is 1, the UE may recognize the first symbol in the slot as the muting symbol where no uplink signal is transmitted, although uplink is scheduled.

If the cell ID is 1, the UE ID is 1, the SFN is 2, and the slot number is 1, the UE may recognize the second symbol in the slot as a muting symbol where no uplink signal is transmitted although uplink is scheduled.

As described above, it is possible to identify the specific position of the muting symbol through information, which is previously determined, or shared, or may be recognized as shared between the UE and the BS and to allow no uplink signal to be transmitted in the muting symbol. Accordingly, it is possible to identify the specific position of the muting symbol using a method preconfigured between the BS and the UE even without a mapping method of the muting symbol by a certain specific equation.

If scheme 5) above is used, the BS may have the same effect as indicating to the UE the position of the muting symbol in schemes 1) to 4) in a method not to schedule, to the UE, a specific symbol corresponding to the muting symbol.

For example, the BS may have the same effect as directly indicating, to the UE, the position of the muting symbol by transmitting, to the UE, DCI for scheduling symbols #0 to #(X−1) in the slot and DCI for scheduling symbols #(X+1) to #13.

Schemes 1) to 4) are to allow no uplink transmission to be performed in the position of the muting symbol although the UE is scheduled for the muting symbol, and scheme 5) is a method in which the BS may secure a SIC interval although the UE does not support operations for the muting symbol as the BS performs scheduling in a different method although the UE is not directly scheduled for the muting symbol by the BS. However, in scheme 5), the UE should perform DCI decoding twice and decode different codewords to be allocated an uplink resource by the BS.

Accordingly, schemes 1) to 4) may be used for UEs supporting the muting symbol operation according to the disclosure, and scheme 5) may be used for legacy UEs which do not support a muting symbol.

Figure 12:
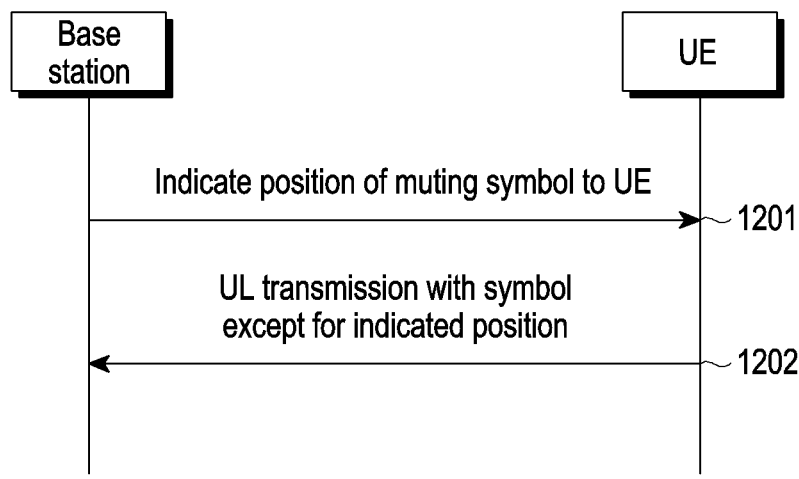
FIGS. 12, 13, 14, 15, and 16 are signal flow diagrams illustrating methods for setting a muting symbol between a BS and a UE according to embodiments.

FIG. 12 is a signal flow diagram illustrating a method for setting a muting symbol between a BS and a UE according to an embodiment.

Referring to FIG. 12, messages are exchanged between a UE and a BS when a muting symbol is set by scheme 1).

In step 1201, the BS transmits information indicating a specific position of the muting symbol to the UE capable of using uplink. In this case, to indicate the position of the muting symbol, a method using RRC information, a method using DCI, and a method using MAC CE may be considered.

In step 1202, the UE performs uplink transmission in the remaining symbols except for the muting symbol among the symbols in the slot for uplink transmission based on information about the position of the muting symbol received from the BS. If the UE receives the information about the position of the muting symbol before receiving the scheduling information for uplink transmission, the UE may perform uplink transmission in the remaining symbols except for the corresponding muting symbol among the scheduled symbols.

Figure 13:
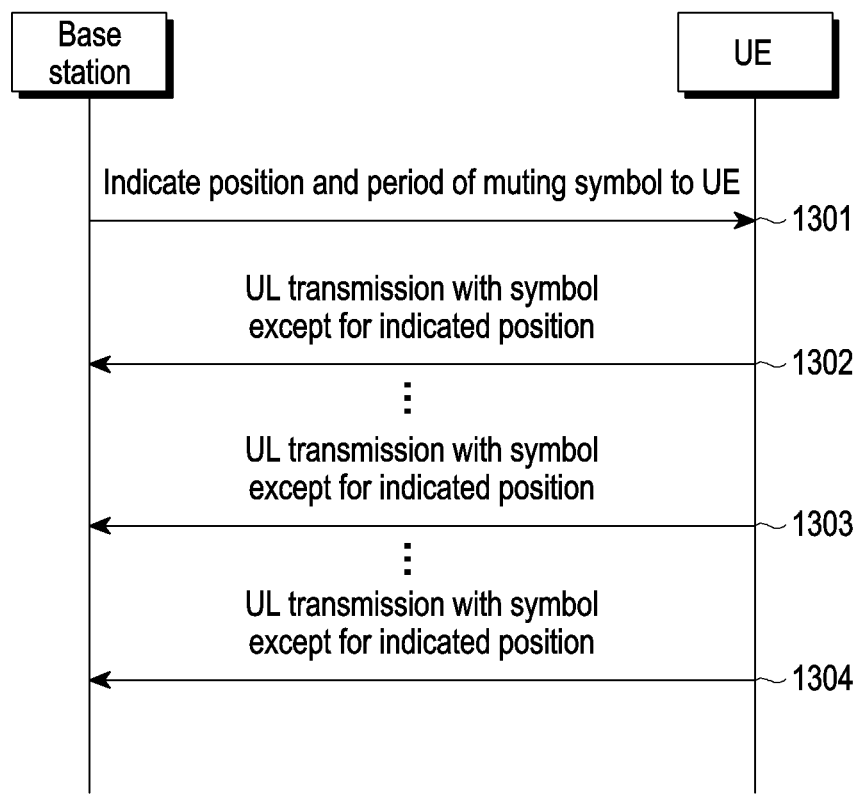

FIG. 13 is a signal flow diagram illustrating a method for setting a muting symbol between a BS and a UE according to an embodiment.

Referring to FIG. 13, messages are exchanged between a UE and a BS when a muting symbol is set by scheme 2).

In step 1301, the BS transmits information indicating a specific position and repetition period of the muting symbol to the UE capable of using uplink. In this case, to indicate the position and repetition period of the muting symbol, a method using RRC information, a method using DCI, and a method using MAC CE may be considered.

In steps 1302 to 1304, the UE periodically performs uplink transmission in the remaining symbols, except for the muting symbol among the symbols in the slot for uplink transmission, based on the information about the position and repetition period of the muting symbol received from the BS. Accordingly, although there is no further instruction from the BS after the position and repetition period of the muting symbol are set, if scheduled for uplink transmission, the UE may periodically perform uplink transmission in the symbols except for the muting symbol.

If the UE receives the information about the position and repetition period of the muting symbol before receiving the scheduling information for uplink transmission, the UE may perform uplink transmission in the remaining symbols except for the corresponding muting symbol among the scheduled symbols.

Figure 14:
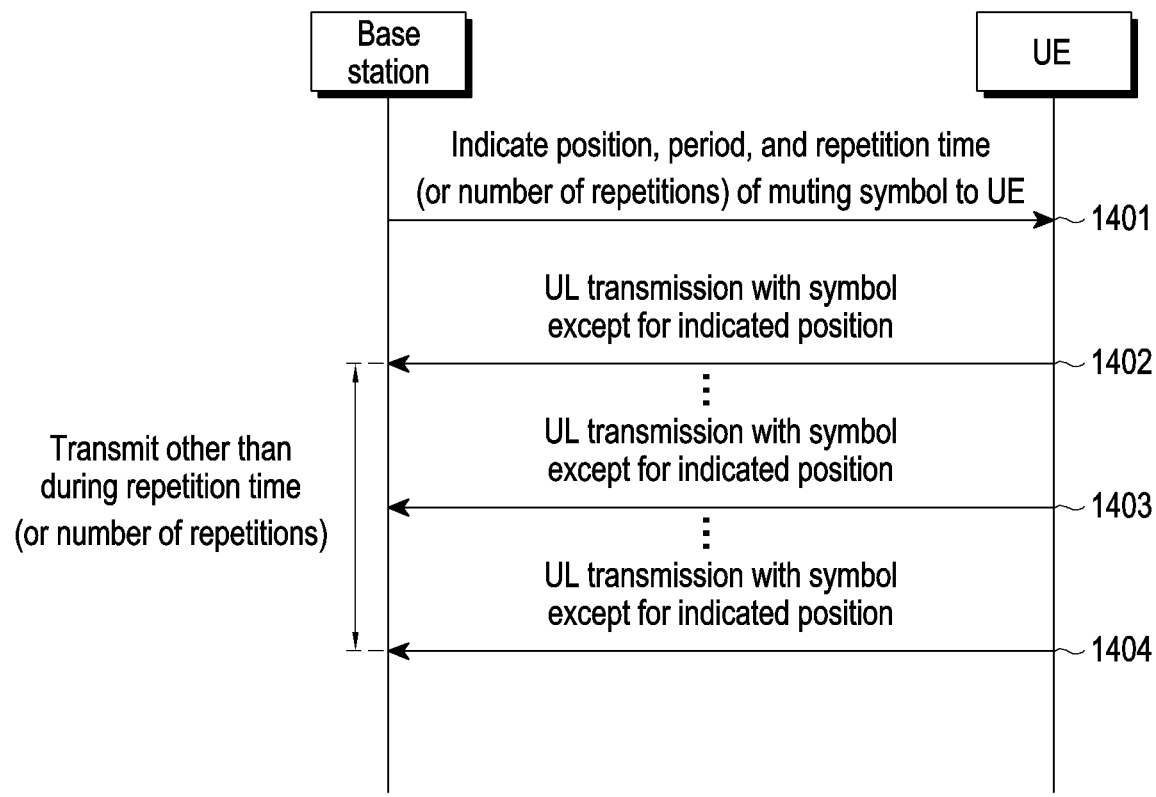

FIG. 14 is a signal flow diagram illustrating a method for configuring a muting symbol between a BS and a UE according to an embodiment.

Referring to FIG. 14, messages are exchanged between a UE and a BS when a muting symbol is set by scheme 3).

In step 1401, the BS transmits information indicating a specific position and repetition period, and repetition time (or number of repetitions) of a muting symbol to a UE capable of using uplink. In this case, to indicate the position and repetition period, repetition time (or number of repetitions) of the muting symbol, a method using RRC information, a method using DCI, and a method using MAC CE may be considered.

In steps 1402 to 1404, the UE performs, periodically within the repetition time (or number of repetitions), uplink transmission in the remaining symbols except for the muting symbol among the symbols in the slot for uplink transmission based on the information about the position and repetition period, and repetition time (or number of repetitions) of the muting symbol received from the BS. Accordingly, although there is no further instruction from the BS after the position and repetition period, repetition time (or number of repetitions) of the muting symbol are set, if scheduled for uplink transmission, the UE may perform, periodically within the repetition time (or number of repetitions), uplink transmission in the symbols except for the muting symbol.

If the UE receives the information about the position and repetition period of the muting symbol before receiving the scheduling information for uplink transmission, the UE may perform uplink transmission in the remaining symbols except for the corresponding muting symbol among the scheduled symbols.

Figure 15:
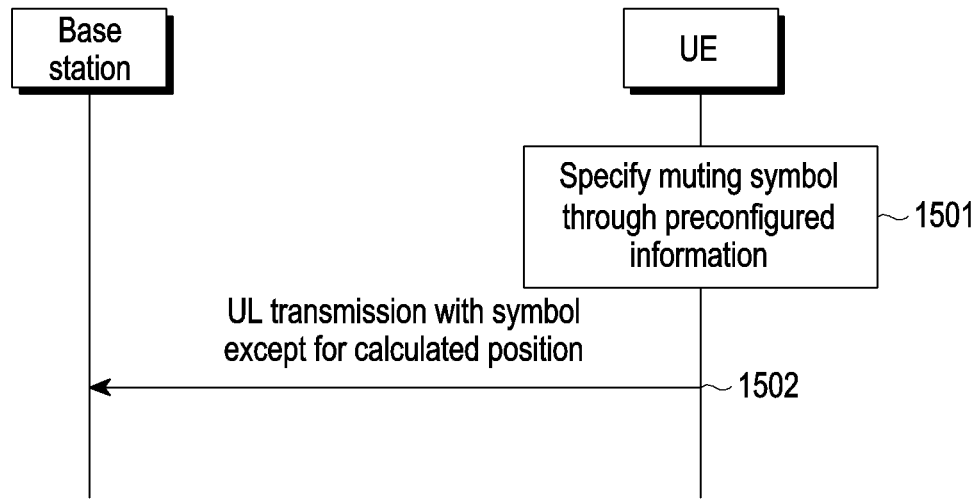

FIG. 15 is a signal flow diagram illustrating a method for configuring a muting symbol between a BS and a UE according to an embodiment.

Referring to FIG. 15, messages are exchanged between a UE and a BS when a muting symbol is set by scheme 4).

In step 1501, even when the BS does not designate a specific position and repetition period and repetition time (or number of repetitions) of the muting symbol to a UE capable of using uplink, the UE may calculate/estimate/specify the position of the muting symbol based on preconfigured information shared between the UE and the BS as in the above-described method.

In step 1502, the UE performs uplink transmission in the remaining symbols except for the muting symbol among the symbols in the slot for uplink transmission based on the calculated/estimated/specified position of the muting symbol.

Figure 16:
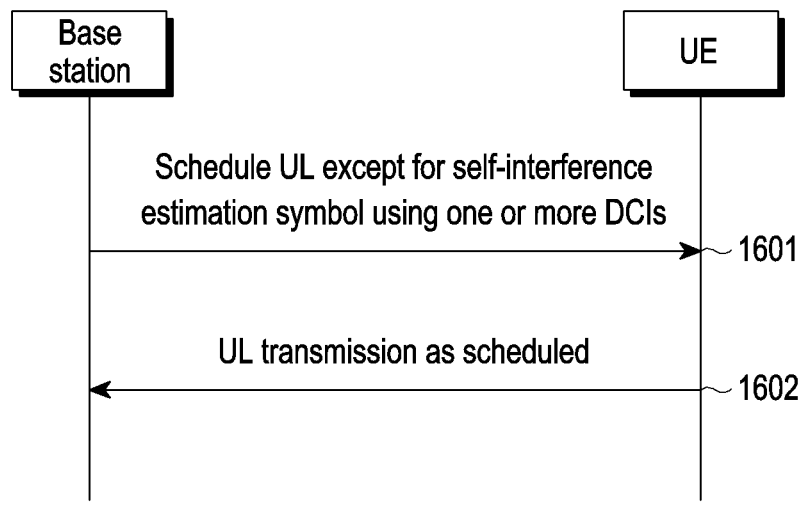

FIG. 16 is a signal flow diagram illustrating a method for setting a muting symbol between a BS and a UE according to an embodiment.

Referring to FIG. 16, messages are exchanged between a UE and a BS when a muting symbol is set by scheme 5).

In step 1601, the BS performs uplink scheduling, to the UE, except for a specific symbol position in the slot using one or more DCIs (e.g., two DCIs) as described above.

In step 1602, the UE performs uplink transmission in the remaining scheduled symbols except for the specific symbol. Here, the specific symbol may be a muting symbol.

Embodiment 4

Embodiment 4 relates to a method for supporting a beam change in self-interference channel estimation when the transmit beam or receive beam of a BS is changed.

Figure 17:
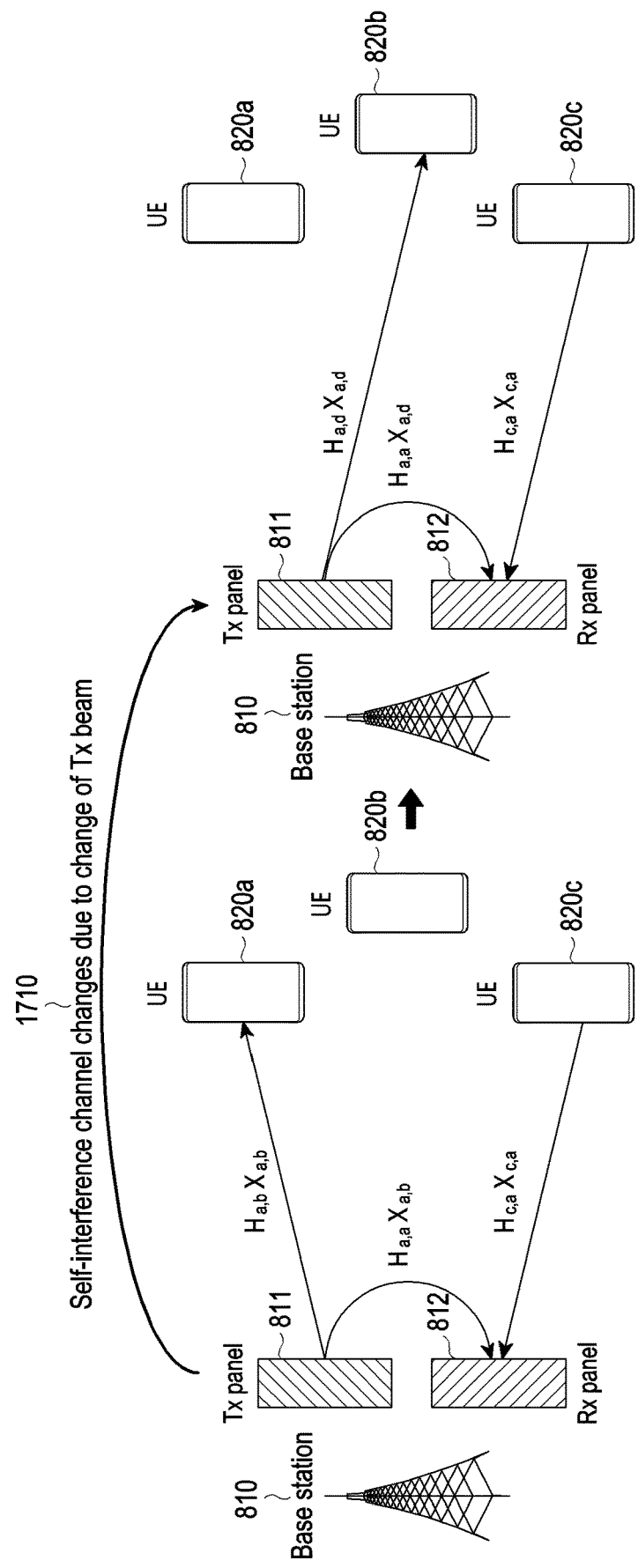
FIG. 17 illustrates a self-interference channel being changed when a BS changes a transmit beam on downlink according to an embodiment.

FIG. 17 illustrates a self-interference channel being changed when a BS changes a transmit beam on downlink according to an embodiment.

Referring to FIG. 17, the BS 810 may perform FD communication to receive an uplink signal from the UE 820c while transmitting a downlink signal to the UE 820a. In this case, when the target of downlink transmission is changed to the UE 820b, the BS 810 may change the transmit beam formed through the Tx panel 811 to the transmit beam for the UE 820b. The signal transmitted from the BS 810 to the UE 820b is denoted by X_(a,d), and the channel H_(a,d) denotes the channel between the UE 820b and the BS 810. In this case, the channel H_(a,d) is a channel including the effect of the transmit beam formed using the Tx panel 811 by the BS 810 and the effect of the receive beam formed using the Rx panel of the UE 820b.

After the transmit beam of the BS 810 is changed to the transmit beam for the UE 820b, the self-interference channel that is experienced when the Rx panel 812 receives the uplink signal, by the downlink signal from the Tx panel 811 is denoted by H_(a,a). In this case, the self-interference channel H_(a,a) may be a channel including the effect of the receive beam formed using the Rx panel 812 by the BS 810 and the effect of the transmit beam formed using the Tx panel 811 by the BS 810. The self-interference signal received by the BS 810 after the transmit beam is changed is denoted by X_(a,d). the BS 810 performs downlink transmission to the UE 820a and, if changing the target of downlink transmission from downlink transmission to the UE 820b to reception of the uplink signal from the UE 820c, the transmit beam of the Tx panel 811 is changed, so that the self-interference channel is changed at 1710. Therefore, the BS 810 should re-estimate the changed self-interference channel to cancel the self-interference.

Figure 18:
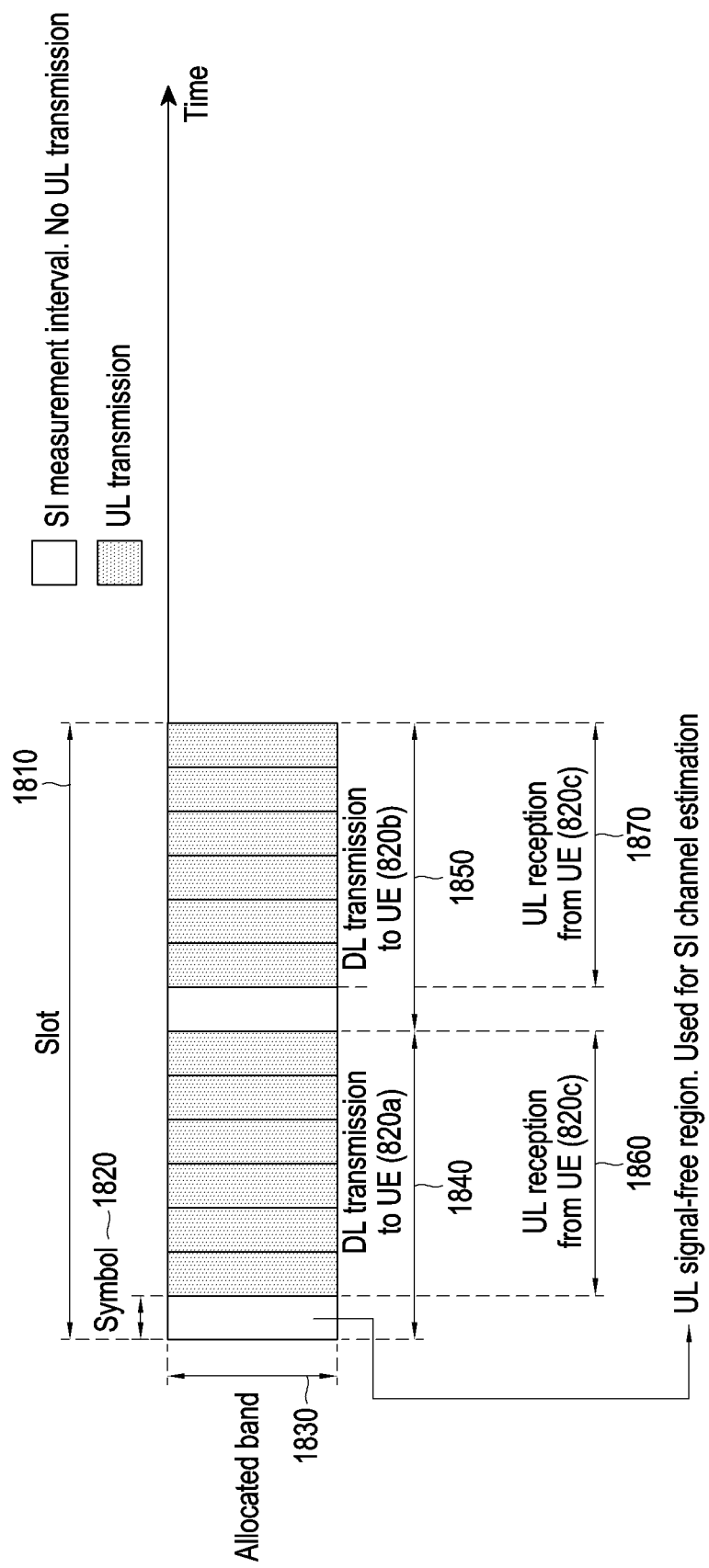
FIG. 18 illustrates a frame/slot structure in which a BS operates a muting symbol to estimate a self-interference channel according to an embodiment.

FIG. 18 illustrates a frame/slot structure in which a BS operates a muting symbol to estimate a self-interference channel according to an embodiment. For example, FIG. 18 is described below with reference to FIG. 17.

Referring to FIG. 18, the muting symbol is a symbol in which the uplink transmission of the UE is restricted for estimation of the self-interference channel in the BS.

FIG. 18 illustrates an example of a slot structure allocated by the BS 810 for uplink transmission of the UE 820c. In FIG. 18, the allocated band 1830 shown on the vertical axis indicates that the frequency band available to the UE, e.g., the RB allocated to the UE by the BS, the UE's BWP, or the entire bandwidth used by the BS.

The BS 810 may perform self-interference channel estimation by allocating one or more muting symbols 1820 after the transmit beam is changed to the UE 820b.

For example, if the BS 810 performs downlink transmission to the UE 820a in the time interval corresponding to the first symbol to seventh symbol (symbol #0 to symbol #6) in the slot 1810 allocated for uplink transmission of the UE 820c by the BS 810 (1840), and the BS 810 performs downlink transmission to the UE 820b using the changed transmit beam in the time interval corresponding to the eighth symbol to tenth symbol (symbol #7 to symbol #13) in the slot 1810 (1850) (i.e., when the target of the transmit beam is changed to the UE 820b) as shown in FIG. 18, the BS 810 receives the uplink signal from the UE 820c (1860 and 1870) when considering scheduling for the UE 820c and disables the UE 820c from performing uplink transmission in one or more muting symbols among symbol #0 to symbol #6 and one or more muting symbols among symbol #7 to symbol #13, thereby more precisely estimating the self-interference channel. That is, the BS 810 may use the muting symbol for the purpose of estimating the self-interference channel.

To this end, the BS may inform the UE performing uplink transmission of the specific position of the muting symbol through the method for Embodiment 3.

In Alternatively, when the BS does not inform the UE of the specific position of the muting symbol through the method for Embodiment 3, the BS may operate, with the receive beam or the transmit beam fixed, for SIC during FD operation.

Figure 19:
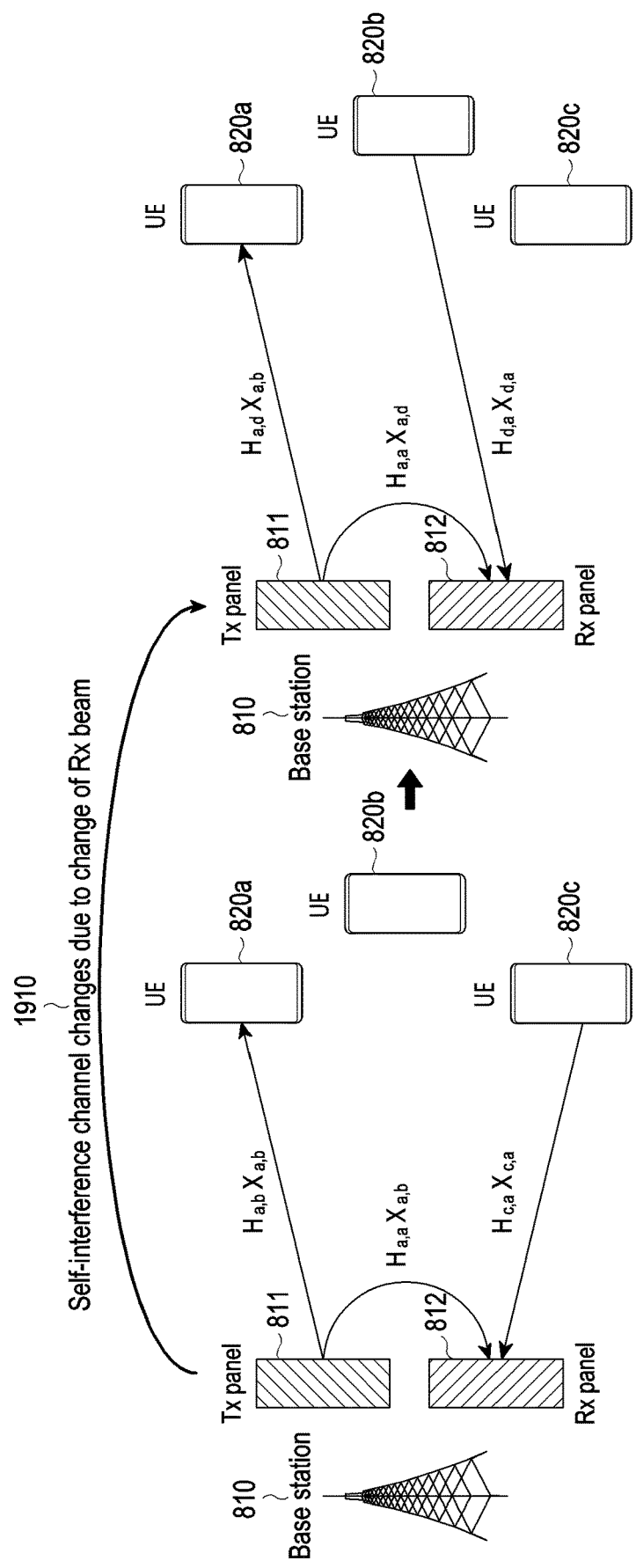
FIG. 19 illustrates a self-interference channel being changed when a BS changes a receive beam on uplink according to an embodiment.

FIG. 19 illustrates a self-interference channel being changed when a BS changes a receive beam on uplink according to an embodiment.

Referring to FIG. 19, the BS 810 may perform FD communication to receive an uplink signal from the UE 820c while transmitting a downlink signal to the UE 820a. In this case, when the target of uplink reception is changed to the UE 820b, the BS 810 may change the receive beam formed through the Rx panel 812 to the receive beam for the UE 820b.

In FIG. 19, the signal received from the UE 820b by the BS 810 is denoted by X_(d,a), and the channel H_(d,a) denotes the channel between the UE 820b and the BS 810. In this case, the channel H_(d,a) is a channel including the effect of the receive beam formed using the Rx panel 812 by the BS 810 and the effect of the transmit beam formed using the Tx panel of the UE 820b.

After the receive beam of the BS 810 is changed to the receive beam for the UE 820b, the self-interference channel that is experienced when the Rx panel 812 receives the uplink signal, by the downlink signal from the Tx panel 811 is denoted by H_(a,a). In this case, the self-interference channel H_(a,a) may be a channel including the effect of the reception beam formed using the Rx panel 812 by the BS 810 and the effect of the transmission beam formed using the Tx panel 811 by the BS 810. The self-interference signal received by the BS 810 after the receive beam is changed is denoted by X_(a,d).

As shown in FIG. 19, the BS 810 performs downlink transmission to the UE 820a and, if changing the target of uplink reception from downlink transmission to the UE 820a to uplink reception from the UE 820b, the receive beam of the Rx panel 812 is changed, so that the self-interference channel is changed (1910). Therefore, the changed self-interference channel should be re-estimated in order to cancel the self-interference.

Figure 20:
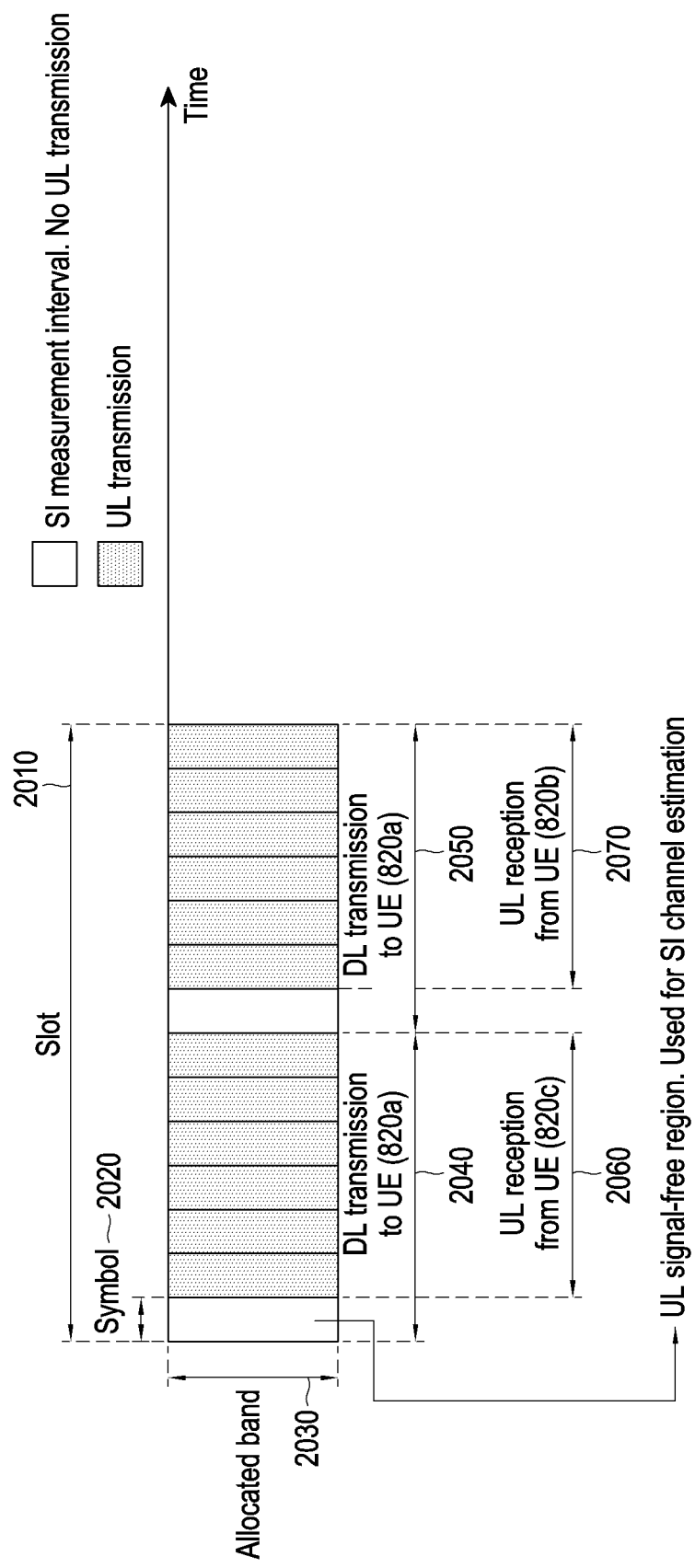
FIG. 20 illustrates a frame/slot structure in which a BS operates a muting symbol to estimate a self-interference channel according to an embodiment.

FIG. 20 illustrates frame/slot structure in which a BS operates a muting symbol to estimate a self-interference channel according to an embodiment. For example, FIG. 20 is described below with reference to FIG. 19.

Referring to FIG. 20, the muting symbol is a symbol in which the uplink transmission of the UE is restricted for estimation of the self-interference channel in the BS.

FIG. 20 illustrates an example of a slot structure allocated by the BS 810 for uplink transmission of the UE 820c and UE 820b. The allocated band 2030 shown on the vertical axis means the frequency band available to the UE, e.g., the RB allocated to the UE by the BS, the UE's BWP, or the entire bandwidth used by the BS.

The BS 810 may perform self-interference channel estimation by allocating one or more muting symbols 2020 after the receive beam is changed to the UE 820b.

For example, the BS 810 performs downlink transmission to the UE 820 in the time interval corresponding to the first symbol to tenth symbol (symbol #0 to symbol #13) in the slot 2010 allocated for uplink transmission of the UE 820c by the BS 810 (2040 and 2050) and, when supporting the uplink transmission 2060 and 2070 from the UE 820c and UE 820b in the slot 2020, disables each of the UE 820c and the UE 820b from performing uplink transmission in one or more muting symbols among symbol #0 to symbol #X and one or more muting symbols among symbol #X to symbol #13 (where symbol #X is the time when the receive beam for reception of the uplink signal is changed), thereby more precisely estimating the self-interference channel. that is, the BS 810 may use the muting symbol for the purpose of estimating the self-interference channel.

To this end, the BS may inform the UE of the specific position of the muting symbol. through the method for Embodiment 3.

Alternatively, when the BS does not inform the UE of the specific position of the muting symbol through the method for Embodiment 3, the BS may operate, with the reception beam or the transmission beam fixed, for SIC during FD operation.

Embodiment 5

Embodiment 5 relates to a method for restricting uplink transmission for some among the REs of the symbol for self-interference channel estimation in order for the BS to more precisely perform self-interference channel estimation. Herein, the REs will be referred to as muting REs.

When the BS restricts uplink transmission of the UE in the muting symbols to estimate the self-interference channel according to the above-described Embodiment 2, the uplink transmission resources that may be allocated to the UE may be reduced by the number of muting symbols. Therefore, Embodiment 5 provides a method for restricting the uplink transmission of the UE at the RE level rather than the symbol level so as to reduce the amount of uplink resources that are reduced according to self-interference channel estimation.

Figure 21:
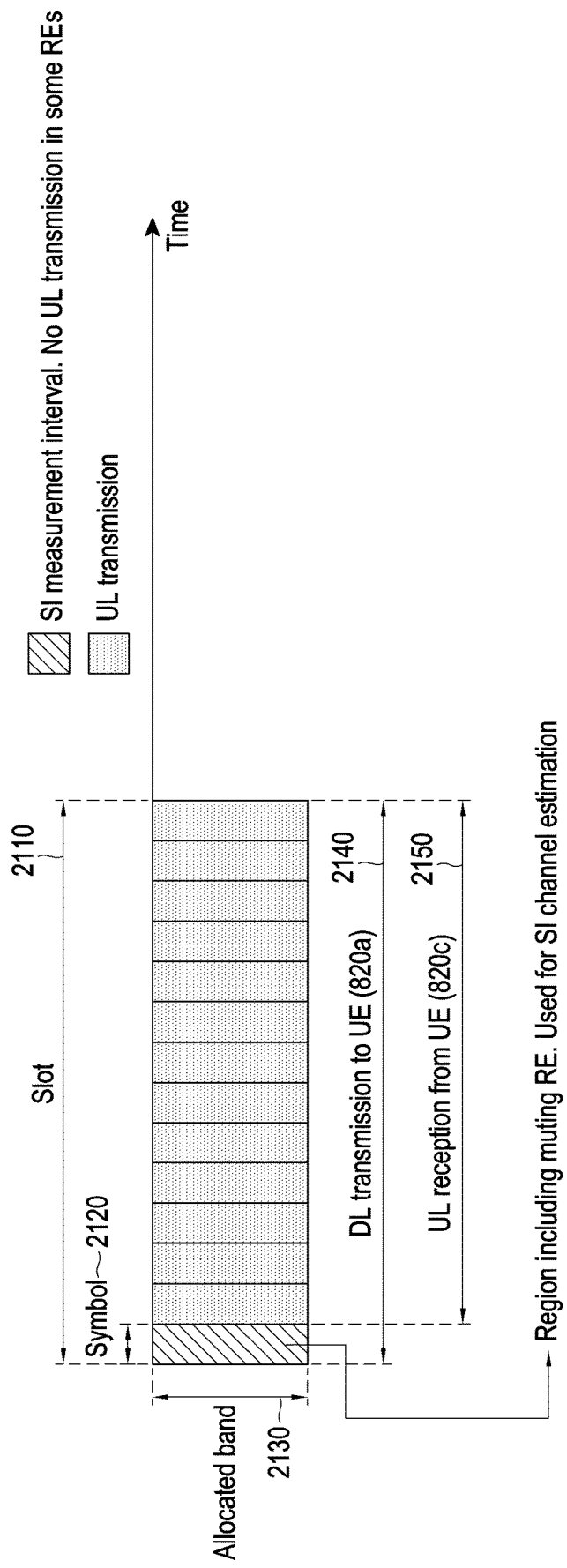
FIG. 21 illustrates a frame/slot structure in which a BS operates a muting resource element (RE) to estimate a self-interference channel according to an embodiment.

FIG. 21 illustrates a frame/slot structure in which a BS operates a muting RE to estimate a self-interference channel according to an embodiment. For example, FIG. 21 is described below with reference to FIG. 8.

The muting RE is a resource in which the uplink transmission of the UE is restricted for estimation of the self-interference channel in the BS. FIG. 21 illustrates an example of a slot structure allocated by the BS 810 for uplink transmission of the UE 820c.

FIG. 21 illustrates a slot structure allocated for uplink transmission of the UE 820c by the BS 810. Herein, it is assumed that the BS 810 receives an uplink signal from the UE 820c while transmitting a downlink signal to the UE 820a through FD communication. The BS 810 may allocate some REs of some symbol 2120 in the slot 2110 as muting REs and disable the UE 820c from transmitting an uplink signal in the muting REs, thereby securing a self-interference channel estimation period related to downlink transmission to the UE 820a.

The allocated band 2130 shown on the vertical axis refers to the frequency band available to the UE, e.g., the RB allocated to the UE by the BS, the UE's BWP, or the entire bandwidth used by the BS.

In FIG. 21, a slot 2110 including 14 symbols is shown along the horizontal axis. In the disclosure, for convenience of description, various embodiments of the disclosure are described using a slot structure having 14 same symbols as are shown in the 3GPP NR standard. Further, the disclosure may be applied, in the same manner, to various slot structures defined in the 3GPP NR standard. It should be noted that, in the disclosure, slot refers to one example resource unit in the time domain, and embodiments of the disclosure are not limited to the slot structure of FIG. 21.

Reference number 2140 may correspond to a time interval in which the BS 810 transmits a downlink signal to the UE 820a, and reference number 2150 may correspond to a time interval in which the BS 810 receives an uplink signal from the UE 820c. For example, the BS 810 may perform downlink transmission to the UE 820a from the first symbol (symbol #0) to the last symbol (symbol #13) in the slot allocated to the UE 820a in the time interval 2140. Further, the BS 810 may receive an uplink signal from the UE 820c from the REs, except for the muting REs, in the first symbol (symbol #0) to the last symbol (symbol #13) in the slot 2110 allocated to the UE 820c in the time interval 2150.

As described in connection with Embodiment 1, the BS may perform self-interference channel estimation for FD communication. To that end, the BS 810 may disable the UE from perform uplink transmission in some REs of the symbol 2120 of the slot 2110, thereby enhancing the reception SINR upon self-interference channel estimation.

In other words, FIG. 21 illustrates a method in which the BS 810 performs self-interference channel estimation using some REs, i.e., muting REs, in the specific symbol 2120 (e.g., symbol #0) in the slot.

Setting a symbol including muting REs in which the UE 820c is disabled from transmitting an uplink signal to enhance the reception SINR upon self-interference channel estimation may set other symbols, e.g., one or more symbols among symbol #0 to symbol #13 in the slot 2110, as well as symbol #0.

The shaded symbols (e.g., symbol #1 to symbol #13) in the slot 2110 represent a resource region used for uplink transmission by the UE, and symbol #0 2120 represents a resource region including some REs not used for uplink transmission by the UE 820c. The REs are not used for actual transmission and thus correspond to muting REs. The BS 810 may use the muting REs for the purpose of estimating the self-interference channel generated during FD communication.

Figure 22:
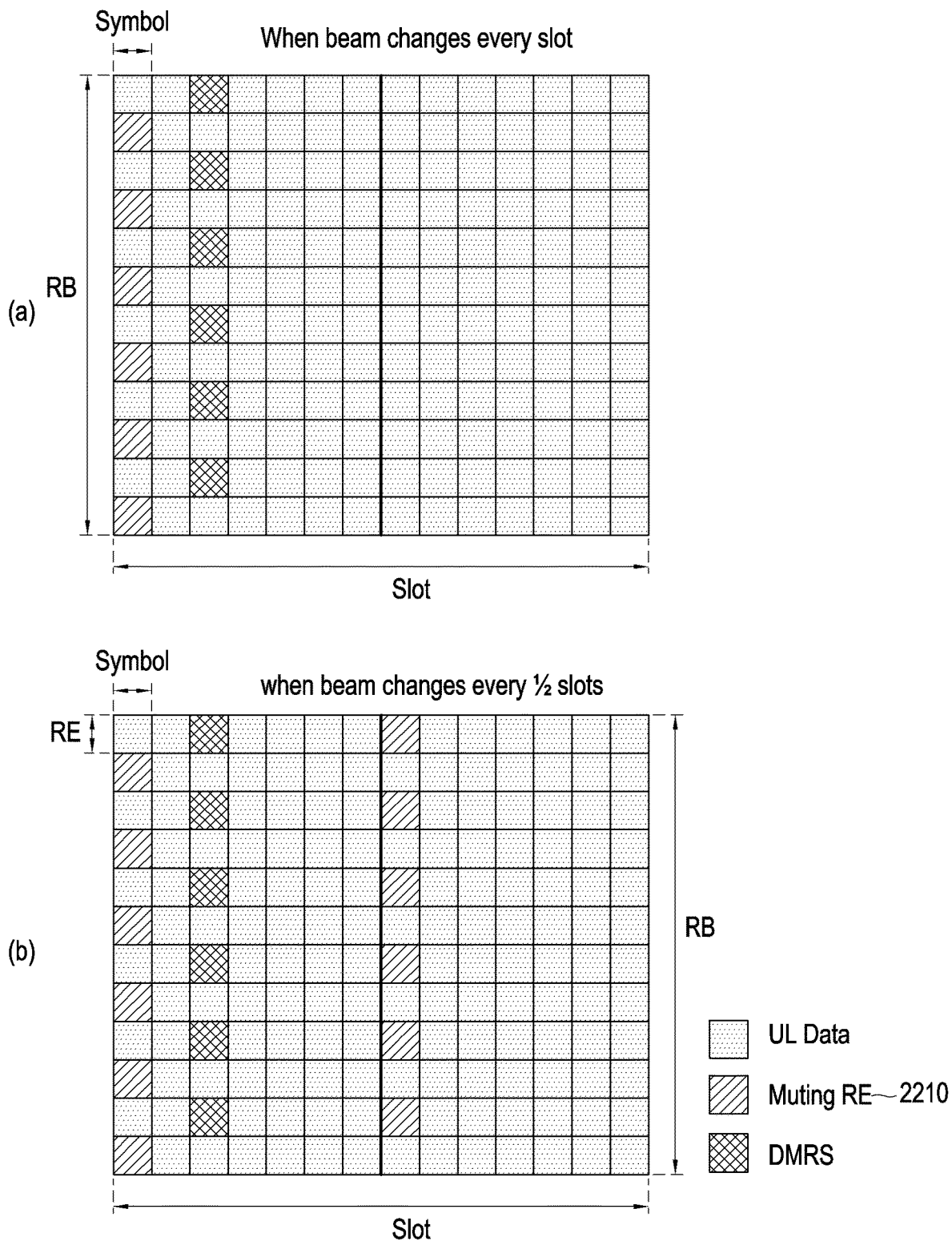
FIG. 22 illustrates, at an RE level, an example frame/slot structure in which a BS operates a muting RE to estimate a self-interference channel according to an embodiment.

FIG. 22 illustrates, at an RE level, an example frame/slot structure in which a BS operates a muting RE to estimate a self-interference channel according to an embodiment.

Referring to FIG. 22, muting REs that are not used for uplink transmission may be operated in one slot and one RB. The UE is set with muting REs 2210 where uplink transmission in the UE is not performed so that the BS may more accurately perform self-interference estimation and, in the muting REs 2210, no uplink signal may be transmitted. Structure (a) in FIG. 22 illustrates an example of setting the muting REs 2210 when the beam is changed every slot, and structure (b) in FIG. 22 illustrates an example of setting muting REs 2210 when the beam is changed every ½ slots.

FIG. 23 illustrates a frame/slot structure in which a BS operates one symbol, including a muting RE, in a slot to estimate a self-interference channel according to an embodiment.

Referring to FIG. 23, slot structures (14 slot structures in total) are illustrated including 14 symbols including one symbol 2310 including muting REs used for SI channel estimation in a similar manner to that in the example of FIG. 11. Each slot of FIG. 23 may be allocated to the UE performing uplink transmission, and the remaining REs, except for the muting RE in the symbol 2310, and the remaining 13 symbols 2320 may be used for uplink transmission of the UE.

In other words, in FIG. 23, the symbols 2320 indicate a symbol area used by the UE for uplink transmission, and the muting REs in the symbols 2310 are not used by the UE for uplink transmission. The muting RE may be understood as a resource included in the resources allocated to the UE but not actually used for uplink transmission.

FIGS. 21 and 23 illustrate an example in which muting REs are allocated to one symbol period in the slot, and the muting REs may be allocated to a plurality of symbols in the slot. The plurality of symbols may be contiguous or discrete symbols in the slot. In other words, the BS may estimate the self-interference channel using the muting REs allocated from a plurality of symbols and may restrict the UE to not perform uplink transmission in the muting REs of the corresponding symbols.

The BS may change at least one of the number or position of muting symbols including muting REs according to a specific purpose. For example, when the channel estimation performance for SIC is insufficient with one muting RE, the BS may increase the number of symbols including muting REs.

As another embodiment, as described below in connection with Embodiment 7, it is possible to operate a symbol(s) including one or more muting REs even when the transmit beam or receive beam of the BS is changed in the slot.

In another embodiment, when the self-interference channel does not change during a plurality of slots, the BS may set no muting symbol including a muting RE in the slot.

In yet another embodiment, if it is not the case where downlink transmission and uplink reception are not simultaneously caused by FD communication as in the example of FIG. 8, e.g., when the BS does not perform downlink transmission for the corresponding slot, the BS may not set a muting symbol including a muting RE.

Embodiment 6

Embodiment 6 relates to a method in which in a communication environment as in the example of FIG. 8, the BS indicates, to the UE, the position of the muting RE not used on uplink.

The BS may indicate the position of the corresponding muting RE to the UE by using schemes a) to d) as follows.
  a) Explicitly indicate the position of the muting RE to the UE every time (dynamic method);
  b) Indicate to the UE a specific muting RE pattern and repetition period of the muting symbol (periodic method);
  c) Operate during a specific time without indicating to the UE a specific muting RE pattern and repetition period of the muting symbol (semi-static method); and
  d) The UE conjectures the position of the muting RE by combining other information The information for the BS to indicate/set, to the UE, at least one of the position, pattern, repetition period, and operation time of the muting RE may be provided to the UE through the above-described higher layer signaling or L1 signaling.

If the BS informs the UE of the position of the muting RE according to schemes a) to d) above, it may be assumed that the UE transmits no uplink signal in the position of the muting RE.

For example, when the BS informs the UE of specific symbol #a or multiple symbols including the muting RE by schemes a) to d) above, although the BS schedules symbols #b and #c including the position of the muting RE, the UE may not perform uplink transmission on the muting REs of the symbol #a or multiple symbols which the UE has been informed of through schemes a) to d).

If the BS explicitly informs the UE of the position of the muting RE included in the specific symbol every time by scheme a), the UE may receive information about the muting RE from the BS ('receive' here may mean doing so after decoding is complete) and may not perform uplink transmission in the position of the muting RE.

For example, if the BS designates the position of the muting RE included in the specific symbol and informs the UE of it at a time before a time t_decoding previously agreed on with the UE (i.e., a time required until decoding of the muting RE), the UE may not perform uplink transmission on the corresponding muting RE despite being scheduled for an uplink resource for the position of the muting RE by the BS. The BS may use the position of the corresponding muting RE for self-interference channel estimation.

Upon operation, the UE may limit the operation of not transmitting an uplink signal in the muting RE in the symbol designated by the BS to one slot.

If the BS explicitly informs the UE of the position of the muting RE in the specific symbol, along with the period or without the period, by scheme b) above, the UE may receive information about the muting RE from the BS and may not perform uplink transmission in the position of the corresponding muting RE.

For example, if the BS informs the UE of the specific muting RE position along with the specific period (e.g., 0.5 slots, 1 slot, or 2 slots), the UE may not perform uplink transmission even when uplink-scheduled in the position of the muting RE according to the position and period of the muting RE.

For example, if the BS designates the period of 0.5 slots and the muting RE in symbol #1, the UE may not perform uplink transmission in the positions of the muting RE of symbol #1 and the muting RE of symbol #8 in the nth slot, the muting RE of symbol #1 and the muting RE of symbol #8 in the n+1th slot, . . . , and the muting RE of symbol #1 and the muting RE of symbol #8 in the n+kth slot.

For example, if the BS indicates the period of two slots and the muting RE of symbol #1, the UE may not perform uplink transmission in the muting RE of symbol #1 of the nth slot, the muting RE of symbol #1 of the n+2th slot, . . . , and the muting RE of symbol #1 of the n+2kth slot (at or after the time when the UE receives and decodes information about the muting RE).

If the BS explicitly informs the UE of the position of the muting RE in the specific symbol, along with the period or without the period, or informs the UE of a specific number of repetitions by scheme c) above, the UE may receive information about the muting RE from the BS and, after decoding, the UE may register the position of the muting RE as a candidate where uplink transmission may not be performed. If the BS explicitly or implicitly activate on the position of the muting RE, the UE may designate the position of the muting RE as a position where uplink transmission is not performed during a specific time and operate.

For example, if the BS informs the UE of the specific muting RE position along with the specific period (e.g., 0.5 slots, 1 slot, or 2 slots) and activates, the UE may not perform uplink transmission even when receiving scheduling for uplink transmission in the position of the muting RE according to the position and period of the muting RE.

If the BS indicates the period of 0.5 slots and the muting RE in symbol #1 and then sends an activation signal, the UE may not perform uplink transmission in the positions of the muting RE of symbol #1 and the muting RE of symbol #8 in the nth slot, the muting RE of symbol #1 and the muting RE of symbol #8 in the n+1th slot, . . . , and the muting RE of symbol #1 and the muting RE of symbol #8 in the n+kth slot.

If the BS indicates the period of two slots and the muting RE of symbol #1 and then sends an activation signal, the UE may not perform uplink transmission in the muting RE of symbol #1 of the nth slot, the muting RE of symbol #1 of the n+2th slot, . . . , and the muting RE of symbol #1 of the n+2kth slot (at or after the time when the UE receives and decodes information about the muting RE).

When the BS informs the UE of the position of the muting RE in the symbol by scheme d), the UE may be set for the position of the corresponding muting RE using an equation and information set to the UE by the BS or using an equation and information previously agreed on between the BS and the UE.

For example, the UE and the BS may measure/estimate the position of the muting RE using at least one of the cell ID, UE ID, SFN, or slot number and perform operations according to the disclosure.

If the cell ID is 1, the UE ID is 1, the SFN is 1, and the slot number is 1, the UE may recognize the muting RE of the first symbol in the slot as an RE where no uplink signal is transmitted although uplink transmission is scheduled.

If the cell ID is 1, the UE ID is 1, the SFN is 2, and the slot number is 1, the UE may recognize the muting RE of the second symbol in the slot as an RE where no uplink signal is transmitted although uplink transmission is scheduled.

As described above, it is possible to identify the position of the muting RE in the specific symbol through information, which is previously determined, or shared, or may be recognized as shared between the UE and the BS and to allow no uplink signal to be transmitted in the identified muting RE. Accordingly, it is possible to identify the specific position of the muting RE using a method preconfigured between the BS and the UE even without a mapping method of the muting RE by a certain specific equation.

Figure 24:
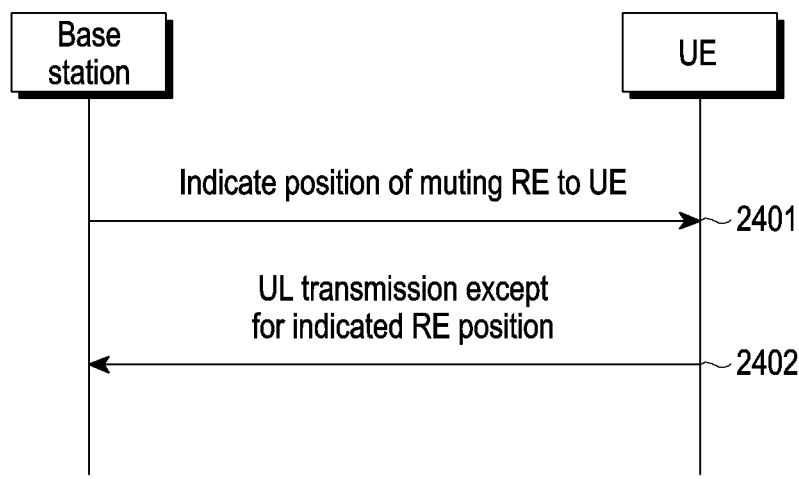
FIGS. 24, 25, 26, and 27 are signal flow diagrams illustrating methods for setting a muting RE between a BS and a UE according to an embodiment.

FIG. 24 is a signal flow diagram illustrating a method for setting a muting RE between a BS and a UE according to an embodiment.

Referring to FIG. 24, messages are exchanged between a UE and a BS when a muting RE is set by scheme a).

In step 2401, the BS transmits information indicating a specific position of the muting RE to the UE capable of using uplink. In this case, to indicate the position of the muting RE, a method using RRC information, a method using DCI, and a method using MAC CE may be considered.

In step 2402, the UE performs uplink transmission in the remaining resources except for the muting RE among the uplink resources in the slot for uplink transmission based on information about the position of the muting RE received from the BS. In this case, the position information about the muting RE may include position information on the frequency axis and position information on the time axis. If the UE receives the information about the position of the muting RE before receiving the scheduling information for uplink transmission, the UE may perform uplink transmission in the remaining resources, except for the corresponding muting RE among the scheduled resources.

Figure 25:
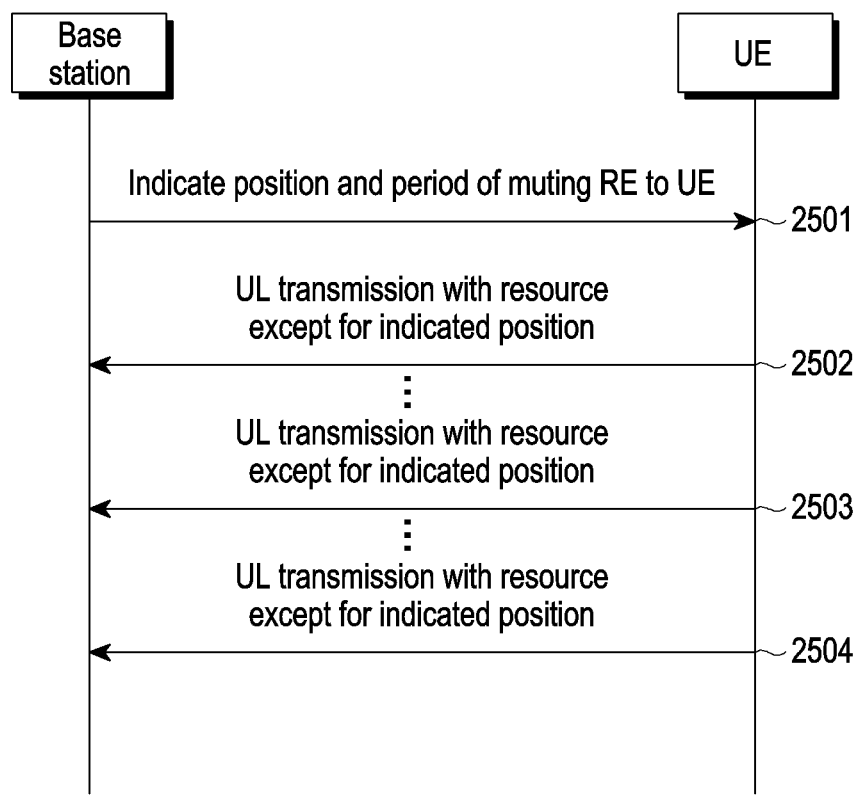

FIG. 25 is a signal flow diagram illustrating a method for configuring a muting RE between a BS and a UE according to an embodiment.

Referring to FIG. 25, messages are exchanged between a UE and a BS when a muting RE is set by scheme b).

In step 2501, the BS transmits information indicating a specific position (which may include a specific pattern) and repetition period of the muting RE to the UE capable of using uplink. In this case, to indicate the position and repetition period of the muting RE, a method using RRC information, a method using DCI, and a method using MAC CE may be considered.

In steps 2502 to 2504, the UE periodically performs uplink transmission in the remaining resources except for the muting RE among the uplink resources in the slot for uplink transmission based on the information about the position and repetition period of the muting RE received from the BS. Accordingly, although there is no further instruction from the BS after the position and repetition period of the muting RE are set, if scheduled for uplink transmission, the UE may periodically perform uplink transmission in the remaining resources except for the muting RE.

If the UE receives the information about the position and repetition period of the muting RE before receiving the scheduling information for uplink transmission, the UE may perform uplink transmission in the remaining resources except for the corresponding muting RE among the scheduled resources.

Figure 26:
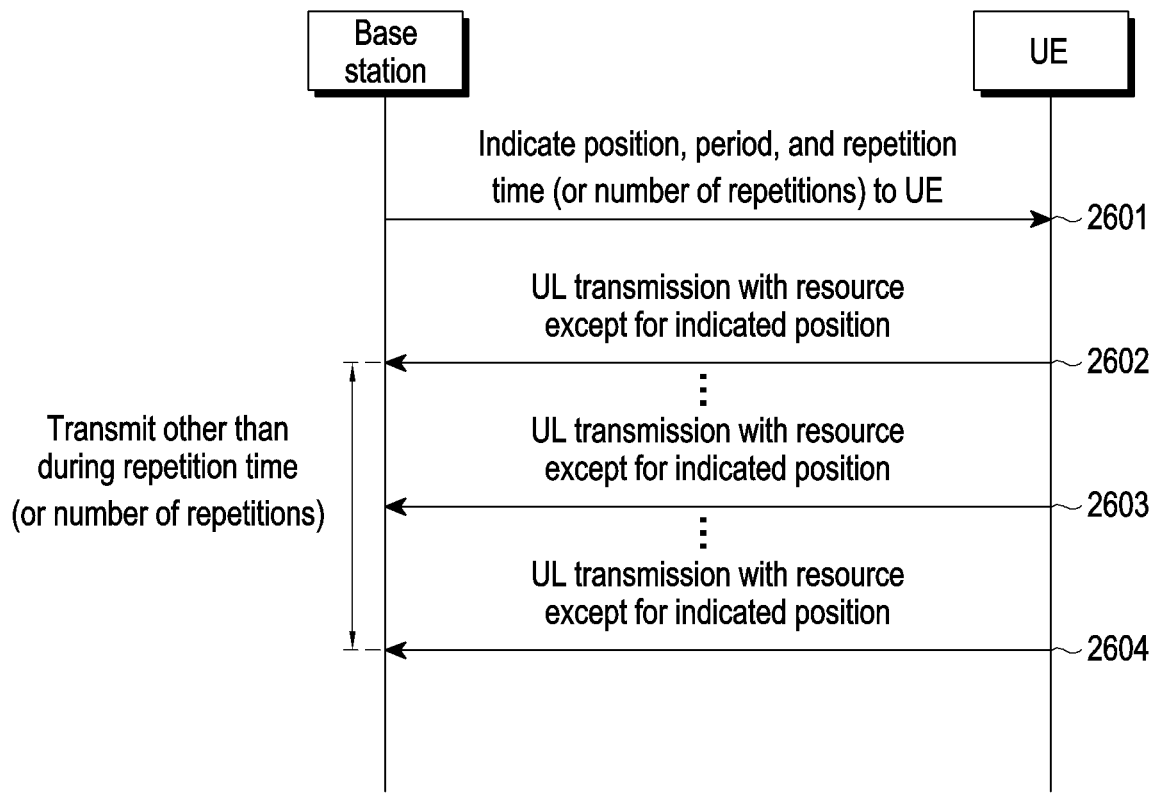

FIG. 26 is a signal flow diagram illustrating a method for setting a muting RE between a BS and a UE according to an embodiment.

Referring to FIG. 26, messages are exchanged between a UE and a BS when a muting RE is set by scheme c).

In step 2601, the BS transmits information indicating a specific position (which may include a specific pattern) and repetition period, repetition time (or number of repetitions) of the muting RE to the UE capable of using uplink. In this case, to indicate the position and repetition period, repetition time (or number of repetitions) of the muting RE, a method using RRC information, a method using DCI, and a method using MAC CE may be considered.

In steps 2602 to 2604, the UE performs, periodically within the repetition time (or number of repetitions), uplink transmission in the remaining resources except for the muting RE among the uplink resources in the slot for uplink transmission based on the information about the position and repetition period, and repetition time (or number of repetitions) of the muting RE received from the BS. Accordingly, although there is no further instruction from the BS after the position and repetition period, repetition time (or number of repetitions) of the muting RE are set, if scheduled for uplink transmission, the UE may perform, periodically within the repetition time (or number of repetitions), uplink transmission in the resources except for the muting RE.

If the UE receives the information about the position and repetition period of the muting RE before receiving the scheduling information for uplink transmission, the UE may perform uplink transmission in the remaining uplink resources except for the corresponding muting RE among the scheduled symbols.

Figure 27:
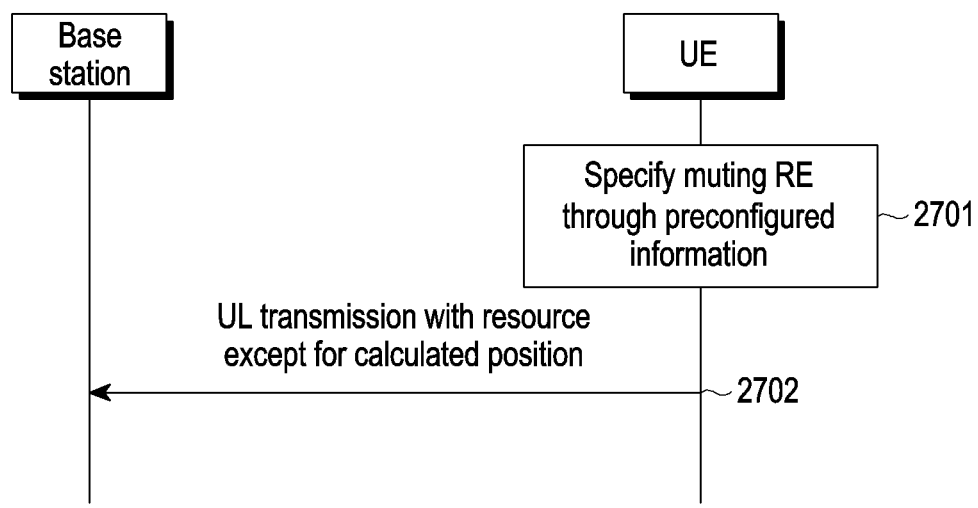

FIG. 27 is a signal flow diagram illustrating a method for configuring a muting RE between a BS and a UE according to an embodiment.

Referring to FIG. 27, messages are exchanged between a UE and a BS when a muting RE is set by scheme d).

In step 2701, even when the BS does not designate a specific position and repetition period and repetition time (or number of repetitions) of the muting RE to a UE capable of using uplink, the UE may calculate/estimate/specify the position of the muting RE based on preconfigured information shared between the UE and the BS as in the above-described method.

In step 2702, the UE performs uplink transmission in the remaining resources except for the muting RE among the uplink resources in the slot for uplink transmission based on the calculated/estimated/specified position of the muting RE.

Embodiment 7

Embodiment 7 relates to a method for supporting a beam change in self-interference channel estimation when the transmit beam or receive beam of a BS is changed.

As shown in the example of FIG. 17, the BS 810 performs downlink transmission to the UE 820a and, if changing the target of downlink transmission from downlink transmission to the UE 820b to reception of the uplink signal from the UE 820c, the transmit beam of the Tx panel 811 is changed, so that the self-interference channel is changed (1710). Therefore, the BS 810 should re-estimate the changed self-interference channel to cancel the self-interference.

Figure 28:
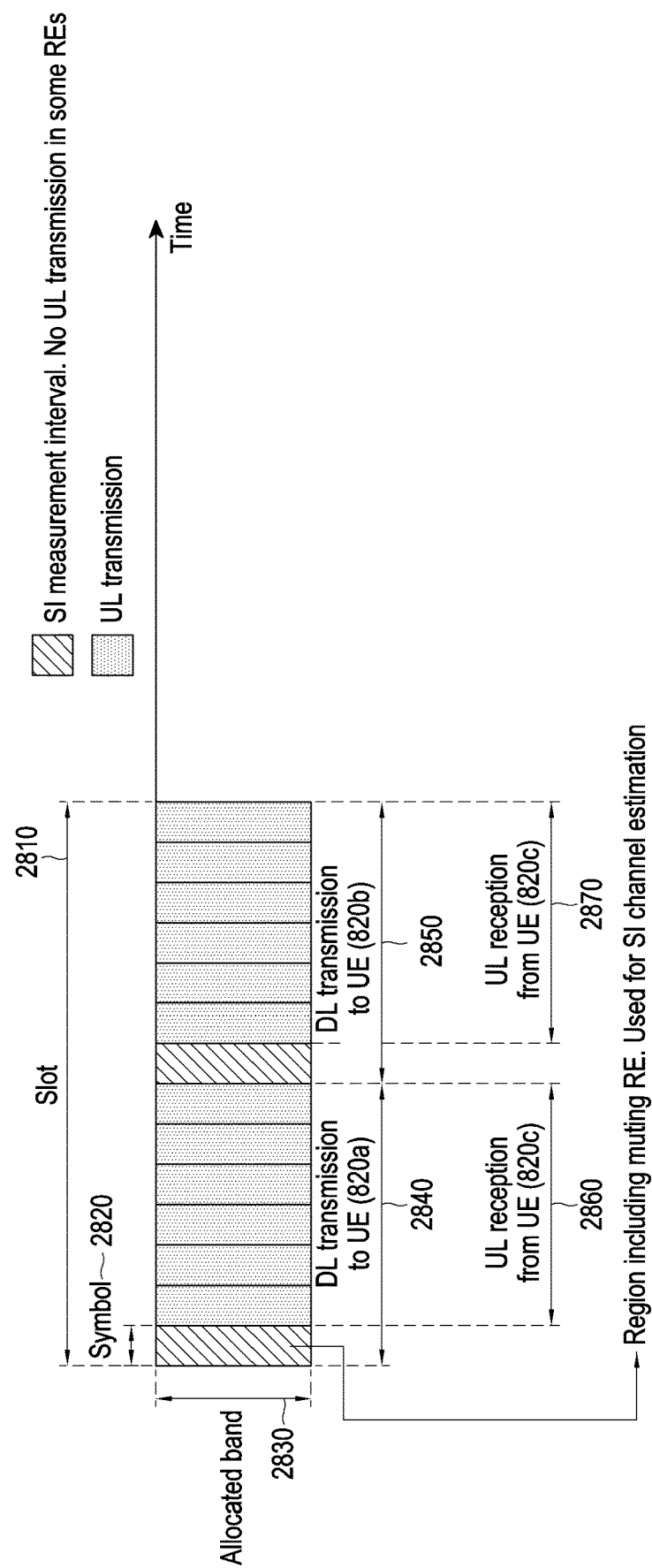
FIG. 28 illustrates a frame/slot structure in which a BS operates a muting RE to estimate a self-interference channel upon changing a transmit beam according to an embodiment.

FIG. 28 illustrates a frame/slot structure in which a BS operates a muting RE to estimate a self-interference channel upon changing a transmit beam according to an embodiment. For example, FIG. 28 is described below with reference to FIG. 17.

Referring to FIG. 28, a muting RE is an RE in which the uplink transmission of the UE is restricted for estimation of the self-interference channel in the BS.

FIG. 28 illustrates an example of a slot structure allocated by the BS 810 for uplink transmission of the UE 820c. The allocated band 2830 shown on the vertical axis indicates the frequency band available to the UE, e.g., the RB allocated to the UE by the BS, the UE's BWP, or the entire bandwidth used by the BS.

The BS 810 may perform self-interference channel estimation in one or more symbols 2820 including muting REs after the transmit beam is changed to the UE 820b.

For example, if the BS 810 performs downlink transmission to the UE 820a in the time interval corresponding to the first symbol to seventh symbol (symbol #0 to symbol #6) in the slot 2810 allocated for uplink transmission of the UE 820c by the BS 810 (2840), and the BS 810 performs downlink transmission to the UE 820b using the changed transmit beam in the time interval corresponding to the eighth symbol to tenth symbol (symbol #7 to symbol #13) in the slot 2810 (2850) (i.e., when the target of the transmit beam is changed to the UE 820b) as shown in FIG. 28, the BS 810 receives the uplink signal from the UE 820c (2860 and 2870) when considering scheduling for the UE 820c and disables the UE 820c from performing uplink transmission in one or more muting REs in symbol #0 to symbol #6 and one or more muting REs in symbol #7 to symbol #13, thereby more precisely estimating the self-interference channel. In other words, the BS 810 may use the muting RE for the purpose of estimating the self-interference channel.

To this end, the BS may inform the UE performing uplink transmission of the specific position of the muting RE through the method for Embodiment 6.

Alternatively, when the BS does not inform the UE of the specific position of the muting RE through the method for Embodiment 6, the BS may operate, with the receive beam or the transmit beam fixed, for SIC during FD operation.

As shown in the example of FIG. 19, the BS 810 performs downlink transmission to the UE 820a and, if changing the target of uplink reception from downlink transmission to the UE 820a to uplink reception from the UE 820b, the receive beam of the Rx panel 812 is changed, so that the self-interference channel is changed (1910). Therefore, it is needed to re-estimate the changed self-interference channel to cancel the self-interference.

Figure 29:
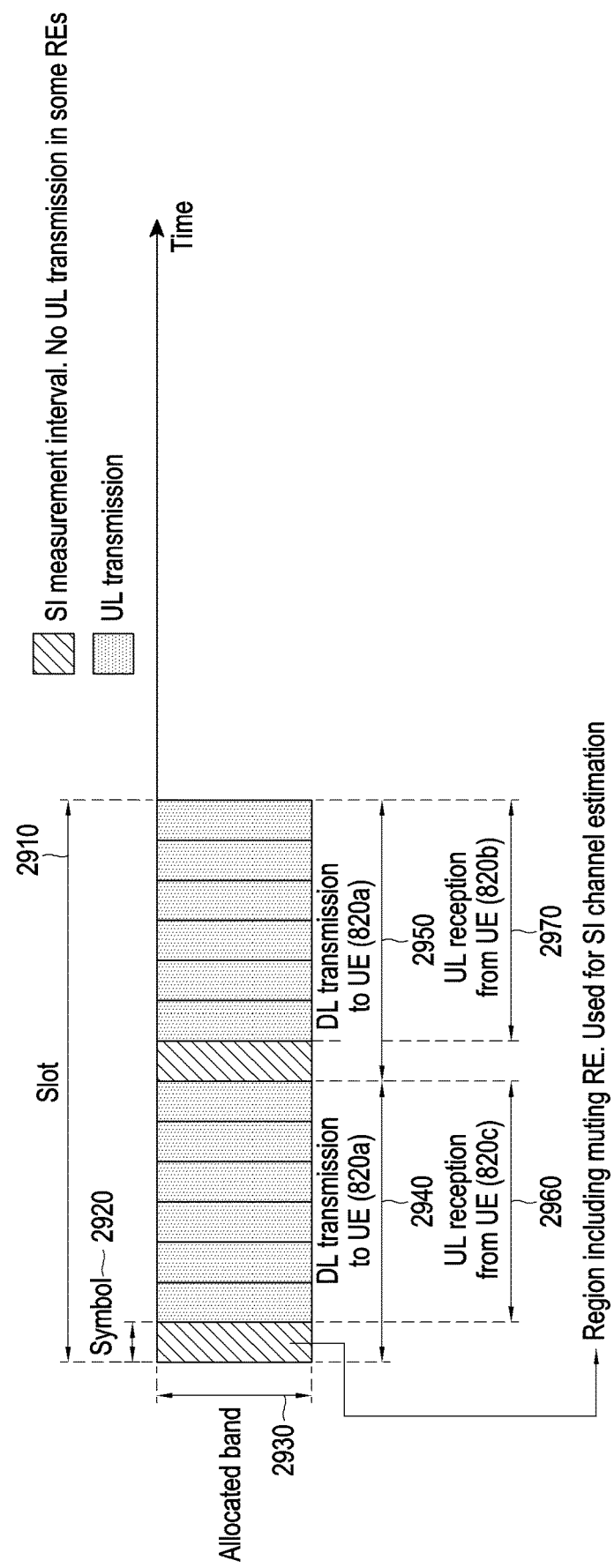
FIG. 29 illustrates a frame/slot structure in which a BS operates a muting RE to estimate a self-interference channel upon changing a receive beam according to an embodiment.

FIG. 29 illustrates a frame/slot structure in which a BS operates a muting RE to estimate a self-interference channel upon changing a receive beam according to an embodiment. For example, FIG. 29 is described below with reference to FIG. 19.

Referring to FIG. 29, the muting RE is a resource in which the uplink transmission of the UE is restricted for estimation of the self-interference channel in the BS.

FIG. 29 illustrates an example of a slot structure allocated by the BS 810 for uplink transmission of the UE 820c and UE 820b. The allocated band 2930 shown on the vertical axis indicates the frequency band available to the UE, e.g., the RB allocated to the UE by the BS, the UE's BWP, or the entire bandwidth used by the BS.

As shown in FIG. 29, the BS 810 may perform self-interference channel estimation in one or more symbols 2920 including muting REs after the receive beam is changed to the UE 820b.

For example, the BS 810 performs downlink transmission to the UE 820 in the time interval corresponding to the first symbol to tenth symbol (symbol #0 to symbol #13) in the slot 2910 allocated for uplink transmission of the UE 820c by the BS 810 (2940 and 2950) and, when supporting the uplink transmission 2960 and 2970 from the UE 820c and UE 820b in the slot 2920, disables the UE 820c and the UE 820b from performing uplink transmission in one or more muting REs in symbol #0 to symbol #X and one or more muting REs in symbol #X to symbol #13 (where symbol #X is the time when the receive beam for reception of the uplink signal is changed), thereby more precisely estimating the self-interference channel. In other words, the BS 810 may use the muting RE for the purpose of estimating the self-interference channel.

To this end, the BS may inform the UE of the specific position of the muting RE through the method for Embodiment 6.

Alternatively, when the BS does not inform the UE of the specific position of the muting RE through the method for embodiment 6, the BS may operate, with the reception beam or the transmission beam fixed, for SIC during FD operation.

Embodiment 8

Embodiment 8 provides a method for setting a muting RE in the frequency domain.

As described in connection with the foregoing embodiments of the disclosure, the BS may set and operate a plurality of muting REs as needed.

The BS may allow the UE to use several muting REs to increase the accuracy of self-interference channel estimation.

For example, the BS may set/allocate relatively more muting REs when the frequency selectivity in the self-interference characteristics of the BS is high so that multiple muting REs should be operated for channel estimation or when the self-interference of the BS is high so that more non-linear components should be estimated upon self-interference channel estimation.

To that end, the BS may indicate, to the UE, position information in the frequency domain of the muting REs in the following schemes to set muting REs to the UE, for example.

Bit-map scheme designates muting REs to UE by m×n+k and informs the UE of m and k k may be the subcarrier index allocated in the order of 0, 1, 2, 3, 4, . . . , 11 from the lowest frequency in RB to highest in the frequency domain. m, together with k, may be used as a value indicating the allocation pattern of the muting RE as in embodiments described below. When m is greater than or equal to 3, m may be used in the manner of determining the allocation pattern of the muting RE in the time domain through a modulo operation of obtaining the quotient (the n value) after dividing k by m. m, n, and k are non-negative integers.

For example, when indicating information about the muting RE to the UE in the bitmap scheme, the BS may inform the UE of the position of the muting RE with a higher degree of freedom.

Figure 30:
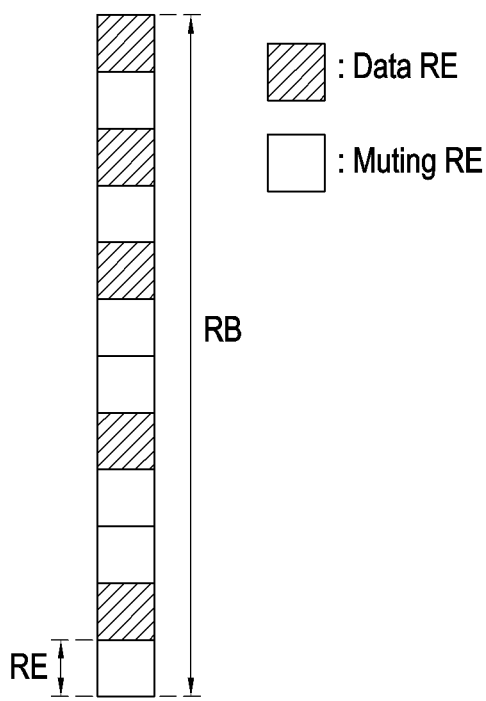
FIG. 30 illustrates a method for setting a position of a muting RE using a bitmap scheme in a frequency domain according to an embodiment.

FIG. 30 illustrates a method for setting a position of a muting RE using a bitmap scheme in a frequency domain according to an embodiment. More specifically, FIG. 30 illustrates an example in which the BS informs the UE of the position of the muting RE by, e.g., 12 bits.

Referring to FIG. 30, in the bitmap "101101101010" from the bottom in the frequency domain, the BS may inform the UE of the positions of the muting REs, where uplink transmission is not performed, as 1's. Besides the example of FIG. 30, a total of $2^{12}$ methods may be set although all possible cases of combinations with 12 bits which correspond to the number of subcarriers in one RB are not shown.

For example, in the scheme of setting muting REs to indicate m and k to the UE, the UE may identify the positions of the muting REs from m and k received from the BS as follows and may not perform uplink transmission in the position of the muting REs. In this case, m and k indicate the position of the muting RE in the frequency domain.

However, the position of the RE in each RB is assumed to be 0, 1, 2, 3, 4, . . . 11 from the lowest frequency side. It is also possible to set k, which indicates the position of the RE, as 0, 1, 2, 3, 4, . . . , 11 from the highest frequency.

FIGS. 31A to 31F illustrate a method for setting a position of a muting RE using k and m in a frequency domain according to an embodiment.

For example, when m is designated as 0, the UE may identify that the RE positioned k away from the lowest value of the RB is set as a muting RE.

Figure 31A:
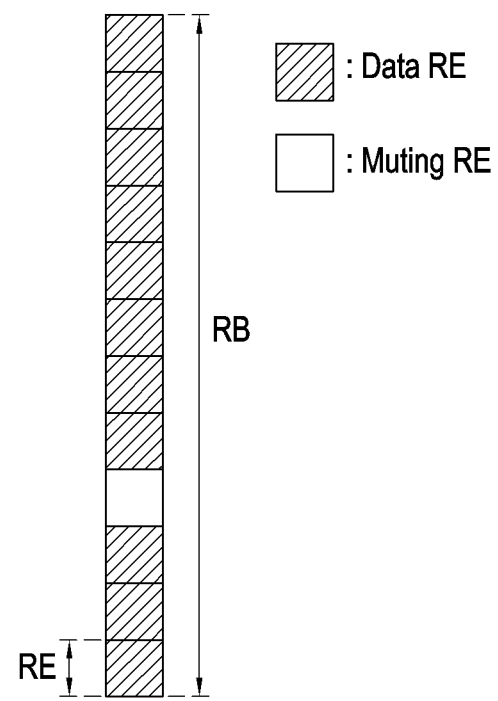
FIGS. 31A, 31B, 31C, 31D, 31E, and 31F illustrate a method for setting a position of a muting RE using k and m in a frequency domain according to an embodiment.

FIG. 31A illustrates an example in which k=3 and m=0. For example, when m is designated as 1, the UE may identify that all positions in the RB are designated/set as muting REs.

Figure 31B:
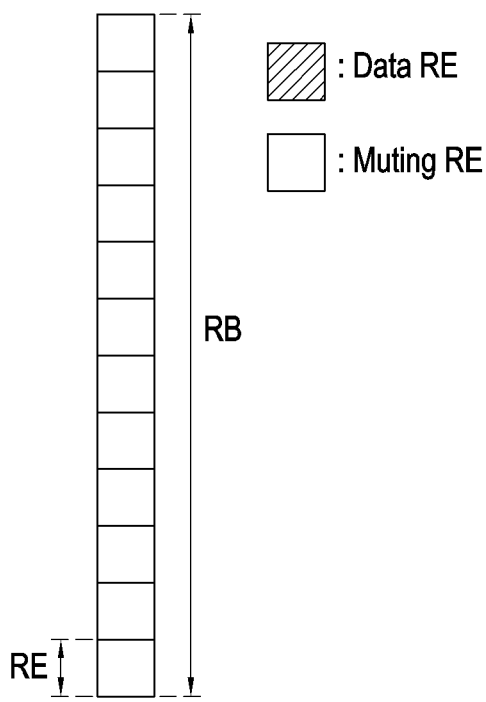

FIG. 31B illustrates an example in which m=1. For example, when m is designated as 2, the UE may identify that even-numbered REs or odd-numbered REs are designated as muting REs.

Figure 31C:
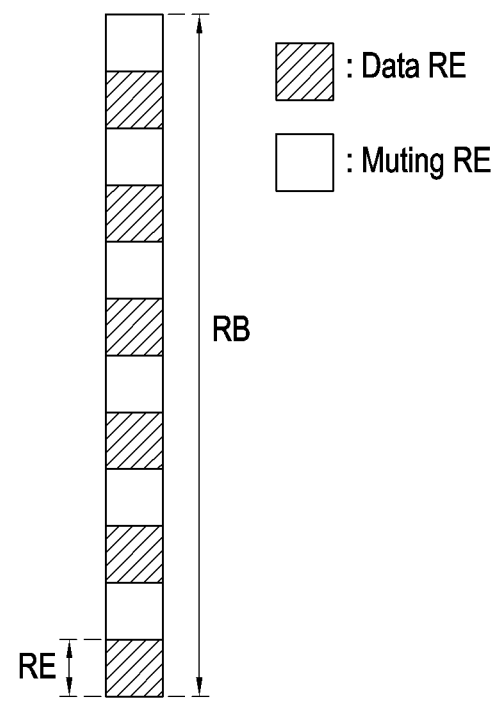

FIG. 31C illustrates an example in which m=2 and k=1. For example, when m is designated as 3, the UE may identify that the RE for which the remainder after dividing by 3 is k is designated/set as a muting RE.

Figure 31D:
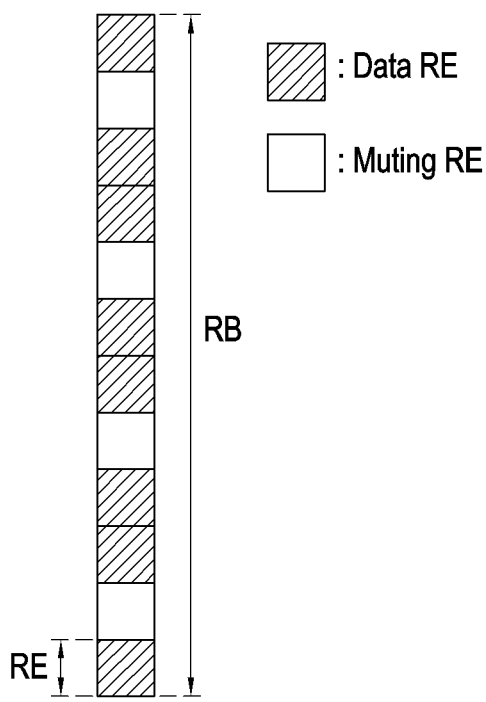

FIG. 31D illustrates an example in which m=3 and k=1. For example, when m is designated as 4, the UE may identify that the RE for which the remainder after dividing by 4 is k is designated/set as a muting RE.

Figure 31E:
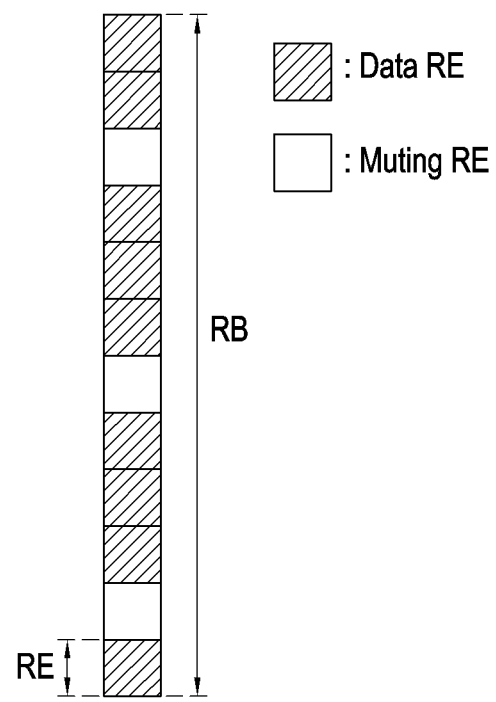

FIG. 31E illustrates an example in which m=4 and k=1. For example, when m is designated as 6, the UE may identify that the RE for which the remainder after dividing by 6 is k is designated/set as a muting RE.

Figure 31F:
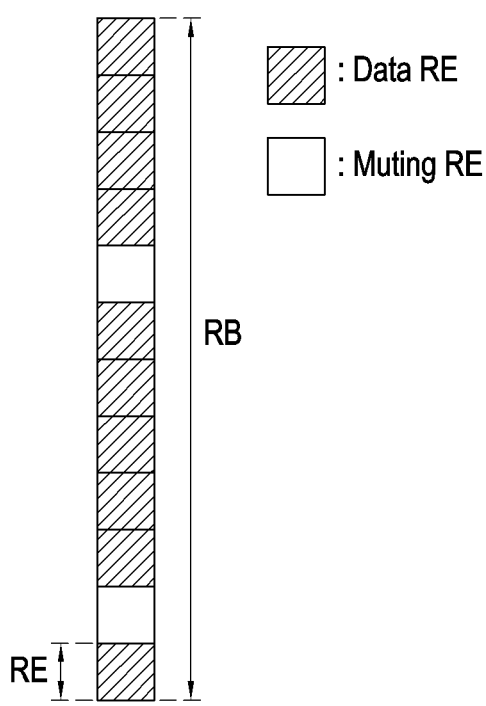

FIG. 31F illustrates an example in which m=6 and k=1.

The BS may clearly inform the UE of m and, without explicitly transferring k, allow the UE to identify the set position of the muting RE through calculation using, as a variable, at least one of the specific symbol position, cell ID, SFN, or UE ID.

For example, the BS may allow the UE to calculate the equation "$\alpha$ Cell ID+$\beta$ symbol number+$\gamma$ SFN+$\delta$ UE ID % m" to infer k. In the above equation, "$\alpha$", "$\beta$", "$\gamma$", and "$\delta$" are integers, and % m represents the remainder after dividing by m.

Embodiment 9

Embodiment 9 discloses a method for setting the position of a muting RE in the time domain.

As described above in connection with the foregoing embodiments of the disclosure, the BS may operate multiple muting REs for multiple symbols as necessary.

The BS may allow the UE to use several muting REs to increase the accuracy of self-interference channel estimation.

For example, the BS may set/allocate more muting REs to be used in relatively more symbols when the time varying characteristic in the self-interference characteristics of the BS is high so that muting REs should be operated in multiple symbols for channel estimation or when the self-interference of the BS is high so that more non-linear components should be estimated upon self-interference channel estimation or when the BS operates multiple beams in one slot.

To that end, the BS may indicate, to the UE, position information in the time domain of the muting REs in the following schemes.

Bit-map scheme designates muting REs to UE by x×y+z and informs the UE of x and z the BS informs the UE of the number of symbols including muting REs and allows a pre-agreed position to be muted.

the BS and the UE previously designate the position of the muting RE through a table and indicate the position For example, when indicating information about the muting RE to the UE in the bitmap scheme, the BS may inform the UE of the position of the muting RE with a higher degree of freedom.

Figure 32:
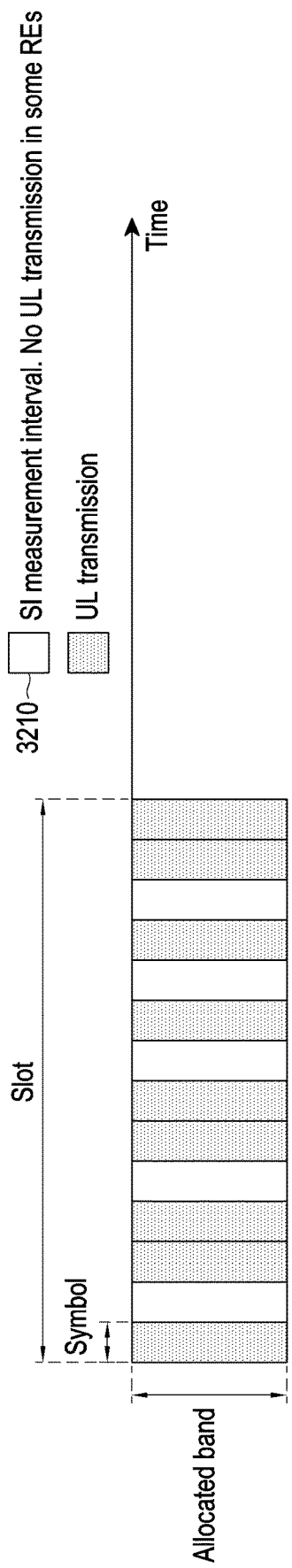
FIG. 32 illustrates a method for setting a position of a muting RE using a bitmap scheme in a time domain according to an embodiment.

FIG. 32 illustrates a method for setting a position of a muting RE using a bitmap scheme in a time domain according to an embodiment. More specifically, FIG. 32 illustrates an example in which the BS informs the UE of the position of the symbol 3210 including the muting RE in the slot by, e.g., 14 bits.

Referring to FIG. 32, in the bitmap "01001001010100" from the left to right symbol in the time domain, the BS may inform the UE of the positions of the symbols 3210 including muting REs, as 1's. Besides the example of FIG. 32, a total of $2^{14}$ methods may be set although all possible cases of combinations with 14 bits which correspond to the number of symbols in one slot are not shown.

For example, in the scheme of setting muting REs to indicate x and z to the UE, the UE may identify the positions of the muting REs from x and z received from the BS as follows and may not perform uplink transmission in the position of the muting REs. In this case, x and z indicate the positions of the symbols in which the muting REs are transmitted in the time domain.

However, the position of the symbol in each slot is assumed to be 0, 1, 2, 3, 4, . . . 13 in order from the earliest to latest.

z indicates the remainder in the modulo operation indicating the allocation pattern of the muting RE in the time domain and, as in the following embodiments, x may be used as a value indicating the allocation pattern of the muting RE along with z. When x is greater than or equal to 3, x may be used in the manner of determining the allocation pattern of the muting RE in the time domain through a modulo operation of obtaining the quotient (the y value) after dividing the symbol index by x. x, y, and z are non-negative integers.

FIGS. 33A to 33H illustrate a method for setting a position of a muting RE using x and z in a time domain according to an embodiment. In FIGS. 33A to 33H, reference numerals 3310, 3320, . . . 3380 indicate symbols including muting REs.

For example, when x is designated as 0, the UE may identify that the muting RE is transmitted in the symbol position which is z away from a smaller symbol value.

Figure 33A:
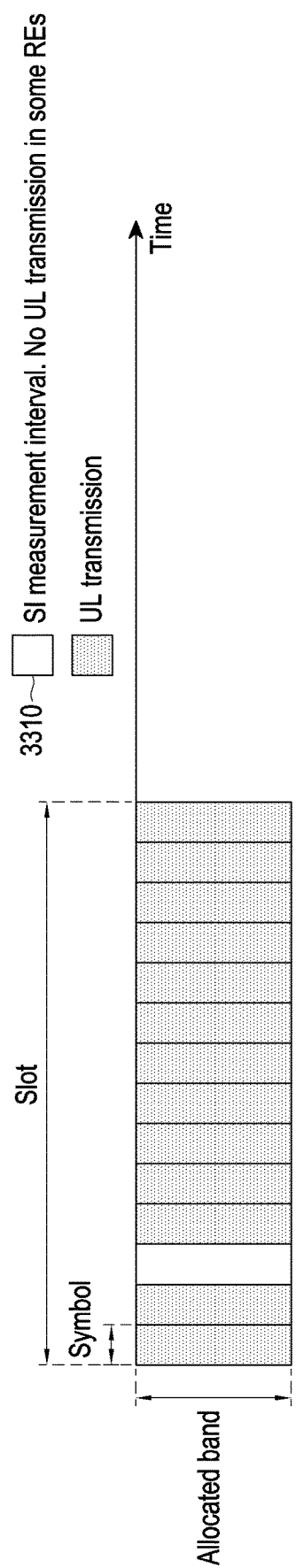
FIGS. 33A, 33B, 33C, 33D, 33E, 33F, 33G, and 33H illustrates a method for setting a position of a muting RE using x and z in a time domain according to an embodiment.

FIG. 33A illustrates an example in which z=2 and x=0. For example, when x is designated as 1, the UE may identify that all the symbols in the sidelink operation include muting REs.

Figure 33B:
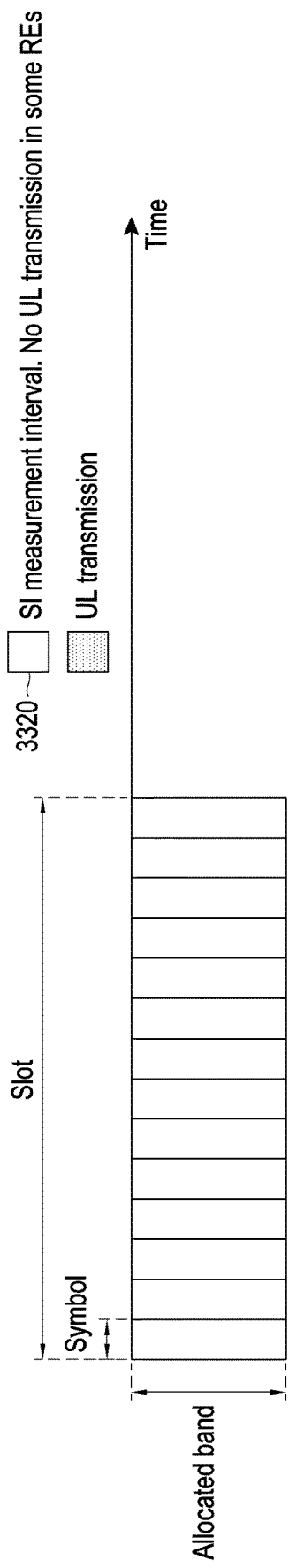

FIG. 33B illustrates an example in which x=1. For example, when x is designated as 2, the UE may identify that even-numbered or odd-numbered symbols in the slot include muting REs.

Figure 33C:
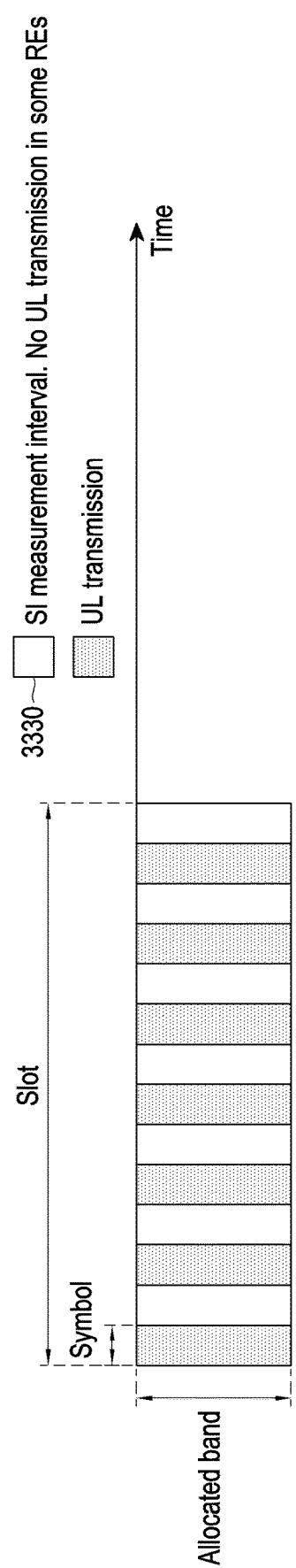

FIG. 33C illustrates an example in which x=2 and z=1. For example, when x is designated as 3, the UE may identify that the muting RE is transmitted in the symbol for which the remainder after dividing the symbol index by 3 is z.

Figure 33D:
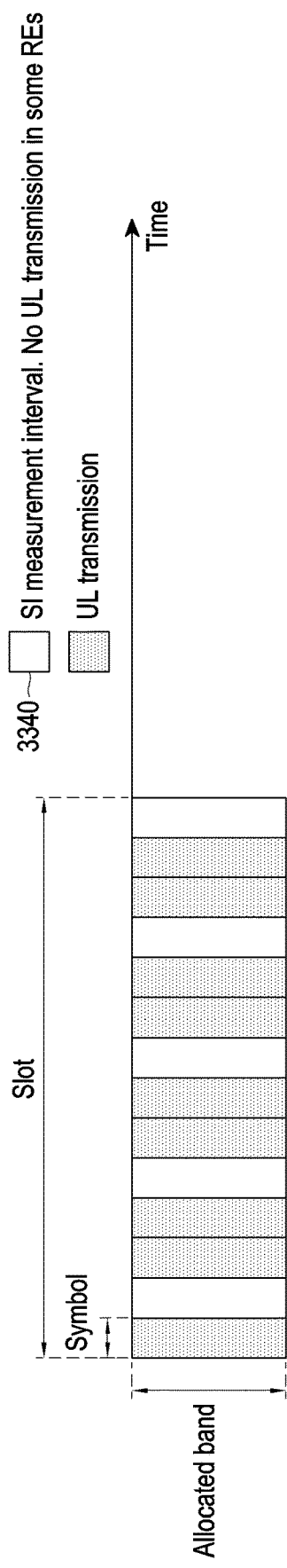

FIG. 33D illustrates an example in which x=3 and z=1. For example, when x is designated as 4, the UE may identify that the muting RE is transmitted in the symbol for which the remainder after dividing the symbol index by 4 is z.

Figure 33E:
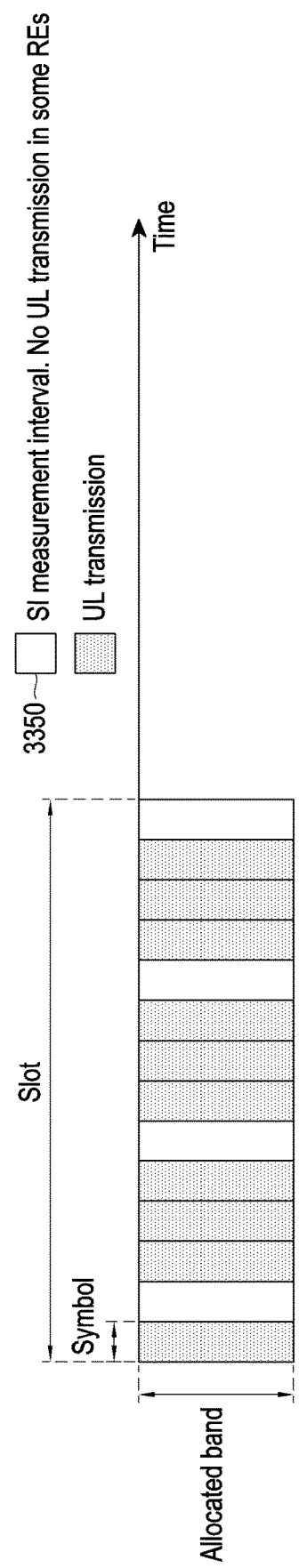

FIG. 33E illustrates an example in which x=4 and z=1. For example, when x is designated as 5, the UE may identify that the muting RE is transmitted in the symbol for which the remainder after dividing the symbol index by 5 is z.

Figure 33F:
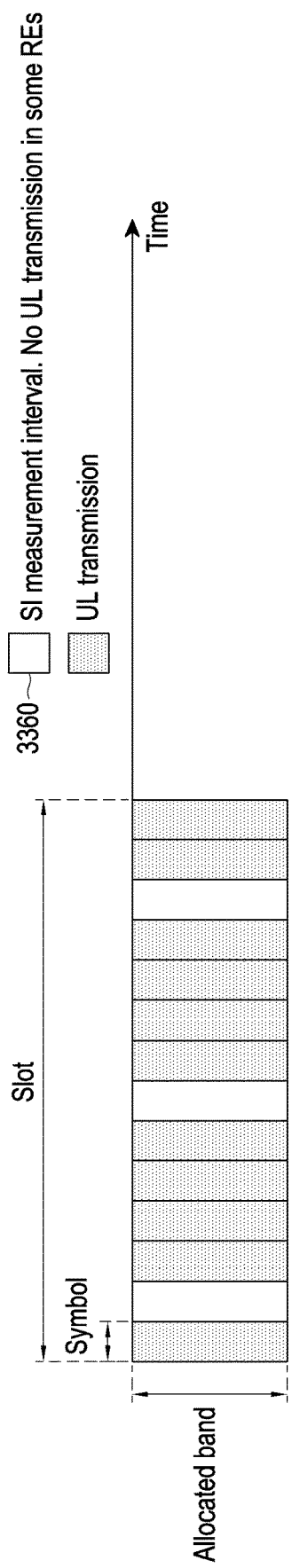

FIG. 33F illustrates an example in which x=5 and z=1. For example, when x is designated as 6, the UE may identify that the muting RE is transmitted in the symbol for which the remainder after dividing the symbol index by 6 is z.

Figure 33G:
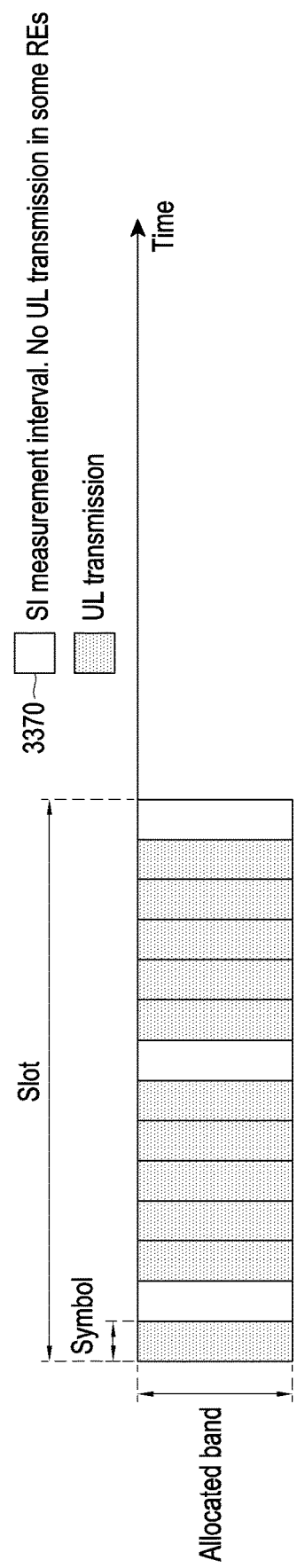

FIG. 33G illustrates an example in which x=6 and z=1. For example, when x is designated as 7, the UE may identify that the muting RE is transmitted in the symbol for which the remainder after dividing the symbol index by 7 is z.

Figure 33H:
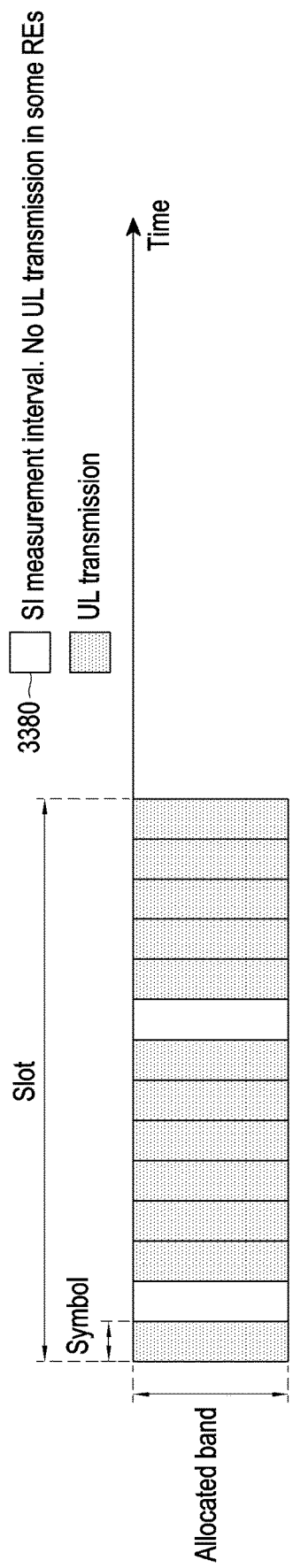

FIG. 33H illustrates an example in which x=7 and z=1.

For example, the BS may clearly inform the UE of x and, without explicitly transferring z, allow the UE to identify the set position of the muting RE through calculation using, as a variable, at least one of the specific symbol position, cell ID, SFN, or UE ID.

For example, the BS may allow the UE to calculate the equation "\alpha Cell ID+\beta symbol number+\gamma SFN+\delta UE ID % x" to infer z. In the above equation, "\alpha", "\beta", "\gamma", and "\delta" are integers, and % x indicates the remainder after dividing by x.

Alternatively, the BS may consider the following methods when informing the UE of only the number of symbols used and fixing the position of the muting RE therefor.

FIGS. 34A, 34B, 34C, and 34D illustrate a method for fixing and setting a position of a muting RE according to an embodiment. In FIGS. 34A to 34D, reference numerals 3410, 3420, 3430, and 3440 indicate symbols including muting REs.

Figure 34A:
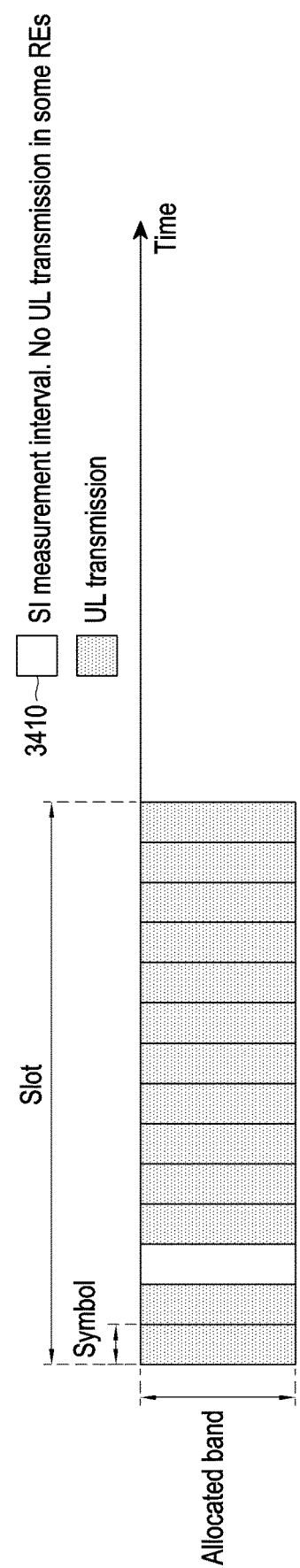

Referring to FIG. 34A, when the BS informs the UE that one symbol is designated as a muting RE, the position of the corresponding muting RE may be empty.

Referring to FIG. 34B, when the BS informs the UE that two symbols are designated as muting REs, the positions of the corresponding muting REs may be emptied.

Referring to FIG. 34C, when the BS informs the UE that three symbols are designated as muting REs, the positions of the corresponding muting REs may be emptied.

Figure 34D:
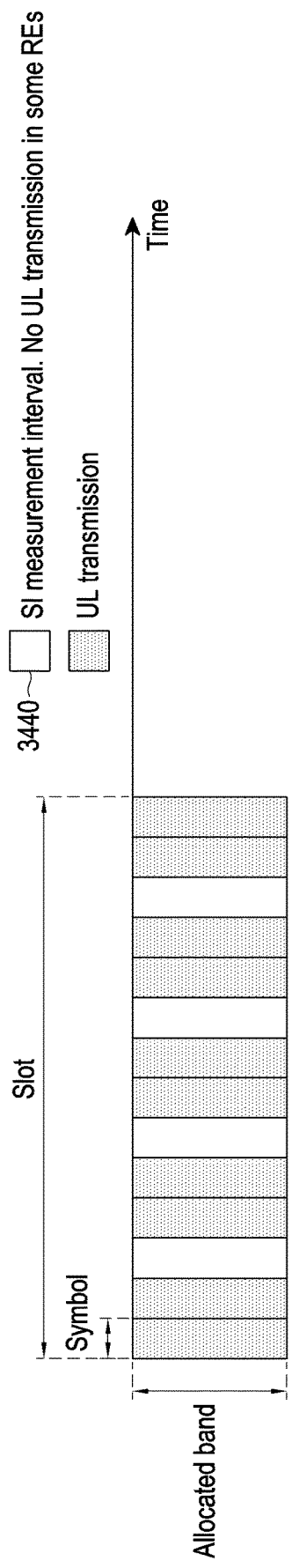

Referring to FIG. 34D, when the BS informs the UE that four symbols are designated as muting REs, the positions of the corresponding muting REs may be emptied.

The positions of the symbols of the muting RE shown in FIGS. 34A to 24D are merely examples, and if the BS designates only the number of muting symbols to the UE, the UE may determine to transmit the muting RE in the corresponding position according to the scheme mutually agreed on between the UE and the BS.

For example, if the BS and the UE considers the scheme of previously designating the position of the muting RE through a table and indicating the position, the UE and the BS may designate the position of the symbol with the previously agreed-on table. For example, in the case of operating the positions of eight muting REs as in the example of Table 9 below, the BS may inform the UE of the position of the muting RE through a 3-bit indicator. Further, the BS and the UE may change the position of the symbol including the muting RE corresponding to the indicator through, e.g., higher layer message exchange.

TABLE 9

| Indicator | Bitmap representation position |   |   |   |   |   |   |   |   |   |   |   |   |   |
|---|---|---|---|---|---|---|---|---|---|---|---|---|---|---|
| 0 | 0 | 0 | 1 | 0 | 0 | 0 | 0 | 0 | 0 | 0 | 0 | 0 | 0 | 0 |
| 1 | 0 | 0 | 1 | 0 | 0 | 0 | 0 | 0 | 0 | 0 | 0 | 1 | 0 | 0 |
| 2 | 0 | 0 | 1 | 0 | 0 | 0 | 0 | 1 | 0 | 0 | 0 | 1 | 0 | 0 |
| 3 | 0 | 0 | 1 | 0 | 0 | 1 | 0 | 0 | 1 | 0 | 0 | 1 | 0 | 0 |
| 4 | 0 | 0 | 0 | 1 | 0 | 1 | 0 | 0 | 1 | 0 | 0 | 1 | 0 | 0 |
| 5 | 0 | 0 | 1 | 1 | 0 | 0 | 0 | 0 | 0 | 0 | 0 | 0 | 0 | 0 |
| 6 | 0 | 0 | 1 | 1 | 0 | 0 | 0 | 0 | 0 | 0 | 1 | 1 | 0 | 0 |
| 7 | 1 | 0 | 0 | 0 | 0 | 0 | 0 | 0 | 0 | 0 | 0 | 0 | 0 | 1 |

Embodiment 10

Embodiment 10 relates to a method for operating muting REs when the BS uses multiple layers in downlink transmission.

When the BS uses multiple layers in downlink transmission, the BS may more muting REs for self-interference channel estimation.

Therefore, the BS may allow the UE to adjust the position of the muting RE preconfigured according to the number of layers transmitted on downlink or to adjust the number of symbols including muting REs.

For example, upon informing the UE of the position of the muting RE and the position of the symbol including the muting RE according to embodiments 8 and 9 described above, the BS may inform the UE of the positions of the multiple muting REs and the positions of the symbols including the muting REs and adjust the muting REs depending on the number of layers upon downlink transmission.

For example, the BS may combine and designate the positions, in the first direction, of eight muting REs and the positions of the symbols and inform the UE of them, and then, adjust the combinations (hereinafter, "muting RE patterns") of the positions in the frequency domain and time domain of the corresponding muting REs depending on the number of downlink layers, setting muting REs.

For example, the BS may previously define eight different muting RE patterns and inform the UE of them and, upon layer 1 transmission, allow the UE to perform uplink transmission considering only muting RE pattern 1. Upon layer 2 transmission, the BS may allow the UE to perform uplink transmission considering only muting RE pattern 2. Upon layer 3 transmission, the BS may allow the UE to perform uplink transmission considering only muting RE pattern 3. Upon layer 4 transmission, the BS may allow the UE to perform uplink transmission considering only muting RE pattern 4. Upon layer 5 transmission, the BS may allow the UE to perform uplink transmission considering only muting RE pattern 5. Upon layer 6 transmission, the BS may allow the UE to perform uplink transmission considering only muting RE pattern 6. Upon layer 7 transmission, the BS may allow the UE to perform uplink transmission considering only muting RE pattern 7. Upon layer 8 transmission, the BS may allow the UE to perform uplink transmission considering only muting RE pattern 8.

Alternatively, upon layer 1 transmission, the BS may allow the UE to perform uplink transmission considering only muting RE pattern 1. Upon layer 2 transmission, the BS may allow the UE to perform uplink transmission in combination of muting RE patterns 1 and 2. Upon layer 3 transmission, the BS may allow the UE to perform uplink transmission in combination of muting RE patterns 1, 2, and 3. Upon layer 4 transmission, the BS may allow the UE to perform uplink transmission in combination of muting RE patterns 1, 2, 3, and 4. Upon layer 5 transmission, the BS may allow the UE to perform uplink transmission in combination of muting RE patterns 1, 2, 3, 4, and 5. Upon layer 6 transmission, the BS may allow the UE to perform uplink transmission in combination of muting RE patterns 1, 2, 3, 4, 5, and 6. Upon layer 7 transmission, the BS may allow the UE to perform uplink transmission in combination of muting RE patterns 1, 2, 3, 4, 5, 6, and 7. Upon layer 8 transmission, the BS may allow the UE to perform uplink transmission in combination of muting RE patterns 1, 2, 3, 4, 5, 6, 7, and 8.

Embodiment 11

The BS may set muting REs through, e.g., DCI, MAC CE, or RRC, to inform the UE of the muting RE pattern according to Embodiments 8 and 9.

If the BS informs the UE of the muting RE pattern through DCI, the BS may include, in the DCI field, at least one of the following information in addition to the above-described DCI field.

muting RE pattern (optional):
frequency domain position (x bits)
time domain position (x bits)
muting RE pattern number (3 bits)

In the DCI field, the frequency domain position field may have various bit values depending on the method of indicating the position of the muting RE in the frequency domain as in Embodiment 8 described above. In the DCI field, the time domain position field may have various bit values depending on the method of indicating the position of the muting RE in the time domain as in Embodiment 9 described above. The muting RE pattern is a field present for the operation of Embodiment 10 described above and may have various bit values depending on the maximum number of layers of the BS. The corresponding DCI field may be known together in the downlink scheduling, uplink scheduling, or another DCI field or be known by configuring an independent DCI. Further, such a scheme may be operated in the same manner on multiple UEs, and the information may be provided to the UE via broadcast.

When the BS informs the UE whether muting RE operation is performed via DCI, the DCI field for uplink scheduling may include the following in addition to the above-described DCI field.

muting RE activation-related (optional):
half-duplex (HD) FD or not 1 bit
Number of DL layers or designated pattern 3 bits in the position To inform the UE whether FD operation actually occurs in the position, the BS may designate whether it is HD/FD and inform the UE of it. If aware of operating in HD through the DCI, the UE may not perform the above-described muting RE operation. If aware of operating in FD through the DCI, the UE may perform the above-described muting RE operation to perform uplink transmission including the muting RE. The BS may inform the UE of the number of DL layers in the corresponding position, informing how to use the muting RE pattern according to Embodiment 10, upon using uplink.

Figure 35:
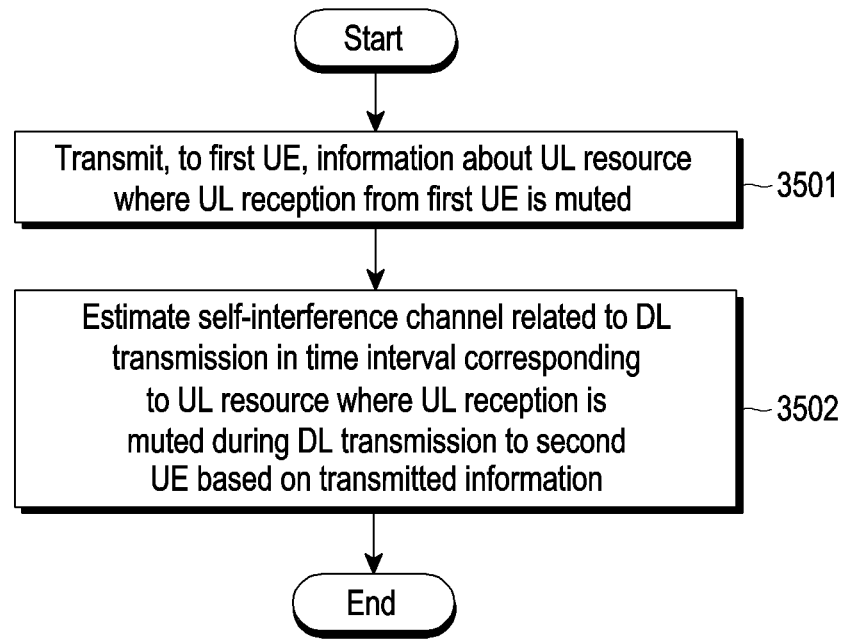
FIG. 35 is a flowchart illustrating operations of a BS to estimate a self-interference channel in an FD communication system according to an embodiment.

FIG. 35 is a flowchart illustrating operations of a BS to estimate a self-interference channel in an FD communication system according to an embodiment.

Referring to FIG. 35, in step 3501, the BS transmits, to the first UE, information about the uplink resource where uplink reception from the first UE is muted (i.e., uplink transmission of the first UE is not performed).

In step 3502, the BS estimates the self-interference channel related to downlink transmission in the period corresponding to the uplink resource where uplink reception is muted during downlink transmission to the second UE, based on the transmitted information. To enhance the self-interference channel estimation performance, the first UE does not perform uplink transmission in the muting symbol or muting RE, and the BS may more accurately estimate the self-interference channel generated by its own downlink transmission without receiving the uplink signal in the period corresponding to the uplink resource.

Figure 36:
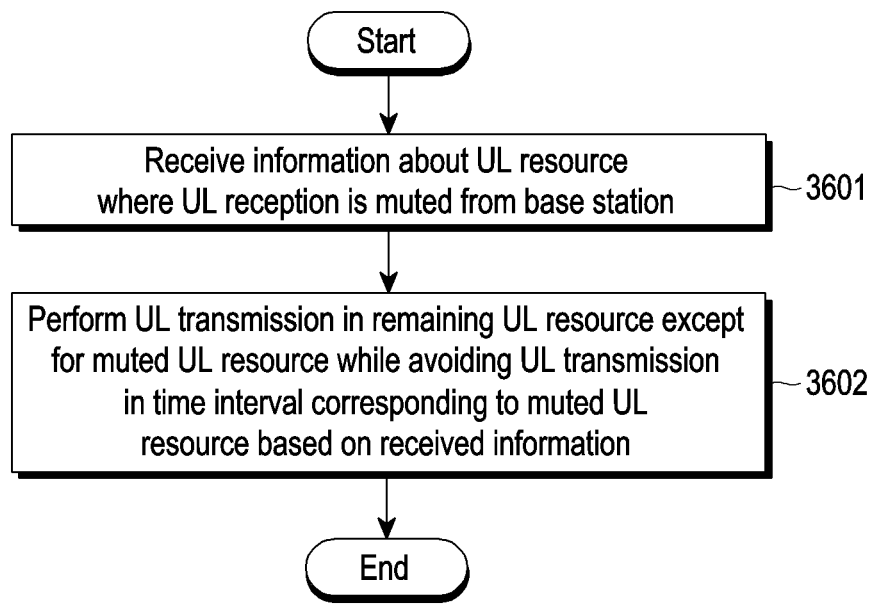
FIG. 36 is a flowchart illustrating operations of a UE to estimate a self-interference channel in an FD communication system according to an embodiment.

FIG. 36 is a flowchart illustrating operations of a UE to estimate a self-interference channel in an FD communication system according to an embodiment.

Referring to FIG. 36, in step 3601, the first UE receives information about the uplink resource where uplink reception is muted from the BS.

In step 3602, the first UE does not perform uplink transmission in the time interval corresponding to the muted uplink resource (muting symbols or muting REs) and performs uplink transmission in the remaining uplink resources except for the muted uplink resource.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a base station (BS) in a full-duplex (FD) communication system, the method comprising:
   transmitting, to a first user equipment (UE), information about an uplink resource in which uplink reception from the first UE is muted; and
   estimating a self-interference channel related to downlink transmission in a period corresponding to the uplink resource, where uplink reception is muted during downlink transmission to a second UE, based on the transmitted information,
   wherein the transmitted information includes a position of a muting symbol or a muting resource element (RE) and at least one of a repetition period, a repetition time, or a number of repetitions of the muting symbol or the muting RE.

2. The method of claim 1, wherein the uplink resource includes one of at least one muting symbol or at least one muting RE in a slot.

3. The method of claim 2, wherein the transmitted information further includes at least one piece of information indicating a position of the at least one muting symbol or the at least one muting RE in a frequency domain and a time domain.

4. The method of claim 1, further comprising allocating a resource of at least one muting RE or at least one muting symbol to the first UE by the BS, wherein the allocated resource is configured not to be used for uplink transmission of the first UE.

5. The method of claim 1, further comprising, in case that the BS changes a transmission beam for downlink transmission to a third UE, re-estimating the self-interference channel based on a downlink channel related to the third UE.

6. The method of claim 1, further comprising, in case that the BS changes a reception beam for uplink reception from a fourth UE, re-estimating the self-interference channel based on an uplink channel related to the fourth UE.

7. A base station (BS) for use in a full-duplex (FD) communication system, the BS comprising:
   a transceiver; and
   a processor configured to:
      transmit, through the transceiver, to a first user equipment (UE), information about an uplink resource in which uplink reception from the first UE is muted, and
      estimate a self-interference channel related to downlink transmission in a period corresponding to the uplink resource, where uplink reception is muted during downlink transmission to a second UE, based on the transmitted information,
      wherein the transmitted information includes a position of a muting symbol or a muting resource element (RE) and at least one of a repetition period, a repetition time, or a number of repetitions of the muting symbol or the muting RE.

8. The BS of claim 7, wherein the uplink resource includes one of at least one muting symbol or at least one muting RE in a slot.

9. The BS of claim 8, wherein the transmitted information further includes at least one piece of information indicating a position of the at least one muting symbol or the at least one muting RE in a frequency domain and a time domain.

10. The BS of claim 7, wherein the processor is further configured to allocate a resource of at least one muting RE or at least one muting symbol to the first UE, wherein the allocated resource is configured not to be used for uplink transmission of the first UE.

11. The BS of claim 7, wherein the processor is further configured to re-estimate the self-interference channel based on a downlink channel related to a third UE in case that the BS changes a transmission beam for downlink transmission to the third UE.

12. The BS of claim 7, wherein the processor is further configured to re-estimate the self-interference channel based on an uplink channel related to a fourth UE in case that the BS changes a reception beam for uplink reception from the fourth UE.

13. A method performed by a user equipment (UE) in a full-duplex (FD) communication system, the method comprising:
   receiving, from a base station (BS), information about an uplink resource in which uplink reception is muted; and
   performing uplink transmission in a remaining uplink resource, except for the uplink resource, while not performing uplink transmission in a period corresponding to the uplink resource, based on the received information,
   wherein the transmitted information includes a position of a muting symbol or a muting resource element (RE) and at least one of a repetition period, a repetition time, or a number of repetitions of the muting symbol or the muting RE.

14. The method of claim 13, wherein the uplink resource includes one of at least one muting symbol or at least one muting resource element (RE) in a slot.

15. The method of claim 14, wherein the received information further includes at least one piece of information indicating a position of the least one muting symbol or the least one muting RE in a frequency domain and a time domain.

16. A user equipment (UE) for use in a full-duplex (FD) communication system, the UE comprising:
   a transceiver; and
   a processor configured to:
      receive, through the transceiver, from a base station (BS), information about an uplink resource in which uplink reception is muted, and
      perform uplink transmission in a remaining uplink resource, except for the uplink resource, while not performing uplink transmission in a period corresponding to the uplink resource, based on the received information,
      wherein the transmitted information includes a position of a muting symbol or a muting resource element (RE) and at least one of a repetition period, a repetition time, or a number of repetitions of the muting symbol or the muting RE.

17. The UE of claim 16, wherein the uplink resource includes one of at least one muting symbol or at least one muting RE in a slot.

* * * * *